United States Patent
Naruse et al.

(10) Patent No.: US 10,366,475 B2
(45) Date of Patent: Jul. 30, 2019

(54) IMAGING DEVICE, AND IMAGE PROCESSING METHOD AND PROGRAM FOR IMAGING DEVICE

(71) Applicant: FUJIFILM Corporation, Tokyo (JP)

(72) Inventors: Yousuke Naruse, Saitama (JP); Junichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/700,709

(22) Filed: Sep. 11, 2017

(65) Prior Publication Data

US 2017/0374282 A1 Dec. 28, 2017

Related U.S. Application Data

(63) Continuation of application No. PCT/JP2016/056695, filed on Mar. 4, 2016.

(30) Foreign Application Priority Data

Mar. 31, 2015 (JP) ................................ 2015-072936

(51) Int. Cl.
*G06T 5/00* (2006.01)
*H04N 5/33* (2006.01)
(Continued)

(52) U.S. Cl.
CPC .............. *G06T 5/003* (2013.01); *G03B 15/00* (2013.01); *G06T 5/00* (2013.01); *G06T 5/10* (2013.01);
(Continued)

(58) Field of Classification Search
CPC .... H04N 5/2256; H04N 5/2258; H04N 5/232; H04N 5/23235; H04N 5/243; H04N 5/33;
(Continued)

(56) References Cited

U.S. PATENT DOCUMENTS

2008/0308712 A1 12/2008 Ono
2010/0245657 A1 9/2010 Adachi et al.
(Continued)

FOREIGN PATENT DOCUMENTS

JP 2008-268868 A 11/2008
JP 2010-230776 A 10/2010
(Continued)

OTHER PUBLICATIONS

International Search Report and Written Opinion of the International Searching Authority (Forms PCT/ISA/237 and PCT/ISA/210) for International Application No. PCT/JP2016/056695, dated May 31, 2016, with English translations.

*Primary Examiner* — Lin Ye
*Assistant Examiner* — Chriss S Yoder, III
(74) *Attorney, Agent, or Firm* — Birch, Stewart, Kolasch & Birch, LLP

(57) ABSTRACT

Image data obtained by imaging of an imaging element capable of imaging a subject with sensitivity to a wavelength band of visible light and a wavelength band of near-infrared light via an optical system is acquired. A point image restoration process using a common restoration filter is performed on the image data of the subject captured with sensitivity to the wavelength band of the visible light by the imaging element and the image data of the subject captured with sensitivity to the wavelength band of the near-infrared light by the imaging element. The common restoration filter is calculated on the basis of average optical characteristics of the optical system obtained by performing weighted averaging of first optical characteristics with respect to the visible light of the optical system and second optical characteristics with respect to the near-infrared light of the optical system.

20 Claims, 26 Drawing Sheets

(51) Int. Cl.
*G03B 15/00* (2006.01)
*H04N 5/232* (2006.01)
*H04N 9/07* (2006.01)
*G06T 5/10* (2006.01)
*H04N 5/225* (2006.01)
*H04N 5/243* (2006.01)
*H04N 9/04* (2006.01)
*G02B 27/10* (2006.01)
*G02B 5/20* (2006.01)
*G02B 27/12* (2006.01)

(52) U.S. Cl.
CPC ......... *H04N 5/2256* (2013.01); *H04N 5/2258* (2013.01); *H04N 5/232* (2013.01); *H04N 5/23235* (2013.01); *H04N 5/243* (2013.01); *H04N 5/33* (2013.01); *H04N 9/045* (2013.01); *H04N 9/07* (2013.01); *G02B 5/201* (2013.01); *G02B 5/208* (2013.01); *G02B 27/1013* (2013.01); *G02B 27/126* (2013.01); *G06T 2207/10024* (2013.01); *G06T 2207/10048* (2013.01); *G06T 2207/10152* (2013.01); *G06T 2207/20028* (2013.01); *G06T 2207/20056* (2013.01); *G06T 2207/30232* (2013.01); *H04N 5/332* (2013.01)

(58) Field of Classification Search
CPC .......... H04N 5/332; H04N 9/045; H04N 9/07; G06T 5/00; G06T 5/003; G06T 5/10; G06T 2207/10024; G06T 2207/10048; G06T 2207/10152; G06T 2207/20028; G06T 2207/20056; G06T 2207/30232; G03B 15/00; G02B 5/201; G02B 5/208; G02B 27/1013; G02B 27/126
See application file for complete search history.

(56) References Cited

U.S. PATENT DOCUMENTS

| | | | |
|---|---|---|---|
| 2010/0310165 A1* | 12/2010 | Chen | G06T 5/003 382/167 |
| 2011/0135216 A1* | 6/2011 | Hatakeyama | G06T 5/003 382/260 |
| 2013/0038748 A1 | 2/2013 | Hatakeyama | |
| 2013/0050546 A1* | 2/2013 | Kano | H04N 5/3572 348/280 |
| 2013/0215296 A1 | 8/2013 | Oniki et al. | |

FOREIGN PATENT DOCUMENTS

| | | |
|---|---|---|
| JP | 2013-38562 A | 2/2013 |
| JP | 2013-172213 A | 9/2013 |
| JP | 2016-10080 A | 1/2016 |

\* cited by examiner

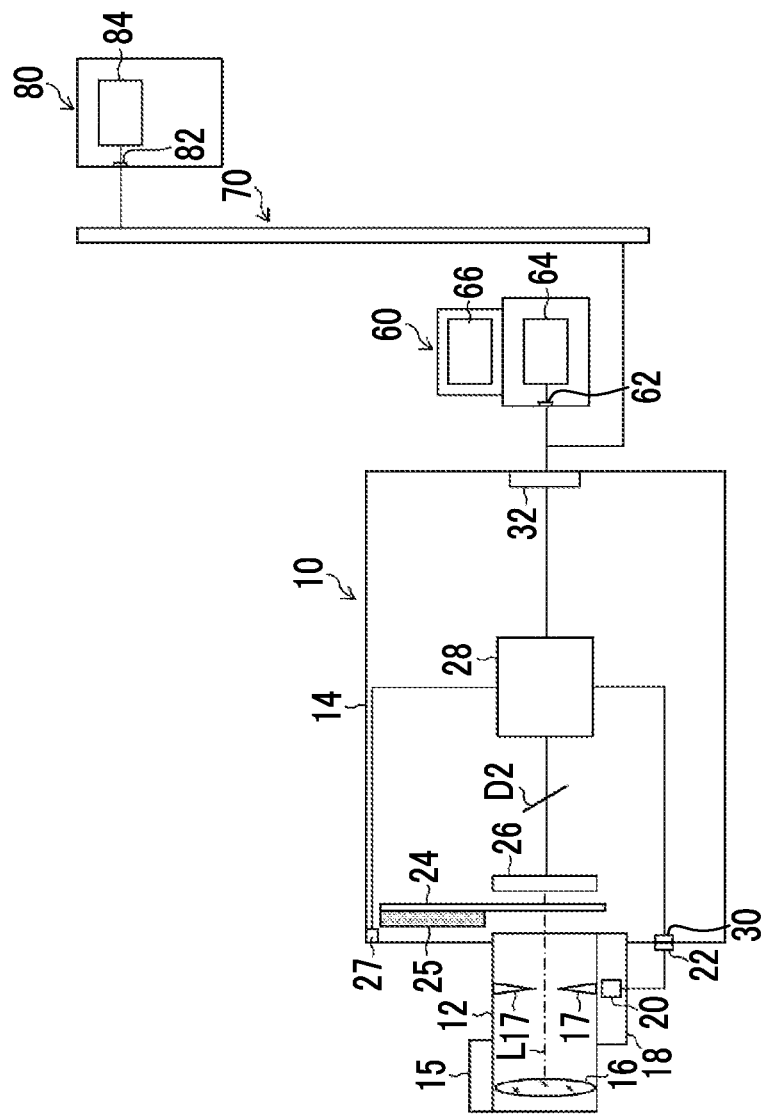

IMAGING DEVICE, AND IMAGE PROCESSING METHOD AND PROGRAM FOR IMAGING DEVICE

CROSS-REFERENCE TO RELATED APPLICATIONS

This application is a Continuation of PCT International Application No. PCT/JP2016/056695 filed on Mar. 4, 2016, which claims priority under 35 U.S.C § 119(a) to Japanese Patent Application No. 2015-072936 filed on Mar. 31, 2015. Each of the above application(s) is hereby expressly incorporated by reference, in its entirety, into the present application.

BACKGROUND OF THE INVENTION

1. Field of the Invention

The present invention relates to an imaging device which performs imaging of a subject regardless of day or night, and an image processing method and a program for the imaging device.

2. Description of the Related Art

In recent years, surveillance cameras (imaging devices) installed at fixed positions (fixed points) in public facilities, commercial facilities, residences, and the like to performing imaging of a subject regardless of day or night are widely used. The surveillance camera for both of day and night (also referred to as a day and night function) usually captures a visible light image of a subject at daytime and captures a near-infrared light image of the subject at nighttime. That is, the surveillance camera for both of day and night is capable of imaging not only light in a wavelength band of visible light, but also light in a wavelength band of near-infrared light (see JP2010-230776A).

On the other hand, JP2013-038562A describes an imaging device that performs a point image restoration process on an image obtained by imaging using a restoration filter generated on the basis of optical characteristics of an optical system according to imaging conditions. Further, JP2008-268868A describes an imaging device that simultaneously captures a visible light image and an infrared light image in which the same subject is in focus.

SUMMARY OF THE INVENTION

In the surveillance camera for both of daytime and nighttime described in JP2010-230776A, since a visible light image is captured at daytime and a near-infrared light image is captured at nighttime, there is a problem in that a wavelength of light as an imaging target is switched between daytime and nighttime. Further, in the visible light and the near-infrared light, an image surface position at which an image is formed by an optical system such as a lens may be shifted. Therefore, in a case where a focus position is fixed according to any of wavelengths, there is a problem in that an image is blurred at the other wavelength, and therefore, resolution is different.

In a case where it is assumed that the technologies described in JP2013-038562A and JP2008-268868A described above are applied to a surveillance camera for both day and night and a point image restoration process is performed, it is necessary to switch between types of restoration filters used for the point image restoration process according to whether capturing is capturing of a visible light image or capturing of a near-infrared light image. Further, in this case, it is also necessary to store a restoration filter for both of daytime imaging and nighttime imaging in a memory of the surveillance camera. Therefore, there is a problem in that additional resources for switching between the restoration filters and a memory capacity for storing restoration filters are unnecessarily required. The "resources" described herein refer to a calculation process speed or a memory capacity required for an operation of hardware or software of the imaging device such as the surveillance camera.

The present invention has been made in view of such circumstances, and an object thereof is to provide an imaging device capable of reducing resources required for a point image restoration process, and an image processing method and a program for the imaging device.

An imaging device for achieving the object of the present invention is an imaging device, comprising: an image acquisition unit that acquires image data obtained by imaging of an imaging element capable of imaging a subject with sensitivity to a wavelength band of visible light and a wavelength band of near-infrared light via an optical system; and a point image restoration processing unit that performs a point image restoration process using a restoration filter on the image data acquired by the image acquisition unit, the point image restoration processing unit performing the point image restoration process using a common restoration filter on the image data of the subject captured with sensitivity to the wavelength band of the visible light by the imaging element and the image data of the subject captured with sensitivity to the wavelength band of the near-infrared light by the imaging element, wherein the common restoration filter is calculated on the basis of average optical characteristics of the optical system obtained by performing weighted averaging of first optical characteristics with respect to the visible light of the optical system and second optical characteristics with respect to the near-infrared light of the optical system.

According to the present invention, it is not necessary to switch between a restoration filter used for a point image restoration process for image data of a subject imaged with sensitivity to the wavelength band of visible light and a restoration filter used for a point image restoration process for image data of a subject imaged with sensitivity to the wavelength band of near-infrared light, and it is not necessary to secure a memory capacity for storing these restoration filters.

Further, in the imaging device capable of imaging light in the wavelength band of the visible light and the wavelength band of the near-infrared light, an image surface position at which images of the visible light, the light in a transition region between infrared light and visible light, and the infrared light are formed by an optical system such as a lens may be shifted. Therefore, in a case where a focus position is fixed according to any one of the visible light and the near-infrared light, there is a problem in that an image is blurred at the other wavelength and the resolution is different. According to the present invention for resolving such a problem, it is possible to restore the image into a high resolution image by performing a point image restoration process using a restoration filter.

The imaging device according to another aspect of the present invention further comprises a near-infrared light emitting unit that emits near-infrared light as auxiliary light in a case where imaging is performed with the sensitivity to the wavelength band of the near-infrared light by the imaging element. Accordingly, it is possible to obtain clear image data of a subject even when imaging is performed in a dark state (under low illuminance) at nighttime.

The imaging device according to yet another aspect of the present invention further comprises an Infrared cut filter that is arranged in an imaging optical path to the imaging element in a case where imaging is performed with the sensitivity to the wavelength band of the visible light by the imaging element, and is retracted from the imaging optical path in a case where imaging is performed with the sensitivity to the wavelength band of the near-infrared light by the imaging element. Thus, in a case where imaging of a subject is performed with sensitivity to the wavelength band of the visible light, it is possible to shield infrared light (including near-infrared light) incident on the imaging element using the infrared cut filter.

In the imaging device according to yet another aspect of the present invention, the first optical characteristics are optical characteristics of the optical system with respect to each of beams of the visible light with a plurality of colors included in the wavelength band of the visible light, the common restoration filter is calculated on the basis of the average optical characteristics obtained by performing weighted averaging of the first optical characteristics for each of the plurality of colors and the second optical characteristics, and the point image restoration processing unit perform the point image restoration process using a common restoration filter on brightness-based image data that is image data regarding brightness generated on the basis of the image data. Accordingly, since it is possible to reduce a load of a calculation process as compared with a case where a point image restoration process is performed using a restoration filter different for image data of a plurality of colors, it is possible to reduce resources required for the point image restoration process.

In the imaging device according to yet another aspect of the present invention, the imaging element includes first pixels of a plurality of colors having sensitivity to the wavelength band of visible light, and the average optical characteristics are obtained by performing weighted averaging of the first optical characteristics for each of the plurality of colors and the second optical characteristics on the basis of a first weight for the first optical characteristics, a second weight for the second optical characteristics, and an appearance frequency of each color of the first pixels. Accordingly, the average optical characteristics reflecting the appearance frequency of each color of the first pixels are obtained.

The imaging element includes the first pixels, and second pixels having sensitivity to the wavelength band of the near-infrared light, and a pixel pitch between pixels of the same color in the first pixels of the imaging element and a pixel pitch of the second pixels are the same. Accordingly, it is possible to perform the point image restoration process using the common restoration filter on the image data obtained by the first pixel and the image data obtained by the second pixel.

In the imaging device according to yet another aspect of the present invention, the imaging element includes first pixels of a plurality of colors having sensitivity to the wavelength band of visible light, the first optical characteristics are optical characteristics of the optical system with respect to each of beams of the visible light with a plurality of colors included in the wavelength band of the visible light, the second optical characteristics are optical characteristics of the optical system for each color pixel of the first pixels with respect to the near-infrared light to which each first pixel of the plurality of colors has sensitivity, the common restoration filter is calculated for each of the plurality of colors on the basis of the average optical characteristics of each of the plurality of colors obtained by performing weighted averaging of the first optical characteristics of each of the plurality of colors and the second optical characteristics of each of the plurality of colors, and the point image restoration processing unit performs, for each of the plurality of colors, the point image restoration process on the image data of each of the plurality of colors obtained by the first pixels of the plurality of colors using the common restoration filter of each of the plurality of colors. Accordingly, it is possible to reduce deterioration of image quality of restored image data obtained through the point image restoration process as compared with a case where a point image restoration process is performed on the brightness-based image data.

In the imaging device according to yet another aspect of the present invention, the average optical characteristics of each of the plurality of colors are obtained by performing weighted averaging of the first optical characteristics and the second optical characteristics for each of the plurality of colors on the basis of a first weight for the first optical characteristic, a second weight for the second optical characteristics, and sensitivity characteristics indicating sensitivity to a wavelength of the visible light and the near-infrared light of the first pixels of the plurality of colors. Accordingly, the average optical characteristics reflecting the sensitivity characteristics of the first pixels of a plurality of colors can be obtained.

In the imaging device according to yet another aspect of the present invention, the imaging element includes first pixels of a plurality of colors having sensitivity to the wavelength band of the visible light, and second pixels having sensitivity to the wavelength band of the near-infrared light, the common restoration filter is calculated on the basis of the average optical characteristics obtained by performing weighted averaging of the first optical characteristics of the optical system corresponding to red light in the visible light and the second optical characteristics, and the point image restoration processing unit performs a point image restoration process using the common restoration filter on the image data obtained by the first pixel of red among the plurality of colors and the image data obtained by the second pixel. Accordingly, since it is possible to perform the point image restoration process using the common restoration filter on the image data obtained by the first pixel and the image data obtained by the second pixel, it is possible to reduce resources required for the point image restoration process.

In the imaging device according to yet another aspect of the present invention, a pixel pitch between pixels of the same color in the first pixels of the imaging element and a pixel pitch of the second pixels are the same. Accordingly, it is possible to perform the point image restoration process using the common restoration filter on the image data obtained by the first pixel and the image data obtained by the second pixel.

The imaging device according to yet another aspect of the present invention further comprises: a light quantity ratio detection unit that detects a light quantity ratio of the visible light and the near-infrared light incident on the imaging element; an optical characteristic storage unit that stores the first optical characteristics and the second optical characteristics; and a restoration filter generation unit that generates the common restoration filter on the basis of the average optical characteristics obtained by performing the weighted averaging of the first optical characteristics and the second optical characteristics stored in the optical characteristic storage unit, wherein the restoration filter generation unit adjusts a first weight for the first optical characteristics and a second weight for the second optical characteristics when the weighted averaging is performed according to a result of the detection of the light quantity ratio detection unit. Accordingly, it is possible to calculate the average optical characteristics with an appropriate first weight and an appropriate second weight according to an environment in which the surveillance camera is installed.

An image processing method of an imaging device for achieving the object of the present invention comprises: an image acquisition step of acquiring image data obtained by imaging of an imaging element capable of imaging a subject with sensitivity to a wavelength band of visible light and a wavelength band of near-infrared light via an optical system; and a point image restoration processing step of performing a point image restoration process using a restoration filter on the image data acquired in the image acquisition step, the point image restoration processing step including performing a point image restoration process using a common restoration filter on the image data of the subject captured with sensitivity to the wavelength band of the visible light by the imaging element and the image data of the subject captured with sensitivity to the wavelength band of the near-infrared light by the imaging element, wherein the common restoration filter is calculated on the basis of average optical characteristics of the optical system obtained by performing weighted averaging of first optical characteristics with respect to the visible light of the optical system and second optical characteristics with respect to the near-infrared light of the optical system.

A non-transitory computer readable recording medium storing a program for achieving the object of the present invention is a program for a computer of an imaging device performing a point image restoration process on image data obtained by imaging of an imaging element capable of imaging a subject with sensitivity to a wavelength band of visible light and a wavelength band of near-infrared light via an optical system, the stored program functions the computer as: an image acquisition unit that acquires the image data obtained by imaging of the imaging element; a point image restoration processing unit that performs a point image restoration process using a restoration filter on the image data acquired by the image acquisition unit, the point image restoration processing unit performing the point image restoration process using a common restoration filter on the image data of the subject captured with sensitivity to the wavelength band of the visible light by the imaging element and the image data of the subject captured with sensitivity to the wavelength band of the near-infrared light by the imaging element, the common restoration filter being calculated on the basis of average optical characteristics obtained by performing weighted averaging of first optical characteristics with respect to the visible light of the optical system and second optical characteristics with respect to the near-infrared light of the optical system.

An imaging device for achieving the object of the present invention comprises: an image acquisition unit that acquires image data obtained by imaging of an imaging element capable of imaging a subject with sensitivity to a wavelength band of visible light and a wavelength band of near-infrared light via an optical system; and a point image restoration processing unit that performs a point image restoration process using a restoration filter based on optical characteristics of the optical system on the image data acquired by the image acquisition unit, wherein the point image restoration processing unit performs the point image restoration process using the restoration filter based on optical characteristics of the optical system with respect to red light in a red wavelength band in the visible light on the image data of the subject captured with sensitivity to the wavelength band of the near-infrared light by the imaging element.

According to the present invention, a restoration filter based on optical characteristics of the optical system with respect to red light in a red wavelength band can be used instead, as a restoration filter used for a point image restoration process for image data obtained by imaging a subject with sensitivity to the wavelength band of the near-infrared light.

In the imaging device according to yet another aspect of the present invention, the imaging element includes first pixels having sensitivity to the wavelength band of the visible light and second pixels having sensitivity to the wavelength band of the near-infrared light. Accordingly, it is possible to image a subject with sensitivity to the wavelength band of the visible light and the wavelength band of the near-infrared light.

In the imaging device according to yet another aspect of the present invention, a pixel pitch between pixels of the same color in the first pixels of the imaging element and a pixel pitch of the second pixels are the same. Accordingly, it is possible to perform the point image restoration process using the common restoration filter on the image data obtained by the first pixel and the image data obtained by the second pixel.

The imaging device according to yet another aspect of the present invention further comprises: an Infrared cut filter that is arranged in an imaging optical path to the imaging element in a case where imaging is performed with the sensitivity to the wavelength band of the visible light by the imaging element, and is retracted from the imaging optical path in a case where imaging is performed with the sensitivity to the wavelength band of the near-infrared light by the imaging element.

In the imaging device according to yet another aspect of the present invention, the restoration filter calculated on the basis of the optical characteristics of the optical system with respect to the red light is generated on the basis of the optical characteristics of the optical system with respect to the red light or generated on the basis of a result of performing a calculation process on the optical characteristics.

An image processing method of an imaging device for achieving the object of the present invention comprises: an image acquisition step of acquiring image data obtained by imaging of an imaging element capable of imaging a subject with sensitivity to a wavelength band of visible light and a wavelength band of near-infrared light via an optical system; and a point image restoration processing step of performing a point image restoration process on the image data acquired in the image acquisition step using a restoration filter based on optical characteristics of the optical system, wherein the point image restoration processing step includes performing the point image restoration process using the restoration filter based on optical characteristics of the optical system with respect to red light in a red wavelength band in the visible light on the image data of the subject captured with sensitivity to the wavelength band of the near-infrared light by the imaging element.

A non-transitory computer readable recording medium storing a program for achieving the object of the present invention is a program for a computer of an imaging device performing a point image restoration process on image data obtained by imaging of an imaging element capable of imaging a subject with sensitivity to a wavelength band of visible light and a wavelength band of near-infrared light via an optical system, the stored program functions the computer as: an acquisition unit that acquires the image data obtained by imaging of the imaging element; and a point image restoration processing unit that performs a point image restoration process on the image data acquired by the image acquisition unit using a restoration filter based on optical characteristics of the optical system, the point image restoration processing unit performing the point image restoration process using the restoration filter based on optical characteristics of the optical system with respect to red light in a red wavelength band in the visible light on the image data of the subject captured with sensitivity to the wavelength band of the near-infrared light by the imaging element.

The imaging device, and the image processing method and the program for the imaging device according to the present invention can reduce the resources required for a point image restoration process.

BRIEF DESCRIPTION OF THE DRAWINGS

FIG. 2 is a block diagram illustrating a functional configuration example of a surveillance camera and illustrating a state in which imaging is performed at nighttime.

DESCRIPTION OF THE PREFERRED EMBODIMENTS

Overall Configuration of Surveillance Camera of First Embodiment

Figure 1:
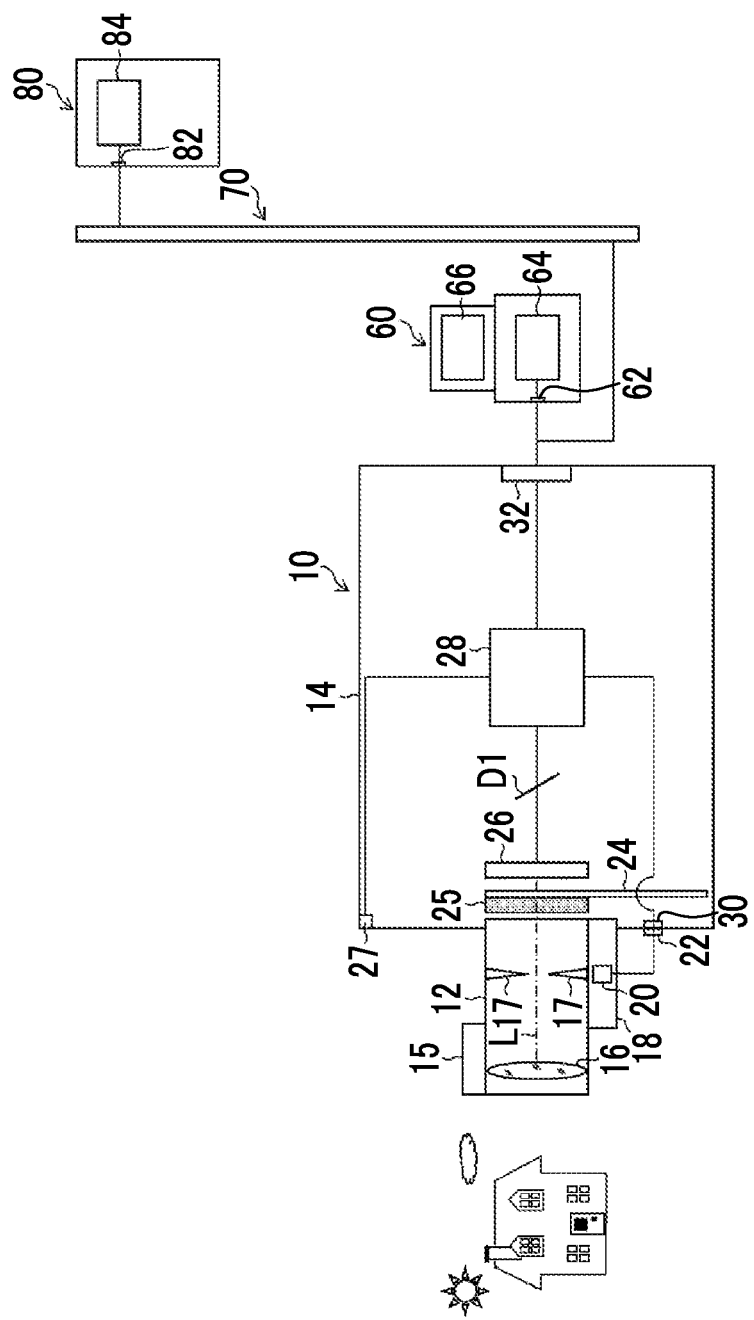
FIG. 1 is a block diagram illustrating a functional configuration example of a surveillance camera, and illustrating a state in which imaging is performed at daytime.

FIG. 1 is a block diagram illustrating a functional configuration example of a surveillance camera 10 used for both day and night, and illustrates a state in which imaging is performed at daytime. FIG. 2 is a block diagram illustrating a functional configuration example of the surveillance camera 10, and illustrates a state in which imaging is performed at nighttime. Here, "daytime" and "nighttime" as used herein do not necessarily define a specific time zone, and each of "daytime" and "nighttime" may include dawn or twilight.

As illustrated in FIGS. 1 and 2, a surveillance camera 10 corresponding to the imaging device of the present invention is a type of digital camera, and is installed at a fixed position (a fixed point) in public facilities, commercial facilities, residences, and the like. The surveillance camera 10 captures a visible light image of a subject (surveillance area) at daytime and captures a near-infrared light image of the subject at nighttime, thereby performing imaging of the subject regardless of day and night. Further, the surveillance camera 10 is connected to a computer 60 such as a personal computer and outputs image data obtained by imaging the subject to the computer 60.

Here, the near-infrared light image is an image obtained by imaging the subject with sensitivity at least in a wavelength band of the near-infrared light. The wavelength band of the near-infrared light (near-infrared region) is not particularly limited, but is in a range of 700 nm to 2500 nm. Further, the visible light image is an image obtained by imaging the subject with sensitivity to a wavelength band (generally 380 nm to 780 nm) of the visible light.

The surveillance camera 10 includes a lens unit 12 and a camera body 14. An appearance of the surveillance camera 10 is not limited to the appearance illustrated in FIGS. 1 and 2 and, for example, the lens unit 12 and the camera body 14 may be covered with a transparent dome.

The lens unit 12 is provided on a front surface of the camera body 14. The lens unit 12 includes a near-infrared light emitting unit 15, a lens 16 including a focus lens, a zoom lens, or the like, a aperture 17, and a lens driving unit 18 that drives the lens 16 and the aperture 17.

The near-infrared light emitting unit 15 emits near-infrared light as auxiliary light toward a subject when nighttime imaging is performed by the surveillance camera 10. Accordingly, even in a case where imaging is performed in a dark state of nighttime (under low illuminance) by the surveillance camera 10, image data of a clear near-infrared light image of the subject can be obtained.

The lens 16 has realistic transmittance from the visible light to the near-infrared region, and a day and night lens in which a chromatic aberration (magnification chromatic aberration) of visible light and near-infrared light has been optically corrected may be used. In general, even in a lens of both day and night, complete chromatic aberration correction up to a near-infrared region is not realistic, and the aberration remains due to restrictions such as the number of lenses. The lens driving unit 18 includes a lens unit controller 20, and an actuator (not illustrated) that drives the lens 16 and the aperture 17.

The lens unit controller 20 is electrically connected to the camera body 14 via a lens unit input and output unit 22 provided in the camera body 14. The lens unit controller 20 drives the lens 16 and the aperture 17 using the above-described actuator on the basis of a control signal input from the camera body 14. Accordingly, focus control and zoom control by a lens movement of the lens 16, and an aperture value control of the aperture 17 are performed.

In addition to the above-described lens unit input and output unit 22, the camera body 14 includes a filter driving unit 24, an infrared (IR) cut filter 25, an imaging element 26, an illuminance sensor 27, a camera body controller 28, a camera body input and output unit 30, and an input and output interface 32.

The IR cut filter 25 is a filter that blocks infrared light including near-infrared light. The IR cut filter 25 constitutes the optical system of the present invention together with the lens 16 and the aperture 17 of the lens unit 12. The IR cut filter 25 can be inserted into an imaging optical path L of the lens unit 12 by the filter driving unit 24 or can be retracted from the imaging optical path L. Here, the imaging optical path L is an optical path until light incident on the lens unit 12 reaches an imaging element 26 to be described below. In this embodiment, although the IR cut filter 25 is provided in the camera body 14, the IR cut filter 25 may be provided in the lens unit 12.

Under the control of the camera body controller 28, the filter driving unit 24 inserts the IR cut filter 25 into the imaging optical path L at the time of capturing of a visible light image of the subject, and retracts the IR cut filter 25 from the imaging optical path L at the time of capturing of the near-infrared light image of the subject. Accordingly, it is possible to block infrared light incident on the imaging element 26, which will be described below, at the time of capturing of the visible light image. A type of the IR cut filter 25 is not particularly limited and, for example, a near-infrared light cut filter that blocks near-infrared light may be used.

As the imaging element 26, a charge coupled device (CCD) type imaging element of a single plate type (also referred to as a single plate scheme), a complementary metal oxide semiconductor (CMOS) type imaging element, or the like may be used. The imaging element 26 images the subject through the lens unit 12 and outputs image data of the subject to the camera body controller 28.

Figure 3A:
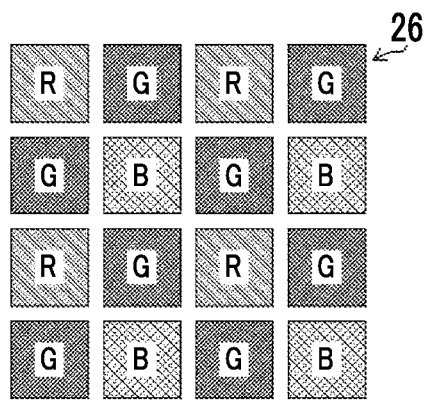
FIG. 3A is an enlarged view of pixels provided on an imaging surface of an imaging element.
Figure 3B:
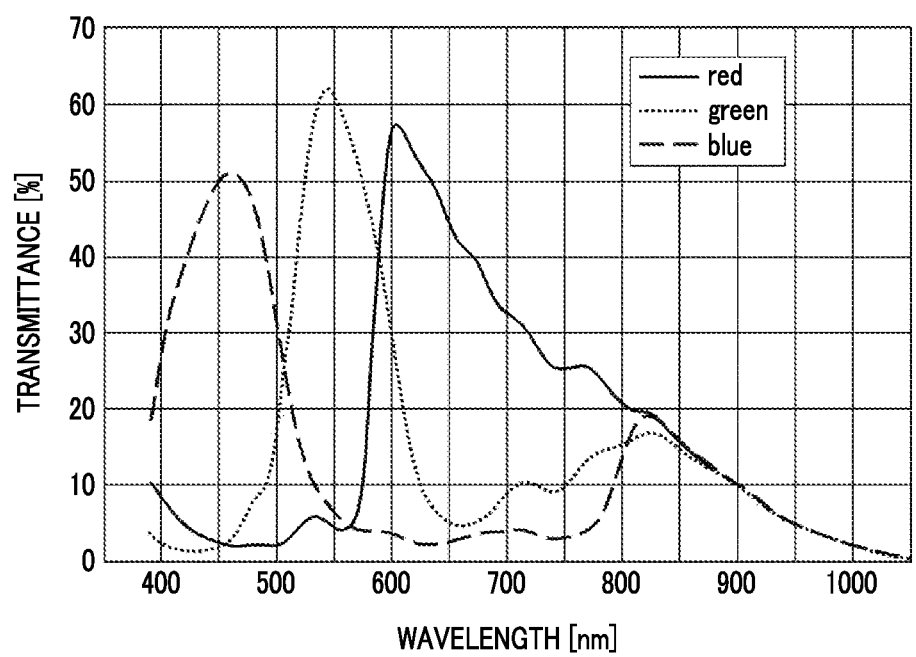
FIG. 3B is an illustrative diagram illustrating spectral transmittance characteristics of color filters of the pixels illustrated in FIG. 3A.

FIG. 3A is an enlarged view of a pixel provided on an imaging surface of the imaging element 26. FIG. 3B is an illustrative diagram illustrating spectral transmittance characteristics of a color filter of the pixel illustrated in FIG. 3A.

As illustrated in FIG. 3A, pixels of a plurality of colors are arranged in a matrix form on the imaging surface of the single plate type imaging element 26. Each pixel includes a microlens and a red (R), green (G: Green) or blue (B: blue) color filter, and a photoelectric conversion unit (such as a photodiode). The RGB color filter has a filter array of a predetermined pattern, such as a Bayer array. "R", "G", and "B" in FIG. 3A are an R pixel, a G pixel, and a B pixel (hereinafter referred to as RGB pixels) each having a RGB color filter, and correspond to first pixels of a plurality of colors of the present invention.

As illustrated in FIG. 3B, each of the RGB pixels also has sensitivity in a near-infrared region as well as a wavelength band of visible light, and particularly, a wavelength band (800 nm to 900 nm in this embodiment) of near-infrared light that is emitted by the near-infrared light emitting unit 15. Therefore, the RGB pixel functions as an IR pixel at the time of capturing of the near-infrared light image (in a second imaging mode to be described below). That is, the imaging element 26 is capable of capturing a visible light image and an near-infrared light image of a subject.

Referring back to FIGS. 1 and 2, the surveillance camera 10 has a first imaging mode corresponding to daytime imaging, and a second imaging mode corresponding to nighttime imaging as imaging modes for imaging a subject. Switching between the imaging modes of the surveillance camera 10 is executed by the camera body controller 28.

In the first imaging mode, the imaging element 26 images the subject through the lens unit 12 in a state in which the IR cut filter 25 is inserted into the imaging optical path L, and outputs first image data D1 [RAW image (Raw image format) data] indicating a visible light image (color image) of the subject. The first image data D1 includes R image data obtained from the R pixel, G image data obtained from the G pixel, and B image data obtained from the B pixel. The R image data, the G image data, and the B image data are hereinafter referred to as "RGB image data". In the first imaging mode, other conditions are optional as long as the IR cut filter 25 is inserted into the imaging optical path L.

Further, in the second imaging mode, the imaging element 26 images the subject through the lens unit 12 in a state in which the IR cut filter 25 is retracted from the imaging optical path L, and outputs second image data D2 (RAW image data) including a near-infrared light image (monochrome image) of the subject. Here, the "second image data D2 including the near-infrared light image" refers to the second image data D2 obtained by the imaging of the visible light as well as the near-infrared light, in which incidence of the visible light on the imaging element 26 is not zero according to a time zone or a surrounding environment even at the nighttime. However, since the light quantity of visible light is reduced in nighttime imaging and the near-infrared light emitting unit 15 emits the near-infrared light as auxiliary light more in this embodiment, the amount of the visible light incident on the imaging element 26 is greatly less than the amount of the near-infrared light. Therefore, the second image data D2 has no color information, and can be regarded as monochromatic image data including brightness information (brightness signal).

The illuminance sensor 27 detects illuminance of the subject (surveillance area) imaged by the surveillance camera 10, and outputs a result of the illuminance detection to the camera body controller 28. The illuminance detection result of the illuminance sensor 27 is used for, for example, switching between ON and OFF of emission of the near-infrared light in the near-infrared light emitting unit 15, switching between insertion and retraction of the IR cut filter 25, and switching of the imaging mode described above.

The camera body controller 28 includes, for example, various calculation units including a central processing unit (CPU), a processing unit, and a storage unit (memory), and generally controls the entire operation or process of the surveillance camera 10.

Figure 4:
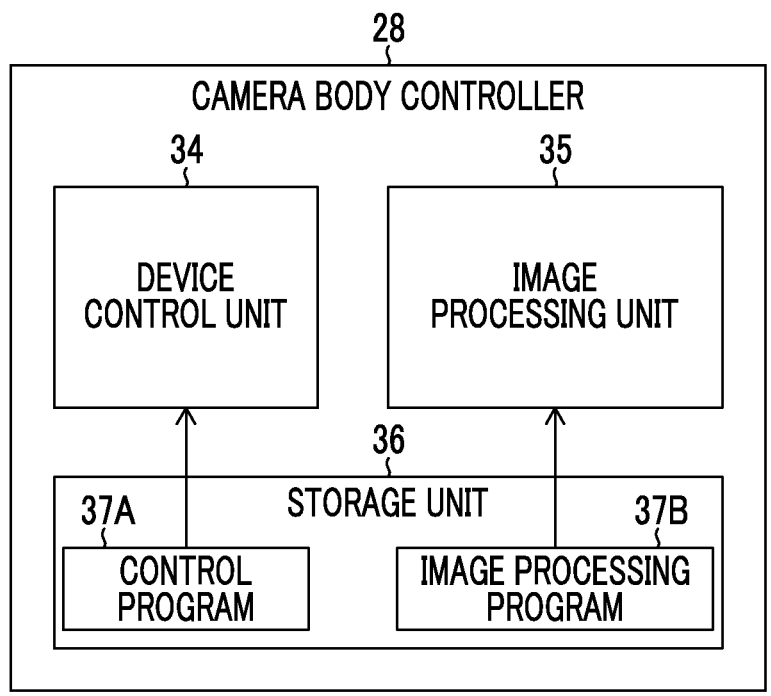
FIG. 4 is a block diagram illustrating an electrical configuration of a camera body controller.

FIG. 4 is a block diagram illustrating an electrical configuration of the camera body controller 28. As illustrated in FIG. 4, the camera body controller 28 includes a device control unit 34, an image processing unit 35, and a storage unit 36.

The device control unit 34 executes a control program 37A read from the storage unit 36 to control an operation of each unit of the surveillance camera 10. For example, the device control unit 34 generates a control signal for controlling the lens unit 12, and transmits the control signal from the camera body input and output unit 30 to the lens unit controller 20 (see FIGS. 1 and 2). Thus, the focus control and zoom control described above, and aperture value control of the aperture 17 are executed. Further, the device control unit 34 controls image processing of the imaging element 26 and process of outputting image data.

Further, the device control unit 34 controls each of switching of the imaging mode, switching between ON and OFF of emission of the near-infrared light in the near-infrared light emitting unit 15, and switching between insertion and retraction of the IR cut filter 25 on the basis of the illuminance detection result of the illuminance sensor 27.

For example, the device control unit 34 determines "daytime" if the illuminance detection result is equal to or greater than a predetermined threshold value and switches the imaging mode to the first imaging mode. Thus, the first image data D1 is obtained by the imaging of the imaging element 26. On the other hand, the device control unit 34 determines "nighttime" if the illuminance detection result is smaller than the predetermined threshold value and switches the imaging mode to the second imaging mode. Thus, the second image data D2 is obtained by the imaging of the imaging element 26.

Thus, the device control unit 34 alternately switches the imaging mode to the first imaging mode and second imaging mode according to repetition of "daytime", "nighttime", "daytime", "nighttime", . . . that are determined from the illuminance detection result.

Further, in a case where the device control unit 34 switches the imaging mode to the first imaging mode, the device control unit 34 controls the near-infrared light emitting unit 15 to turn OFF the emission of near-infrared light and controls the filter driving unit 24 to cause the IR cut filter 25 to be inserted into the imaging optical path L. Conversely, in a case where the device control unit 34 switches the imaging mode to the second imaging mode, the device control unit 34 controls the near-infrared light emitting unit 15 to turn ON the emission of near-infrared light and controls the filter driving unit 24 to cause the IR cut filter 25 to be retracted from the imaging optical path L.

The device control unit 34 of this embodiment performs switching of the imaging mode on the basis of the illuminance detection result of the illuminance sensor 27, but an imaging mode switching condition is not limited to the illuminance detection result and may be changed as appropriate. For example, a predetermined time zone ("daytime" is 6:00 AM to 6:00 PM and "nighttime" is 6:00 PM to 6:00 AM) is set as the imaging mode switching condition, and the switching of the imaging mode may be performed according to the time zone.

The image processing unit 35 executes an image processing program 37B read from the storage unit 36 to perform image processing which will be described below on the image data (the first image data D1 and the second image data D2) that is input from the imaging element 26. The image processing unit 35 outputs the image data after image processing to the input and output interface 32 (see FIGS. 1 and 2).

The image processing program 37B corresponds to a program of the present invention. Although described in detail below, the image processing program 37B causes the image processing unit 35 constituting a part of the computer of the surveillance camera 10 to function as a plurality of processing units including an image acquisition unit 39 and a point image restoration processing unit 44 (see FIG. 5).

Referring back to FIGS. 1 and 2, the input and output interface 32 is wiredly or wirelessly connected to an external device (the computer 60 or the like), and outputs the image data after image processing to the computer 60 or the like. A format of the image data sent to the computer 60 or the like is not particularly limited, and may be an arbitrary format.

The computer 60 is connected to the surveillance camera 10 via the input and output interface 32 of the camera body 14 and a computer input and output unit 62, and receives data such as image data transmitted from the surveillance camera 10. The computer 60 includes a computer controller 64, and a display 66.

The computer controller 64 performs overall control of the computer 60 to perform image processing on the image data from the surveillance camera 10, and controls communication with a server 80 or the like connected to the computer input and output unit 62 via a network line such as the Internet 70. The display 66 displays the image input from the surveillance camera 10.

The server 80 includes a server input and output unit 82 and a server controller 84. The server output unit 82 constitutes a transmission and reception connection unit for the external device such as the computer 60, and is connected to the computer input and output unit 62 of the computer 60 via the network line such as the Internet 70. The server controller 84 performs transmission and reception of data to and from the computer controller 64, as necessary, in cooperation with the computer controller 64 according to a control instruction signal from the computer 60, downloads the data to the computer 60 to perform a calculation process, and transmits a result of the calculation to the computer 60.

The communication among the surveillance camera 10, the computer 60, and the server 80 may be any of wired communication and wireless communication. Further, the computer 60 and the server 80 may be integrally formed or either or both of the computer 60 and the server 80 may be omitted. Further, the surveillance camera 10 may have a function of communication with the server 80, and direct transmission and reception of data may be performed between the surveillance camera 10 and the server 80.

[Configuration of Image Processing Unit]

Figure 5:
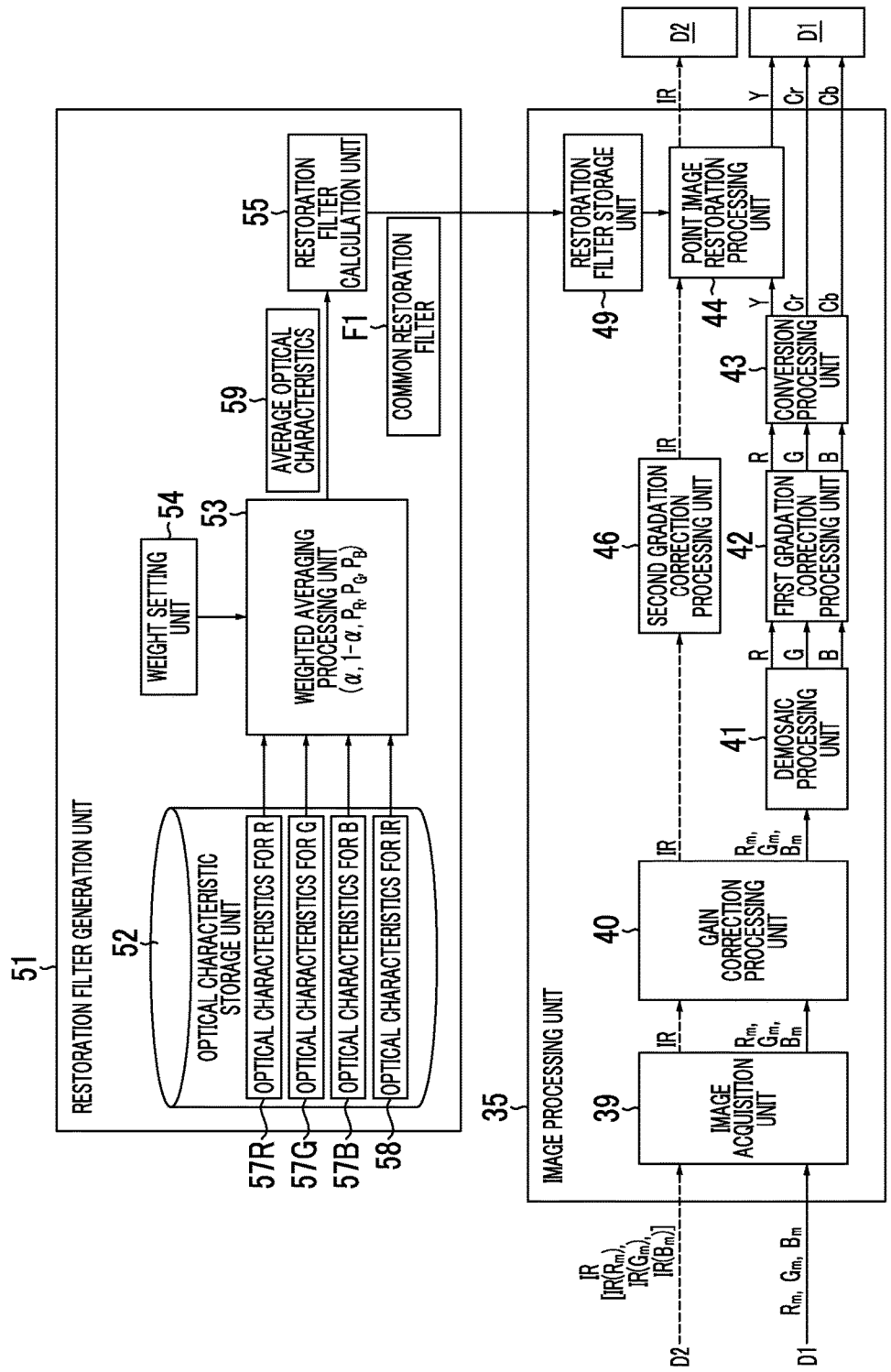
FIG. 5 is a functional block diagram of an image processing unit according to a first embodiment.

FIG. 5 is a functional block diagram of the image processing unit 35. The image processing unit 35 performs image processing on the first image data D1 (RAW image data) input from the imaging element 26 and outputs the first image data D1 after the image processing to the input and output interface 32 in the first imaging mode. Further, the image processing unit 35 performs image processing on the second image data D2 (RAW image data) input from the imaging element 26 and outputs the second image data D2 after the image processing to the input and output interface 32 in the second imaging mode.

The image processing performed on the first image data D1 and the second image data D2 by the image processing unit 35 includes a point image restoration process, in addition to general image processing such as a gain correction process or a gradation correction process. In FIG. 5, a "solid line" indicates a flow of data processing in the first imaging mode, and a "dotted line" indicates a flow of data processing in the second imaging mode (the same applies to other similar drawings).

The image processing unit 35 functions as the image acquisition unit 39, a gain correction processing unit 40, a demosaic processing unit 41, a first gradation correction processing unit 42, a conversion processing unit 43, and a point image restoration processing unit 44 in the first imaging mode by executing the image processing program 37B read from the storage unit 36 described above. Further, the image processing unit 35 functions as the second gradation correction processing unit 46, in addition to the image acquisition unit 39, the gain correction processing unit 40, and the point image restoration processing unit 44 described above in the second imaging mode. That is, in this embodiment, the image acquisition unit 39, the gain correction processing unit 40, and the point image restoration processing unit 44 are common regardless of a type of the imaging mode.

The image acquisition unit 39 acquires the first image data D1 (RAW image data) output from the imaging element 26, and outputs the first image data D1 to the gain correction processing unit 40 in the first imaging mode. The first image data D1 includes mosaic RGB image data corresponding to a color filter array of the single plate type imaging element 26 (indicated as "$R_m$", "$G_m$", and "$B_m$" in the figure).

On the other hand, the image acquisition unit 39 acquires the second image data D2 (RAW image data) output from the imaging element 26 and outputs the second image data D2 to the gain correction processing unit 40 in the second imaging mode. As described above, since the RGB pixels of the second imaging element 26 (see FIG. 3A) functions as the IR pixels in the imaging mode, the second image data D2 is IR image data of one surface (non-mosaic shape) (indicated by IR in the figure).

Here, the IR image data of one surface includes the mosaic $IR(R_m)$ image data obtained from the R pixel, the mosaic $IR(G_m)$ image data obtained from the G pixel, and the mosaic $IR(B_m)$ image data obtained from the B pixel (indicated by IR(Rm), IR(Gm), and IR(Bm) in the figure).

The gain correction processing unit 40 functions as a gain correction processing unit that adjusts white balance (WB) for the mosaic RGB image data input from the image acquisition unit 39 in the first imaging mode. Specifically, the gain correction processing unit 40 multiplies the RGB image data by a WB gain set for each color of RGB to perform white balance correction of the RGB image data. The gain correction processing unit 40 outputs the RGB image data after the white balance correction to the demosaic processing unit 41.

On the other hand, the gain correction processing unit 40 functions as a sensitivity correction processing unit of correcting a sensitivity difference of R pixels, G pixels and B pixels with respect to the near-infrared light in the second imaging mode. Specifically, the gain correction processing unit 40 multiplies respective items of image data by gains for setting cumulative average values of the mosaic $IR(R_m)$, $IR(G_m)$, and $IR(B_m)$ image data respectively output from the RGB pixels to 1:1:1 to correct the respective items of image data. In a case where there is no difference in sensitivity with respect to the near-infrared light in the RGB pixels, the correction of the sensitivity difference in the gain correction processing unit 40 is unnecessary. The gain correction processing unit 40 outputs the IR image data of one surface including the mosaic $IR(R_m)$, $IR(G_m)$, and $IR(B_m)$ image data after the sensitivity difference correction to the second gradation correction processing unit 46.

The demosaic processing unit 41 performs demosaic processing (referred to as a synchronization process) of calculating all color information for each pixel from the mosaic RGB image data input from the gain correction processing unit 40 in the first imaging mode. That is, the demosaic processing unit 41 generates the synchronized image data (illustrated as "R", "G", and "B" in FIG. 3A) of three surfaces of RGB from the mosaic RGB image data (point-sequential RGB image data). The demosaic processing unit 41 outputs the RGB image data after demosaic processing to the first gradation correction processing unit 42.

The first gradation correction processing unit 42 performs a gradation correction process (a gamma correction process or the like) on the RGB image data of three surfaces which is input from the demosaic processing unit 41 in the first imaging mode. For example, the first gradation correction processing unit 42 performs gamma correction corresponding to gamma characteristics on the RGB image data of 12 bits (0 to 4095) to generate RGB color data of 8 bits (0 to 255) (one byte of data). Such a first gradation correction processing unit 42 can include, for example, a look-up table for each of RGB, and performs gamma correction corresponding to each color of the RGB image data. The first gradation correction processing unit 42 outputs the RGB image data after the gradation correction process to the conversion processing unit 43.

The conversion processing unit 43 converts the RGB image data input from the first gradation correction processing unit 42 into the brightness data Y indicating the brightness component and the color difference data Cr, Cb using a predetermined conversion formula in the first imaging mode. The conversion processing unit 43 outputs the brightness data Y after conversion into the point image restoration processing unit 44. The brightness data Y is an image regarding the brightness generated on the basis of the RGB image data, and corresponds to brightness-based image data of the present invention.

The second gradation correction processing unit 46 performs the same gradation correction process (for example, gamma correction process) as the gradation correction process in the first gradation correction processing unit 42 on the IR image data input from the gain correction processing unit 40 in the second imaging mode. For example, the second gradation correction processing unit 46 may include a look-up table for the near-infrared light, and performs gamma correction corresponding to gamma characteristics on the input 12-bit IR image data to generate 8-bit IR image data. The second gradation correction processing unit 46 outputs the IR image data after the gradation correction process to the point image restoration processing unit 44. The IR image data is brightness-based image data that is the same as the brightness data Y described above.

The point image restoration processing unit 44 performs the point image restoration process on the brightness data Y input from the conversion processing unit 43 in the first imaging mode and the IR image data input from the second gradation correction processing unit 46 in the second imaging mode using one type of common restoration filter F1 stored in the restoration filter storage unit 49.

The point image restoration process is a process of obtaining optical characteristics indicating deterioration due to aberrations or the like of an optical system (for example, the lens 16, the aperture 17, and the IR cut filter 25) of the surveillance camera 10 in advance, and restoring a captured image (deterioration image) to be a high resolution image using a restoration (recovery) filter generated on the basis of optical characteristics described above.

Figure 6:
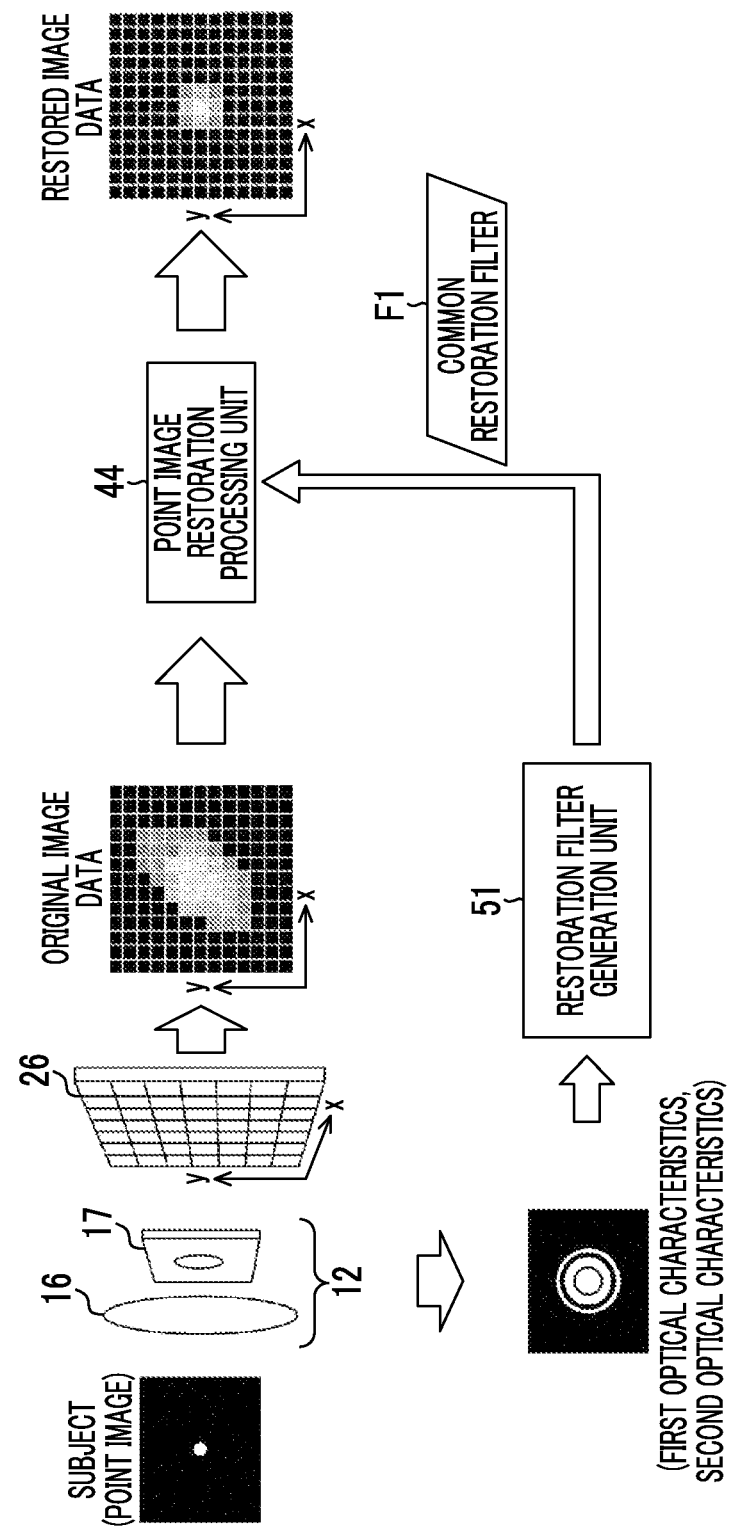
FIG. 6 is an illustrative diagram illustrating a point image restoration process.

FIG. 6 is an illustrative diagram illustrating the point image restoration process. In FIG. 6, a case where a point image as a subject is imaged is illustrated.

As illustrated in FIG. 6, in a case where a point image is set as a subject and imaging is performed, a visible light image (first imaging mode) or a near-infrared light image (second imaging mode) of the subject is imaged by the imaging element 26 through the optical system of the surveillance camera 10, and original image data (the first image data D1 or the second image data D2) is output from the imaging element 26.

In this case, the amplitude component and the phase component of the first image data D1 deteriorate due to a point spread phenomenon based on the optical characteristics of the optical system of the surveillance camera 10 for visible light, and an original subject image (point image) becomes a non-point-symmetric blurred image. Here, since the visible light includes light in various wavelength bands, magnification chromatic aberration is generated, and a phase of the RGB image data constituting the first image data D1 it shifted. Further, the amplitude component and the phase component of the second image data D2 (IR image data) deteriorate due to a point spread phenomenon based on the optical characteristics of the optical system of the surveillance camera 10 for the near-infrared light, and the original subject image (point image) becomes a non-point-symmetric blurred image.

In a point image restoration process of the point image restoration processing unit 44, first optical characteristics of the optical system of the surveillance camera 10 for the visible light, and second optical characteristics of the optical system of the surveillance camera 10 for the near-infrared light are acquired or obtained in advance, and a common restoration filter F1 is generated in the restoration filter generation unit 51 to be described below on the basis of the first optical characteristics and the second optical characteristics.

A point spread function (PSF) or an optical transfer function (OTF) is used as the first optical characteristics and the second optical characteristics. The PSF and the OTF are in a Fourier transformation relationship, the PSF is a real function, and the OTF is a complex function. Further, examples of a function having information equivalent to such a function include a modulation transfer function (MTF) or an amplitude transfer function and a phase transfer function (PTF) which indicate an amplitude component and a phase component of the OTF, respectively. A combination of the MTF and the PTF has the amount of information equivalent to the OTF or the PSF.

In general, a convolution type Wiener filter can be used as the restoration filter used for restoration of a blurred image in PSF. The frequency characteristics $d(\omega_x, \omega_y)$ of the restoration filter can be calculated using the following formula by referring to information on OTF obtained by performing Fourier transform on PSF(x, y) and a signal-noise ratio (SNR, which is also referred to as an SN ratio).

$$d(\omega_x, \omega_y) = \frac{H^*(\omega_x, \omega_y)}{\|H^*(\omega_x, \omega_y)\|^2 + 1/SNR(\omega_x, \omega_y)} \quad \text{[General Formula 1]}$$

Here, $\omega_x, \omega_y$ represents a spatial frequency, $H(\omega_x, \omega_y)$ represents the OTF, and $H^*(\omega_x, \omega_y)$ represents complex conjugate thereof. Further, SNR $(\omega_x, \omega_y)$ represents a signal-to-noise ratio (SN ratio). An MTF indicating an amplitude component of the OTF may be used in place of the OTF as $H(\omega_x, \omega_y)$ of [General Formula 1] to calculate the point image restoration filter.

A design of a filter coefficient of the restoration filter is an optimization issue for selecting a coefficient value so that frequency characteristics of the filter is closest to desired Wiener frequency characteristics, and the filter coefficient is calculated using an arbitrary known method, as appropriate. Thus, the restoration filter is obtained using a predetermined amplitude recovery and phase correction filter calculation algorithm from point image information (PSF) of an optical system according to imaging conditions. The point image information of the optical system may vary according to not only a type of lens 16, but also various imaging conditions such as an aperture value, a focal length, a zoom amount, an image height, the number of recording pixels, and a pixel pitch.

The restoration filter is, for example, a filter in a real space including M×N (M and N is an integer equal to or greater than 2) taps and is applied to image data that is a processing target. Thus, it is possible to calculate pixel data after a restoration process by performing weighted average calculation (deconvolution calculation) on a filter coefficient assigned to each tap and corresponding pixel data (processing target pixel data and neighboring pixel data). It is possible to perform the point image restoration process by applying a weighted averaging process using the restoration filter to all of items of pixel data constituting the image data while sequentially changing a target pixel. Thus, the restored image data (brightness data Y and IR image data) is obtained.

Figure 7:
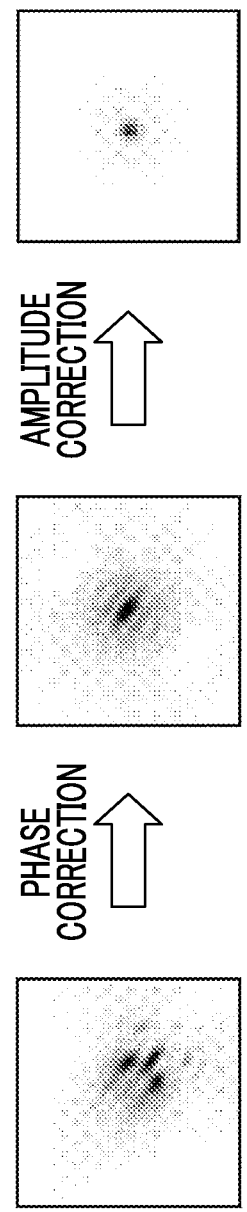
FIG. 7 is an illustrative diagram illustrating phase correction and amplitude correction of the point image restoration process.

FIG. 7 is an illustrative diagram illustrating phase correction and amplitude correction of the point image restoration process. As illustrated in FIG. 7, the point image restoration process can be roughly classified into "phase correction" (also referred to as "phase restoration") and "amplitude correction" (also referred to as "amplitude restoration"). The "phase correction" includes restoration of the phase shift of the RGB image data or the like, and restoration of the phase component due to the shape of the non-point-symmetric point spread function (PSF). The restoration of the phase component due to the shape of the non-point-symmetric point spread function is correction of an asymmetrical point spread shape into a point-symmetric point spread shape. The phase correction for the brightness-based image data such as the brightness data Y or the IR image data described above is restoration of the phase component due to the shape of the non-point-symmetric point spread function (PSF).

The "amplitude correction" is a process of restoring an amplitude component (MTF) of the image data. Through the amplitude correction, it is possible to correct a point spread shape into a point (delta function) in a case where a SN ratio (signal-to-noise ratio) of the imaging system up to a Nyquist frequency is sufficiently great.

Referring back to FIG. 6, generally, it is preferable for the point image restoration process using the restoration filter for visible light generated on the basis of the first optical characteristics described above to be performed on the brightness data Y. Further, it is preferable for the point image restoration process using the restoration filter for near-infrared light generated on the basis of the second optical characteristics described above to be performed on the second image data D2. However, in this case, it is necessary for restoration filters corresponding to two types of imaging modes, and switching to the restoration filter according to the imaging mode or resources such as a capacity of the restoration filter storage unit 49 is unnecessarily required, as described above.

In this embodiment, the restoration filter generation unit 51 generates the common restoration filter F1 applicable to both the brightness data Y (the first image data D1) and the IR image data (the second image data D2) on the basis of the first optical characteristics and the second optical characteristics of the optical system of the surveillance camera 10, and performs the point image restoration process using the common restoration filter F1 on each of the brightness data Y and the IR image data.

<Configuration of Restoration Filter Generation Unit>

Referring back to FIG. 5, the restoration filter generation unit 51 is a computer provided separately from the surveillance camera 10, and generates a common restoration filter F1 on the basis of first optical characteristics and second optical characteristics of the optical system of the surveillance camera 10. The computer 60 or the server 80 (see FIG. 1) described above may be caused to function as the restoration filter generation unit 51 (the same applies to a second embodiment and subsequent embodiments).

The restoration filter generation unit 51 roughly includes optical characteristic storage unit 52, a weighted averaging processing unit 53, a weight setting unit 54, and a restoration filter calculation unit 55.

Optical characteristics 57R for R, optical characteristics 57G for G, and optical characteristics 57B for B corresponding to the first optical characteristics described above, and optical characteristics 58 for IR corresponding to the second optical characteristics described above are stored in the optical characteristic storage unit 52 in advance. The optical characteristics 57R for R are optical characteristics of the optical system of the surveillance camera 10 for the red light (R light) in the red wavelength band in the visible light. The optical characteristics 57G for G are optical characteristics of the optical system of the surveillance camera 10 for the red light (G light) in the green wavelength band in the visible light. The optical characteristics 57B for B are optical characteristics of the optical system of the surveillance camera 10 for the blue light (B light) in the blue wavelength band in the visible light. The optical characteristics 58 for IR are optical characteristics of the optical system of the surveillance camera 10 for the near-infrared light.

Each of the optical characteristics 57R, 57G, and 57B, and 58 is the above-described MTF, OTF (PSF), or the like, and is measured in advance for each type of optical system of the surveillance camera 10. Each of the optical characteristics 57R, 57G, and 57B, and 58 may be acquired via a network line such as the Internet and stored in the optical characteristic storage unit 52.

Figure 8:
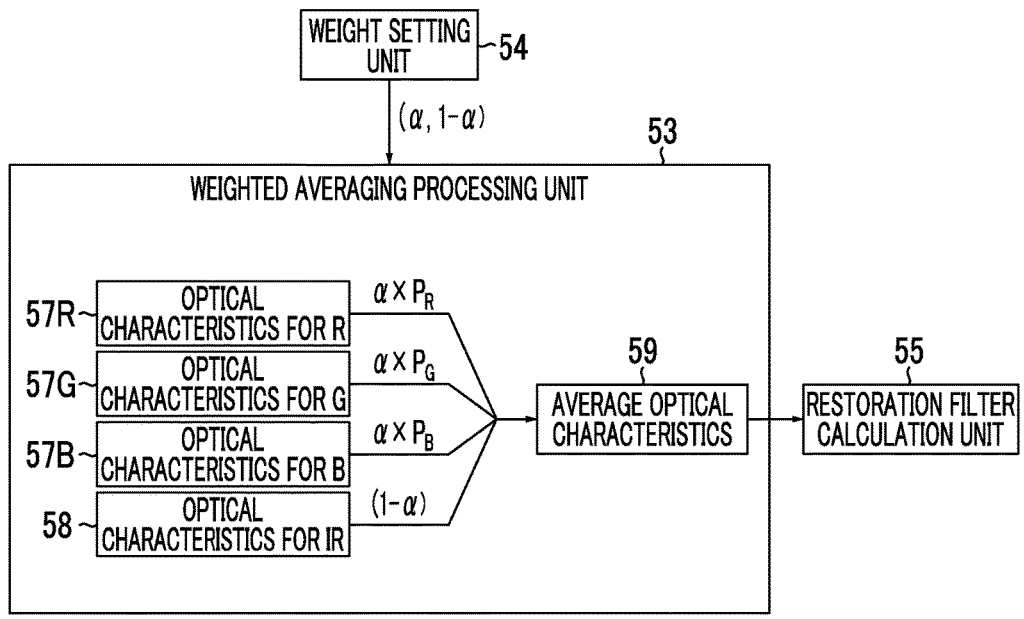
FIG. 8 is an illustrative diagram illustrating a weighted averaging process in a weighted averaging processing unit according to the first embodiment.

FIG. 8 is an illustrative diagram illustrating a weighted averaging process in the weighted averaging processing unit 53. As illustrated in FIG. 8, the weighted averaging processing unit 53 performs weighted averaging of the first optical characteristics (optical characteristics 57R, 57G, and 57B for R, G, and B) and the second optical characteristics (optical characteristics 58 for IR) to calculate the average optical characteristics 59 (such as MTF or OTF (PSF)). Specifically, the weighted averaging processing unit 53 performs weighted averaging of the first optical characteristics and the second optical characteristics on the basis of a first weight α for the first optical characteristics (optical characteristics 57R, 57G and 57B for R, G, and B), a second weight (1−α) for the second optical characteristics (optical characteristics 58 for IR), and appearance frequencies $P_R$, $P_G$, and $P_B$ of RGB pixel.

"α" (where 0≤α<1) defining each of the first weight α and the second weight (1−α) is, for example, a probability of the visible light image being captured in the surveillance camera 10, that is, a probability of the first imaging mode being selected. This "α" may be determined by a percentage of time in which the visible light image is captured by the surveillance camera 10 during a day (a time of the first imaging mode). Further, "α" may be arbitrarily determined according to trade-off between capturing of the visible light image (imaging in the first imaging mode) and capturing of near-infrared light (imaging in the second imaging mode).

Further, "α" may be adjusted so that a result of subjectively evaluating the first image data D1 and the second image data D2 captured by the surveillance camera 10 is best. In this case, an input of "α" to an operation input unit (not illustrated) of the restoration filter generation unit 51 by the user is received, and the weight setting unit 54 sets the first weight α and the second weight (1−α) and inputs the first weight α and the second weight (1−α) to the weighted averaging processing unit 53.

Appearance frequencies $P_R$, $P_G$, and $P_B$ of the RGB pixel are values that satisfy "0≤$P_R$, $P_G$, $P_B$<1" and "$P_R+P_G+P_B=1$" and can be determined, for example, on the basis of a known formula (Y=0.299R+0.587G+0.114B) for calculating the brightness data Y from the RGB image data. In this case, $P_R$=0.299, $P_G$=0.587, and $P_B$=0.114. The appearance frequencies $P_R$, $P_G$, and $P_B$ may be subjectively adjusted in consideration of spectral characteristics of the subject. The above-described weight setting unit 54 receives an input of values of "$P_R$, $P_G$, and $P_B$" to the above-described operation input unit, sets the appearance frequencies of $P_R$, $P_G$, and $P_B$, weights the appearance frequencies $P_R$, $P_G$, and $P_B$, and inputs the appearance frequencies to the weighted averaging processing unit 53.

The weighted averaging processing unit 53 obtains the average optical characteristics 59 represented by the MTF using the following formula in a case where each of the first optical characteristics (optical characteristics 57R, 57G, and 57B for R, G, and B) and the second optical characteristics (optical characteristics 58 for IR) is MTF. Here, in the following formula, "$MTF_R$" is optical characteristics 57R for R, "$MTF_G$" is optical characteristics 57G for "$MTF_B$" is optical characteristics 57B for B, "$MTF_{IR}$" is optical characteristics 58 for IR, and "$MTF_{AVE}$" is average optical characteristics 59.

$$MTF_{AVE}(\omega_x, \omega_y) = \alpha P_R MTF_R(\omega_x, \omega_y) + \alpha P_G MTF_G(\omega_x, \omega_y) + \alpha P_B MTF_B(\omega_x, \omega_y) + (1-\alpha) MTF_{IR}(\omega_x, \omega_y)$$ [General Formula 2]

On the other hand, the average optical characteristics 59 represented by the PSF is equivalent to the average optical characteristics 59 represented by the OTF. Therefore, the weighted averaging processing unit 53 obtains the average optical characteristics 59 represented by the OTF using the following formula. Here, in the following formula, "$OTF_R$" is optical characteristics 57R for R, "$OTF_G$" is the optical characteristics 57G for G, and "$OTF_B$" is the optical characteristics 57B for B, "$OTF_{IR}$" is the optical characteristics 58 for IR", and "$OTF_{AVE}$" is the average optical characteristics 59.

$$OTF_{AVE}(\omega_x, \omega_y) = \alpha P_R OTF_R(\omega_x, \omega_y) + \alpha P_G OTF_G(\omega_x, \omega_y) + \alpha P_B OTF_B(\omega_x, \omega_y) + (1-\alpha) OTF_{IR}(\omega_x, \omega_y) \quad \text{[General Formula 3]}$$

The weighted averaging processing unit 53 outputs the calculated average optical characteristics 59 [MTF or OTF (PSF)] to the restoration filter calculation unit 55. Although not illustrated, the same correction is performed on a position of the PSF in a case where a magnification chromatic aberration correction process is performed on the RGB image data of the first image data D1 before the point image restoration process in the point image restoration processing unit 44 (the same applies to other embodiments).

Referring back to FIG. 5, the restoration filter calculation unit 55 calculates the common restoration filter F1 from [General Formula 1] on the basis of the average optical characteristics 59 [MTF or OTF (PSF)] input from the weighted averaging processing unit 53. On the basis of the average optical characteristics 59 [MTF], the common restoration filter F1 capable of amplitude correction of the brightness data Y and the IR image data is calculated. Further, the restoration filter calculation unit 55 calculates the common restoration filter F1 capable of both amplitude correction and phase correction of the brightness data Y and the IR image data on the basis of the average optical characteristics 59 [OTF (PSF)]. The restoration filter calculation unit 55 stores the common restoration filter F1 in the restoration filter storage unit 49 via a wired or wireless network line or an information recording medium of a memory card.

<Point Image Restoration Process Using Common Restoration Filter>

The point image restoration processing unit 44 performs the point image restoration process (amplitude correction, or the amplitude correction and phase correction) on the brightness data Y input from the conversion processing unit 43 using the common restoration filter F1 read from the restoration filter storage unit 49 in the first imaging mode. Accordingly, the first image data D1 after the image processing including the brightness data Y that is restored image data after the point image restoration process and the color difference data Cr, Cb output from the conversion processing unit 43 is output from the image processing unit 35 to the input and output interface 32 described above.

Further, the point image restoration processing unit 44 performs the point image restoration process (amplitude correction, or the amplitude correction and phase correction) on the IR image data input from the conversion processing unit 43 using the common restoration filter F1 read from the restoration filter storage unit 49 in the second imaging mode. Accordingly, the IR image data that is restored image data after the point image restoration process is output as the second image data D2 after the image processing from the image processing unit 35 to the input and output interface 32 described above.

Operation of Surveillance Camera of First Embodiment

Figure 9:
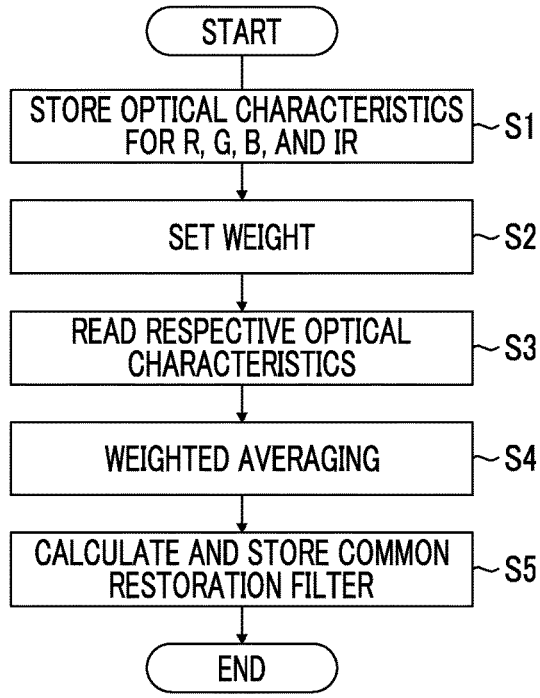
FIG. 9 is a flowchart illustrating a flow of a process of generating a common restoration filter in a restoration filter generation unit according to the first embodiment.
Figure 10:
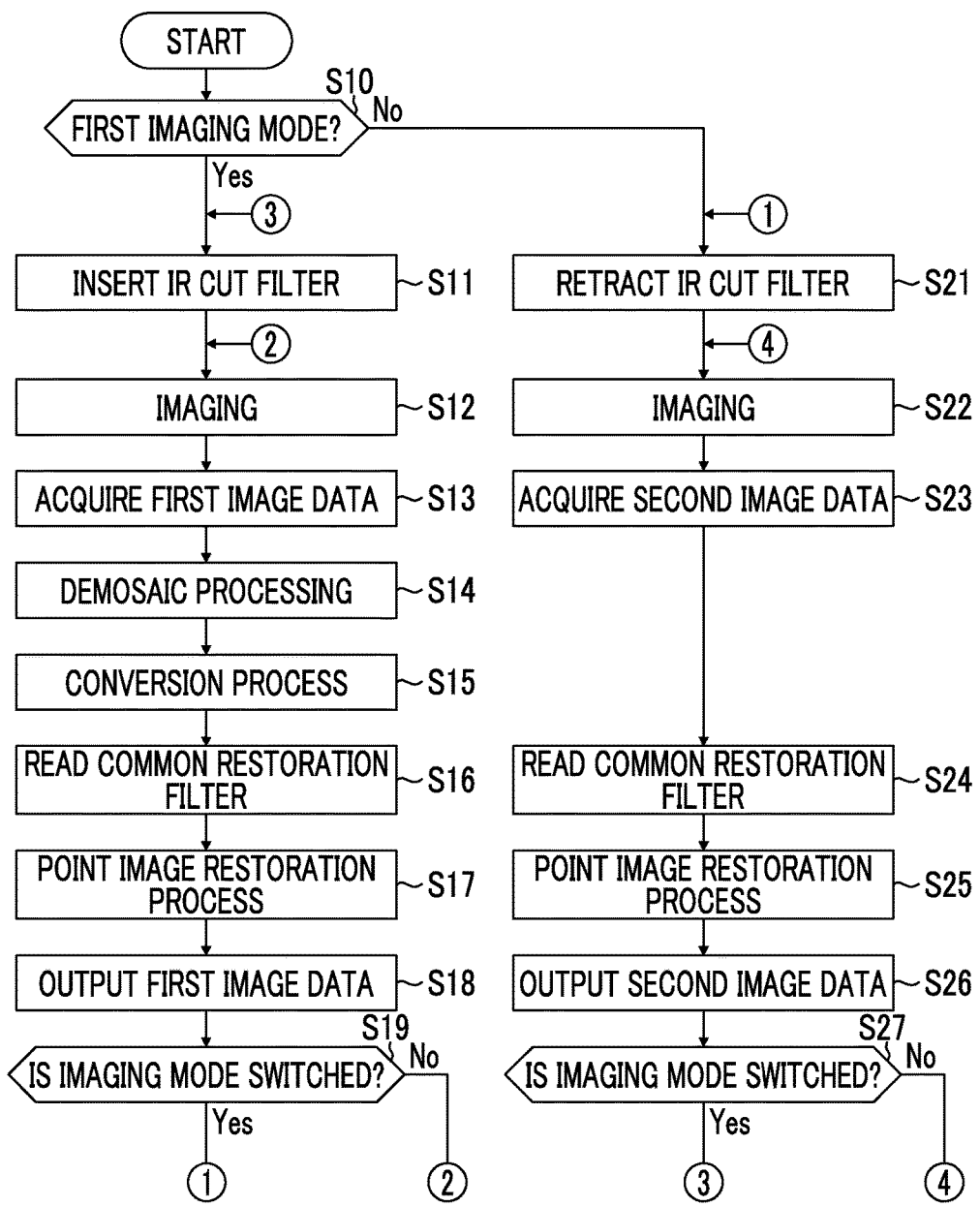
FIG. 10 is a flowchart illustrating a flow of an imaging process and image processing of the surveillance camera according to the first embodiment.

Next, an operation (the image processing method of the imaging device of the present invention) of the surveillance camera 10 having the above configuration will be described with reference to FIGS. 9 and 10. Here, FIG. 9 is a flowchart illustrating a flow of a process of generating the common restoration filter F1 in the restoration filter generation unit 51. Further, FIG. 10 is a flowchart illustrating a flow of an imaging process and image processing in the surveillance camera 10.

<Process of Generating Common Restoration Filter>

The common restoration filter F1 generated by the restoration filter generation unit 51 is stored in the restoration filter storage unit 49 of the surveillance camera 10 in advance. As illustrated in FIG. 9, the restoration filter generation unit 51 measures or acquires the optical characteristics 57R, 57G, and 57B for R, G, and B and the optical characteristics 58 for IR of the optical system of the surveillance camera 10 in advance, and stores the optical characteristics in the optical characteristics storage unit 52 (step S1).

Further, the user inputs the above-described "α" defining the first weight and the second weight to an operation input unit (not illustrated) of the restoration filter generation unit 51. The weight setting unit 54 receives an input of "α", sets the first weight α and the second weight (1−α), and inputs a result of the settings to the weighted averaging processing unit 53 (step S2). Further, in a case where the user changes the appearance frequencies $P_R$, $P_G$, and $P_B$ of the RGB pixel, the user inputs the appearance frequencies $P_R$, $P_G$, and $P_B$ to the above-described operation input unit. The appearance frequencies $P_R$, $P_G$, and $P_B$ are input to the weighted averaging processing unit 53 by the weight setting unit 54.

In a case where the user performs a generation start operation for the common restoration filter F1 in the above-described operation input unit, the weighted averaging processing unit 53 reads the optical characteristics 57R, 57G, and 57B for R, G, and B (first optical characteristics) and the optical characteristics 58 for IR (second optical characteristics) from the optical characteristic storage unit 52 (step S3).

Then, the weighted averaging processing unit 53 calculates the average optical characteristics 59 [MTF or OTF (PSF)] using [General Formula 2] or [General Formula 3] described above. That is, the weighted averaging processing unit 53 performs weighted averaging of the first optical characteristics (optical characteristics 57R, 57G, and 57B for R, G, and B) and the second optical characteristics (the optical characteristics 58 for IR) to calculate the average optical characteristics 59 on the basis of the first weight α and the second weight (1−α) and the appearance frequencies $P_R$, $P_G$, and PB (step S4). The average optical characteristics 59 is output from the weighted averaging processing unit 53 to the restoration filter calculation unit 55.

The restoration filter calculation unit 55 calculates the common restoration filter F1 from [General Formula 1] above on the basis of the average optical characteristics 59 [MTF or OTF (PSF)] received from the weighted averaging processing unit 53 (step S5). The common restoration filter F1 calculated by the restoration filter calculation unit 55 is stored in the restoration filter storage unit 49 of the surveillance camera 10. Accordingly, the process of generating the common restoration filter F1 in the restoration filter generation unit 51 is completed.

<Imaging Process and Image Processing of Surveillance Camera: First Imaging Mode>

As illustrated in FIG. 10, in a case where the device control unit 34 of the surveillance camera 10 determines that switching from "nighttime" to "daytime" has occurred on the basis of the illuminance detection result of the subject input from the illuminance sensor 27, the device control unit 34 switches the imaging mode to the first imaging mode (YES in step S10). Further, at the same time, the device control unit 34 controls the near-infrared light emitting unit 15 to cause emission of the near-infrared light to be turned OFF, and controls the filter driving unit 24 to cause the IR cut filter 25 to be inserted into the imaging optical path L (step S11).

The device control unit 34 starts capturing of the visible light image of the subject (surveillance area) in the first imaging mode using the imaging element 26. The imaging element 26 images the subject through the lens unit 12 in a state in which the IR cut filter 25 is inserted into the imaging optical path L, and outputs the first image data D1 (RAW data) to the image processing unit 35 (step S12).

The image acquisition unit 39 of the image processing unit 35 acquires the mosaic RGB image data constituting the first image data D1 from the imaging element 26 and outputs the mosaic RGB image data to the gain correction processing unit 40 (step S13, which corresponds to an image acquisition step of the present invention). The gain correction processing unit 40 performs white balance correction on the mosaic RGB image data input from the image acquisition unit 39, and outputs the RGB image data after the correction to the demosaic processing unit 41.

The demosaic processing unit 41 performs the demosaic processing on the mosaic RGB image data input from the gain correction processing unit 40 to generate the RGB image data of the three surfaces, and outputs the RGB image data of the three surfaces to the first gradation correction processing unit 42 (step S14). The RGB image data of the three surfaces is subjected to a gradation correction process in the first gradation correction processing unit 42, and RGB image data after correction is output to the conversion processing unit 43.

The conversion processing unit 43 converts the RGB image data of three surfaces input from the first gradation correction processing unit 42 into brightness data Y and color difference data Cr, Cb using a predetermined conversion formula, and outputs the brightness data Y to the point image restoration processing unit 44 (step S15).

The point image restoration processing unit 44 performs a point image restoration process on the brightness data Y input from the conversion processing unit 43 using the common restoration filter F1 read from the restoration filter storage unit 49 (steps S16 and S17, which corresponds to a point image restoration processing step of the present invention). In a case where the common restoration filter F1 generated on the basis of the average optical characteristics 59 [MTF] is used, amplitude correction of the brightness data Y is performed, and in a case where the common restoration filter F1 generated on the basis of the average optical characteristics 59 [OTF (PSF)] is used, amplitude correction and phase correction of the brightness data Y are performed.

After the point image restoration process in the point image restoration processing unit 44, the first image data D1 after image processing including the brightness data Y after the point image restoration process and the color difference data Cr, Cb output from the conversion processing unit 43 is output from the image processing unit 35 to the input and output interface 32 (step S18).

Hereinafter, the process from step S12 to step S18 described above is repeatedly executed until the imaging mode is switched from the first imaging mode to the second imaging mode (NO in step S19). As described below, if the imaging mode is switched from the first imaging mode to the second imaging mode, the imaging process and the image processing in the first imaging mode end (YES in step S19).

<Imaging Process and Image Processing of Surveillance Camera: Second Imaging Mode>

In a case where the device control unit 34 determines that switching from "daytime" to "nighttime" has occurred on the basis of the illuminance detection result of the subject input from the illuminance sensor 27, the device control unit 34 switches the imaging mode from the first imaging mode to the second imaging mode (NO in step S10 or YES in step S19). Further, at the same time, the device control unit 34 controls the near-infrared light emitting unit 15 to cause the emission of the near-infrared light to be turned ON, and controls the filter driving unit 24 to cause the IR cut filter 25 to be retracted from the imaging optical path L (step S21).

Then, the device control unit 34 starts capturing of a near-infrared light image of the subject (surveillance area) in the second imaging mode using the imaging element 26. The imaging element 26 images a subject through the lens unit 12 in a state in which the IR cut filter 25 is retracted from the imaging optical path L, and outputs the second image data D2 (RAW data) to the image processing unit 35 (step S22).

The image acquisition unit 39 acquires IR image data of one surface [IR($R_m$), IR($G_m$), and IR($B_m$) image data] as the second image data D2 from the imaging element 26 and outputs the IR image data of one surface to the gain correction processing unit 40 (step S23, which corresponds to an image acquisition step of the present invention). The gain correction processing unit 40 performs the sensitivity difference correction on the IR image data input from the image acquisition unit 39 and outputs the IR image data after correction to the second gradation correction processing unit 46. The second image data D2 is subjected to a gradation correction process in the second gradation correction processing unit 46, and IR image data after the correction is output to the point image restoration processing unit 44.

The point image restoration processing unit 44 performs the point image restoration process on the IR image data input from the second gradation correction processing unit 46 using the common restoration filter F1 read from the restoration filter storage unit 49 (steps S24 and S25, which corresponds to the point image restoration processing step of the present invention). In a case where the common restoration filter F1 generated on the basis of the average optical characteristics 59 [MTF] is used, amplitude correction of the IR image data is performed, and in a case where the common restoration filter F1 generated on the basis of the average optical characteristics 59 [OTF (PSF)] is used, amplitude correction and phase correction of the IR image data is performed.

The IR image data after the point image restoration process in the point image restoration processing unit 44 is output as the second image data D2 after the image processing from the image processing unit 35 to the input and output interface 32 described above (step S26).

Hereinafter, the process from step S22 to step S26 described above is repeatedly executed until the imaging mode is switched from the second imaging mode to the first imaging mode (NO in step S27). If the imaging mode is switched from the second imaging mode to the first imaging mode, the imaging process and the image processing in the second imaging mode end (YES in step S27).

Hereinafter, similarly, the imaging process and the image processing in the first imaging mode described above and the imaging process and the image processing in the second imaging mode described above are alternately repeatedly executed according to switching between "daytime" and "nighttime".

Effect of First Embodiment

As described above, in the surveillance camera 10 of the first embodiment, it is possible to perform the point image restoration process using one type of common restoration filter F1 on the first image data D1 (the brightness data Y) obtained in the first imaging mode at daytime and the second image data D2 (the IR image data) obtained in the second imaging mode at nighttime. As a result, switching between restoration filters prepared for each imaging mode, securing of a memory capacity for storing the restoration filters, and the like are not required, and it is possible to reduce resources required for the point image restoration process.

Further, since the point image restoration processing unit 44 of this embodiment performs the point image restoration process on the brightness-based image data (the brightness data Y and the IR image data), it is possible to reduce a load of a calculation process, that is, resources required for a point image restoration process as compared with a case where the point image restoration process is performed using restoration filters different for image data of each color of the RGB.

MODIFICATION EXAMPLES OF FIRST EMBODIMENT

In the first embodiment, the point image restoration process is performed on the brightness-based image data (the brightness data Y and the IR image data) that is a brightness component of which a visual effect in the image data increases, using the common restoration filter F1 generated on the basis of the average optical characteristics 59 that is good on average, which is subjected to weighted averaging according to the daytime (the first imaging mode) and the nighttime (second imaging mode). Therefore, in a case where an optimum point image restoration process is not always performed on the brightness-based image data, and the average optical characteristics 59 and actual optical characteristics of the optical system of the surveillance camera 10 are different, the overcorrection and image quality deterioration may occur. Therefore, in the following modification examples, overcorrection or image quality deterioration due to a difference between the average optical characteristics 59 and actual optical characteristics is suppressed.

Modification Example 1 of First Embodiment

In modification example 1, the common restoration filter F1 that prevents overcorrection of the MTF value of the restored image data corresponding to the brightness-based image data (the brightness data Y and the IR image data) after the point image restoration process is generated on the basis of the optical characteristics 57R, 57G, and 57B (MTF) for R, G, and B that are the first optical characteristics and the optical characteristics 58 (MTF) for IR that are the second optical characteristics. Here, the prevention of overcorrection of the MTF value of the restored image data is to suppress the MTF value of the restored image data to 1.0 or less.

Specifically, "maximum MTF($\omega_x$, $\omega_y$)" is selected from among MTF$_R$($\omega_x$, $\omega_y$), MTF$_G$($\omega_x$, $\omega_y$), MTF$_B$($\omega_x$, $\omega_y$), and MTF$_{IR}$($\omega_x$, $\omega_y$) shown in [General Formula 2]. Each of MTF$_R$($\omega_x$, $\omega_y$), MTF$_G$($\omega_x$, $\omega_y$), MTF$_B$($\omega_x$, $\omega_y$), and MTF$_{IR}$($\omega_x$, $\omega_y$) shown in [General Formula 2] is replaced with "maximum MTF($\omega_x$, $\omega_y$)" to calculate MTF$_{AVE}$($\omega_x$, $\omega_y$), and the common restoration filter F1 is generated on the basis of MTF$_{AVE}$($\omega_x$, $\omega_y$). Since a method of calculating the restoration filter F1 of specific modification example 1 is known (WO2014/136321: WO2014/136321 A1), detailed description thereof will be omitted herein.

By performing the point image restoration process using the common restoration filter F1 of such modification example 1, it is possible to suppress overcorrection of the MTF value of the restored image data (the brightness data Y and the IR image data) after the point image restoration process. As a result, overcorrection due to a difference between the average optical characteristics 59 and actual optical characteristics is suppressed.

Modification Example 2 of First Embodiment

In modification example 2, the common restoration filter F1 that prevents overcorrection of the phase of the restored image data corresponding to the brightness-based image data (the brightness data Y and the IR image data) after the point image restoration process is generated on the basis of the optical characteristics 57R, 57G, and 57B (OTF) for R, G, and B that are the first optical characteristics and the optical characteristics 58 (OTF) for IR that are the second optical characteristics.

Specifically, the amount of phase shift of a single color of which an absolute value is minimized is selected from among the amounts of phase shift for each color of a plurality of colors [R, G, B, IR] shown by OTF$_R$($\omega_x$, $\omega_y$), OTF$_G$($\omega_x$, $\omega_y$), OTF$_B$($\omega_x$, $\omega_y$), and OTF$_{IR}$($\omega_x$, $\omega_y$) shown in [General Formula 3]. The common restoration filter F1 that corrects the phase shift of the brightness-based image data with the amount of phase correction corresponding to the selected amount of phase shift of single color is generated. Since a specific method of calculating the common restoration filter F1 of modification example 2 is known (WO2014/136322: WO2014/136322 A1), detailed description thereof will be omitted herein.

By performing the point image restoration process using the common restoration filter F1 of such modification example 2, it is possible to suppress the amount of correction of phase shift due to the phase correction so that the phase correction for the brightness-based image data is not overcorrection in the restored image data of each color (R, G, B, and IR) corresponding to the brightness-based image data after phase correction.

Modification Example 3 of First Embodiment

In modification example 3, the common restoration filter F1 having a high toughness that reduces overcorrection due to a variation of each color (R, G, B, and IR) of an optical transfer function (OTF) is generated on the basis of the optical characteristics 57R, 57G, and 57B (OTF) for R, G, and B that are the first optical characteristics and the optical characteristics 58 (OTF) for IR that are the second optical characteristics.

Specifically, in the generation of the common restoration filter F1 of modification example 3, a method of generating a restoration filter disclosed in International Publication No. WO2014/148074 (WO2014/148074 A1) is applied, and a joint probability distribution of an OTF (also referred to as a complex OTF) extended to IR (infrared wavelength component), in addition to RGB, is first obtained. In a case where a complex transfer function at respective wavelengths of R, G, B, and IR at spatial frequencies $\omega_x$, $\omega_y$ are $h_R$, $h_G$, $h_B$, and $h_{IR}$, the joint probability distribution of R, G, B, and IR can be calculated using the following formula.

$$P(h_R, h_G, h_B, h_{IR}|\omega_x, \omega_y) = P_{RGB}(h_R, h_G, h_B|\omega_x, \omega_y) P_{IR}(h_{IR}|\omega_x, \omega_y)$$ [General Formula 4]

Here, a joint probability distribution $P_{RGB}(h_R, h_G, h_B|\omega_x, \omega_y)$ is obtained by representing a probability of a probability variable of the OTF of each color of RGB having a value such as $h_R$, $h_G$, and $h_B$ for each spatial frequency ($\omega_x$, $\omega_y$). Further, the joint probability distribution $P_{IR}(H_{IR}|\omega_x, \omega_y)$ is obtained by representing a probability of a probability variable of the OTF of IR having a value such as $h_{IR}$ for each spatial frequency ($\omega_x$, $\omega_y$).

Then, an average $\mu$ and a variance $\sigma^2$ of the OTF in a population of the OTF in a specific color system are calculated for the spatial frequency ($\omega_x$, $\omega_y$), as shown in the following formula on the basis of the joint probability distribution of R, G, B, and IR expressed by [General Formula 4].

$$\mu(\omega_x, \omega_y) = \iiint \left\{ (\alpha\ 0\ 0)M\begin{pmatrix} h_R \\ h_G \\ h_B \end{pmatrix} + (1-\alpha)h_{IR} \right\}$$ [General Formula 5]

$$P(h_R, h_G, h_B, h_{IR}|\omega_x, \omega_y) dh_R dh_G dh_B dh_{IR}$$

$$\sigma^2(\omega_x, \omega_y) = \iiint$$ [General Formula 6]

$$\left\| (\alpha\ 0\ 0)M\begin{pmatrix} h_R \\ h_G \\ h_B \end{pmatrix} + (1-\alpha)h_{IR} - \mu(\omega_x, \omega_y) \right\|^2$$

$$P(h_R, h_G, h_B, h_{IR}|\omega_x, \omega_y) dh_R dh_G dh_B dh_{IR}$$

Here, "M" in [General Formula 5] and [General Formula 6] is a transformation matrix from RGB defined in the following formula to YCbCr.

$$\begin{pmatrix} Y \\ Cb \\ Cr \end{pmatrix} = M \begin{pmatrix} R \\ G \\ B \end{pmatrix}$$ [General Formula 7]

The frequency characteristics $d(\omega_x, \omega_y)$ of the common restoration filter F1 can be calculated from the following formula on the basis of the average $\mu$ and the variance $\sigma^2$ of the OTF expressed by [General Formula 5] and [General Formula 6]. The following formula is a formula in which an error criterion for Wiener filter derivation in which an OTF variation due to color has been applied is introduced in consideration of overcorrection caused by OTF variation or brightness-based correction instead of directly using a derivation formula of the known Wiener filter as in [General Formula 1].

$$d(\omega_x, \omega_y) = \frac{(\mu*(\omega_x, \omega_y)S_Y(\omega_x, \omega_y))}{(\|\mu*(\omega_x, \omega_y)\|^2 + \sigma^2(\omega_x, \omega_y))S_Y(\omega_x, \omega_y) + N_Y(\omega_x, \omega_y)}$$ [General Formula 7]

In [General Formula 8], $\mu*(\omega_x, \omega_y)$ represents a complex conjugate of $\mu(\omega_x, \omega_y)$. Further, $S_Y(\omega_x, \omega_y)$ and $N_Y(\omega_x, \omega_y)$ are signal power and noise power of the brightness-based image data (brightness data Y and IR image data), respectively. For a detailed method of generating the common restoration filter F1, see the Literature (WO2014/148074).

By performing such a point image restoration process using the common restoration filter F1 of modification example 3, it is possible to reduce overcorrection due to a variation of each color (R, G, B, and IR) of OTF, and image quality deterioration of the restored image data can be suppressed.

Surveillance Camera of Second Embodiment

Figure 11:
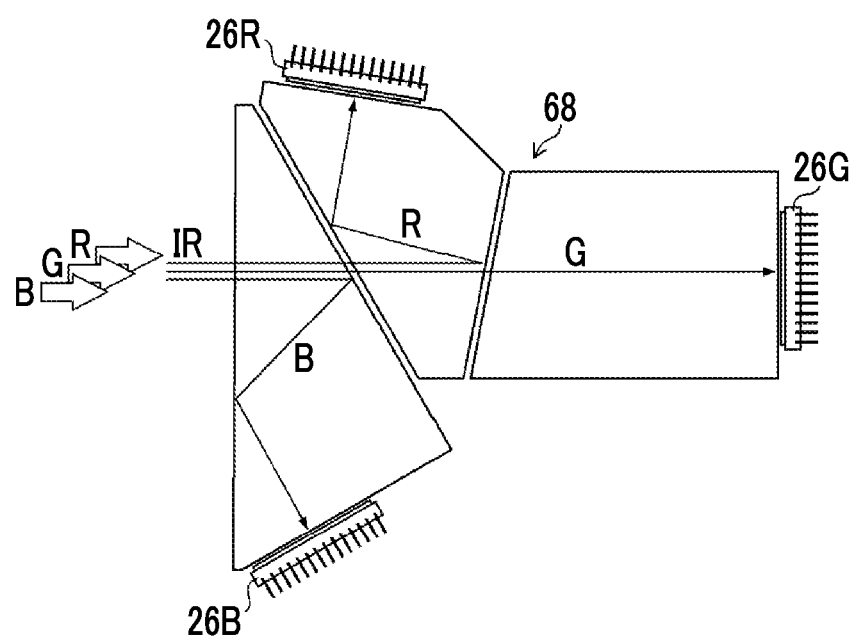
FIG. 11 is a schematic diagram illustrating an example of a three-plate type imaging element.

Next, the surveillance camera of the second embodiment of the present invention will be described. The surveillance camera 10 of the first embodiment performs imaging of a subject using the single plate type imaging element 26. On the other hand, the surveillance camera of the second embodiment performs imaging of the subject using the three-plate type (also referred to as a three-plate scheme) imaging elements 26R, 26G, and 26B as illustrated in FIG. 11. Here, FIG. 11 is a schematic view illustrating an example of three-plate type imaging elements 26R, 26G, and 26B.

In the three-plate type, in the first imaging mode, the visible light are separated into R light, G light, and B light using a color separation optical system 68 including a dichroic mirror and a prism, and the R light, the G light, and the B light are imaged by the imaging elements 26R, 26G, and 26B, respectively. Thus, the first image data D1 including the RGB image data of three surfaces is obtained.

Further, in the color separation optical system 68, light having a longer wavelength than the R light is incident on the imaging element 26R. Therefore, in the second imaging mode, the near-infrared light is imaged by the imaging element 26R. Accordingly, the IR(R) image data of one surface is obtained as the second image data D2 from the imaging element 26R.

Figure 12:
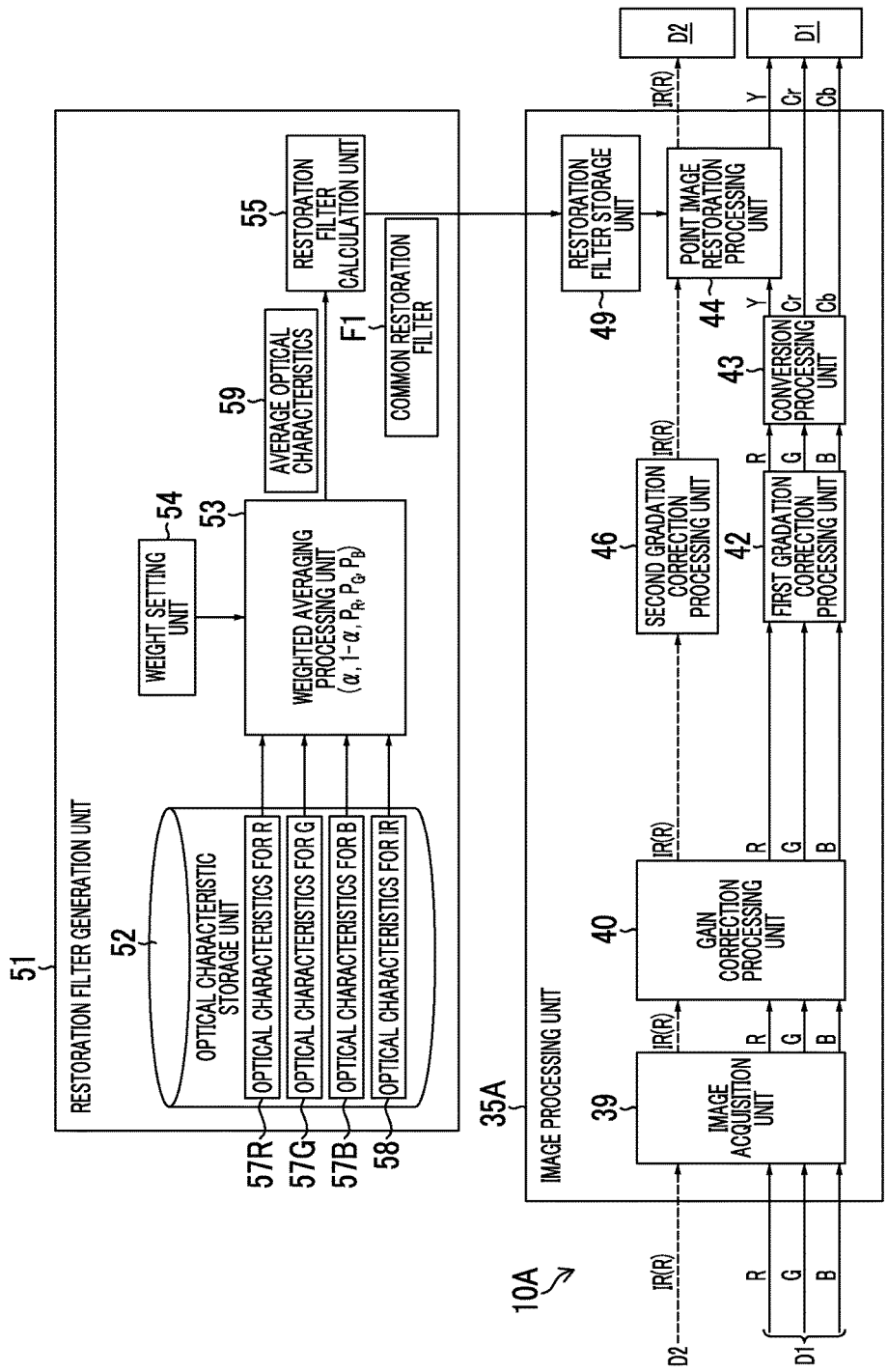
FIG. 12 is a functional block diagram of an image processing unit of a surveillance camera according to a second embodiment.

FIG. 12 is a functional block diagram of an image processing unit 35A of a surveillance camera 10A of the second embodiment. The image processing unit 35A has basically the same configuration as the image processing unit 35 in the first embodiment except that the image processing unit 35A does not function as the demosaic processing unit 41 of the first embodiment. Therefore, units that are the same in function and configuration as in the first embodiment are denoted with the same reference numerals and description thereof will be omitted.

As illustrated in FIG. 12, the image processing unit 35A performs the same image processing as the image processing unit 35 of the first embodiment except that the image acquisition unit 39 respectively acquires the RGB image data (illustrated as "R", "G", and "B" in FIG. 12) of three surfaces constituting the first image data D1 from the imaging elements 26R, 26G, and 26B, and the gain correction processing unit 40 performs white balance correction on the RGB image data of three surfaces in the first imaging mode. That is, in the second embodiment, in the first imaging mode, the point image restoration process is performed on the brightness data Y generated from the RGB image data of three surfaces in the point image restoration processing unit 44.

On the other hand, the image processing unit 35A performs the same image processing as the image processing unit 35 of the first embodiment except that the point image restoration process is performed on substantially the same IR(R) image data of one surface as the IR image data of one surface of the first embodiment by the point image restoration processing unit 44 in the second imaging mode. Here, a pixel pitch of the brightness data Y and the IR(R) image data obtained in the second embodiment is the same as the pixel pitch of the brightness data Y and the IR image data of the first embodiment. Thus, the point image restoration processing unit 44 of the second embodiment can use the same common restoration filter F1 as in the first embodiment.

The point image restoration processing unit 44 of the second embodiment performs the point image restoration process on the brightness data Y generated from the RGB image data of three surfaces using the common restoration filter F1 in the first imaging mode. Further, the point image restoration processing unit 44 performs the point image restoration process on the IR(R) image data using the common restoration filter F1 in the second imaging mode. Since a subsequent process is the same as in the first embodiment, description thereof will be omitted.

Since an operation of the surveillance camera 10A of the second embodiment is basically the same as in the first embodiment illustrated FIGS. 9 and 10 except that the RGB image data of the three surfaces and the IR(R) image data of one surface are acquired and image processing is performed (demosaic processing is not performed), description thereof will be omitted herein.

Effects of Second Embodiment

Thus, in the surveillance camera 10A of the second embodiment using the three-plate type imaging elements 26R, 26G, and 26B, the image restoration process point using one type of common restoration filter F1 can be performed on the first image data (brightness data Y) obtained in the first imaging mode and the second image data D2 (IR(R) image data) obtained in the second imaging mode. As a result, the same effects as in the first embodiment can be obtained.

Surveillance Camera of Third Embodiment

Next, the surveillance camera of the third embodiment of the present invention will be described. The surveillance camera 10 of the first embodiment performs the point image restoration process on the brightness-based image data (brightness data Y and IR image data) using the point image restoration processing unit 44. On the other hand, the surveillance camera of the third embodiment performs the point image restoration process on the image data obtained respectively by the RGB pixels of the imaging element 26 using the common restoration filters different for each color of RGB.

Figure 13:
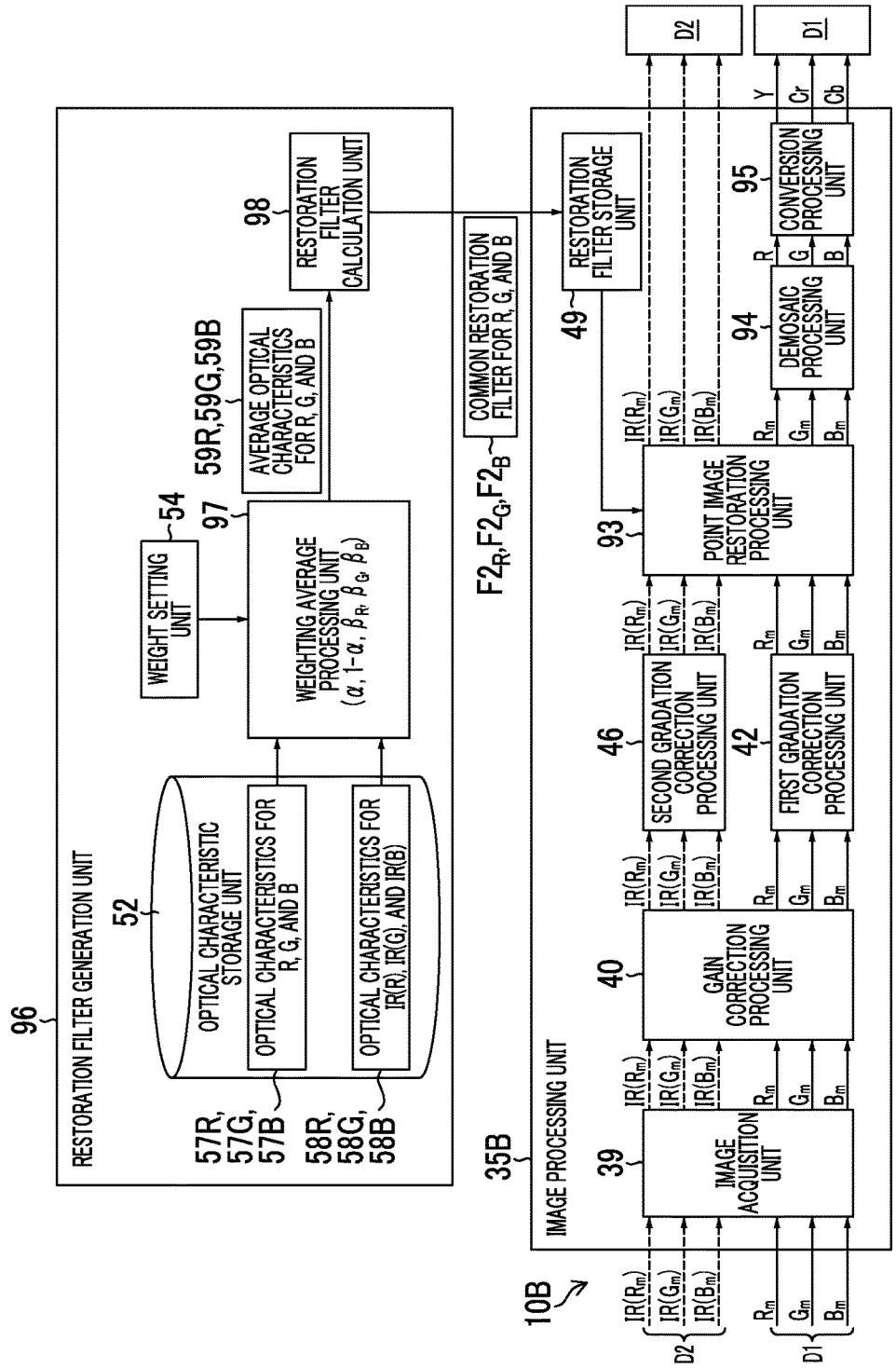
FIG. 13 is a functional block diagram of an image processing unit of a surveillance camera according to a third embodiment.

FIG. 13 is a functional block diagram of an image processing unit 35B of the surveillance camera 10B of the third embodiment. The surveillance camera 10B basically has the same configuration as surveillance camera 10 of the first embodiment except for the image processing unit 35B, and units that are the same in function and configuration as in each embodiment are denoted with the same reference numerals and description thereof will be omitted.

As illustrated in FIG. 13, the image processing unit 35B executes the image processing program 37B read from the storage unit 36 described above (see FIG. 4) functions as a point image restoration processing unit 93, a demosaic processing unit 94, and a conversion processing unit 95, in addition to the image acquisition unit 39, the gain correction processing unit 40, and the first gradation correction processing unit 42 described above in the first imaging mode. The image processing unit 35B functions as a point image restoration processing unit 93, in addition to the image acquisition unit 39, the gain correction processing unit 40, and the second gradation correction processing unit 46 described above in the second imaging mode.

The image acquisition unit 39 acquires mosaic RGB image data (illustrated as "$R_m$", "$G_m$", and "$B_m$" in FIG. 13) constituting the first image data D1 from the imaging element 26 and outputs the mosaic RGB image data to the gain correction processing unit 40 in the first imaging mode. Further, the image acquisition unit 39 acquires mosaic IR($R_m$), IR($G_m$), and IR($B_m$) image data (illustrated as "IR($R_m$)", "IR($G_m$)", and "IR($B_m$)") constituting the second image data D2 from the imaging element 26 and outputs the mosaic IR($R_m$), IR($G_m$), and IR($B_m$) image data to the acquired gain correction processing unit 40 in the second imaging mode.

The gain correction processing unit 40 performs white balance correction on the mosaic RGB image data input from the image acquisition unit 39, and outputs the first image data D1 after correction to the first gradation correction processing unit 42 in the first imaging mode. The gain correction processing unit 40 performs sensitivity difference correction on the mosaic IR($R_m$), IR($G_m$), and IR($B_m$) image data input from the image acquisition unit 39, and outputs the resultant image data to the second gradation correction processing unit 46 in the second imaging mode.

The first gradation correction processing unit 42 of the third embodiment performs a gradation correction process on the mosaic RGB image data input from the gain correction processing unit 40, and outputs each items of image data after correction to the point image restoration processing unit 93 in the first imaging mode. The second gradation correction processing unit 46 performs a gradation correction process on the mosaic IR($R_m$), IR($G_m$), and IR($B_m$) image data input from the gain correction processing unit 40 and outputs each items of image data after correction to the point image restoration processing unit 93 in the second imaging mode.

The point image restoration processing unit 93 performs a point image restoration process on the mosaic RGB image data input from the first gradation correction processing unit 42 using the three types of common restoration filters stored in the restoration filter storage unit 49 for each color of RGB in the first imaging mode. Further, the point image restoration processing unit 93 performs the point image restoration process on the mosaic IR($R_m$), IR($G_m$), and IR($B_m$) image data input from the second gradation correction processing unit 46 using the three types of common restoration filters for each color of RGB in the second imaging mode.

Thus, in the third embodiment, the point image restoration process is performed on the mosaic image data before demosaic processing output from the same color pixels of the imaging element 26. Therefore, in the third embodiment, it is difficult to design the restoration filter as compared with the case where the point image restoration process is performed on the image data of one surface (the brightness data Y and the IR image data) as in the first embodiment. Thus, an RGB pixel array (that is, color filter array) of the imaging element 26 is preferably a simple array such as a Bayer array illustrated in FIG. 3A described above.

The three types of common restoration filters are the common restoration filter $F2_R$ for R, the common restoration filter $F2_G$ for G, and the common restoration filter $F2_B$ for B. The common restoration filter $F2_R$ for R is used in common for the point image restoration process for the mosaic R image data in the first imaging mode and the mosaic IR($R_m$) image data in the second imaging mode. The common restoration filter $F2_G$ for G is used in common for the point image restoration process for the mosaic G image data in the first imaging mode and the mosaic IR($G_m$) image data in the second imaging mode. The common restoration filter $F2_B$ for B is used in common for the point image restoration process for the mosaic B image data in the first imaging mode and the mosaic IR($B_m$) image data in the second imaging mode.

The common restoration filter $F2_R$ for R, the common restoration filter $F2_G$ for G, and the common restoration filter $F2_B$ for B are generated by the restoration filter generation unit 96 different from the restoration filter generation unit 51 of the first embodiment.

<Configuration of Restoration Filter Generation Unit>

The restoration filter generation unit 96 roughly includes a weighted averaging processing unit 97 and a restoration filter calculation unit 98, in addition to the optical characteristic storage unit 52 and the weight setting unit 54 described above.

In addition to the respective optical characteristics 57R, 57G, and 57B for R, G, and B described above, optical characteristics 58R for IR(R), optical characteristics 58G for IR(G), and optical characteristics 58B for IR(B) corresponding to the second optical characteristics of the present invention are stored for each color pixel of the RGB pixels in the optical characteristic storage unit 52 of the third embodiment. The optical characteristics 58R for IR(R) are optical characteristics of the optical system with respect to near-infrared light in a wavelength band in which the R pixels of the imaging element 26 have sensitivity (see FIG. 3B). The optical characteristics 58G for IR(G) are optical characteristics of the optical system with respect to near-infrared light in a wavelength band in which the G pixels of the imaging element 26 has sensitivity (see FIG. 3B). The optical characteristics 58B for IR(B) are optical characteristics of the optical system with respect to near-infrared light in a wavelength band in which the B pixels of the imaging element 26 has sensitivity (see FIG. 3B).

The respective optical characteristics 58R, 58G, and 58B are, for example, the above-described MTF or OTF (PSF), and are measured for each type of the optical system of the surveillance camera 10B in advance. The optical characteristics 58R, 58G, and 58B may be acquired via a network line such as the Internet and stored in the optical characteristic storage unit 52.

Figure 14:
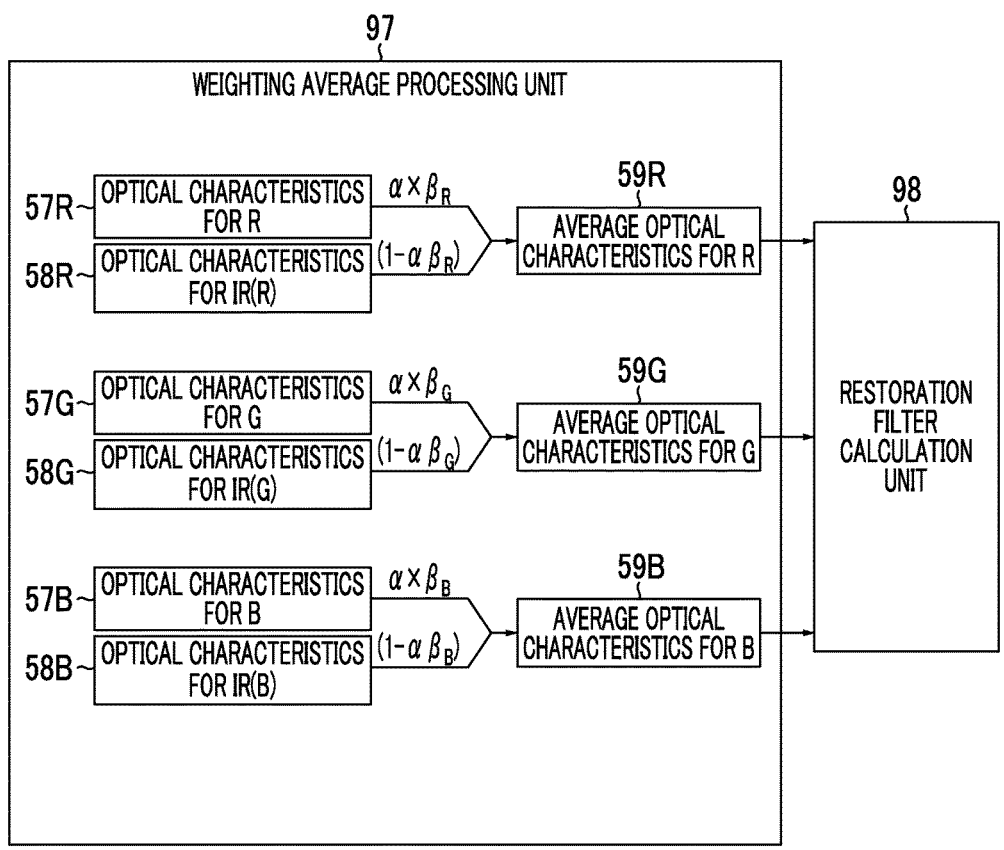
FIG. 14 is an illustrative diagram illustrating a weighted averaging process in a weighted averaging processing unit according to the third embodiment.

FIG. 14 is an illustrative diagram illustrating a weighted averaging process in the weighted averaging processing unit 97 of the third embodiment. As illustrated in FIG. 14, the weighted averaging processing unit 97 performs weighted averaging of the first optical characteristics (the optical characteristics 57R, 57G, and 57B) and the second optical characteristics (the optical characteristics 58R, 58G, and 58B) for each color of RGB to calculate the average optical characteristics of each color of RGB. The average optical characteristics of each color of RGB are the average optical characteristics 59R for R, the average optical characteristics 59G for G, and the average optical characteristics 59B for B.

Specifically, the weighted averaging processing unit 97 performs weighted averaging of the first optical characteristics and the second optical characteristics on the basis of the first weight α and the second weight (1−α) set by the weight setting unit 54 described above and sensitivity characteristics $\beta_R$, $\beta_G$, and $\beta_B$ indicating sensitivity to a wavelength of visible light and near-infrared light of each of the RGB pixels of the imaging element 26 for each color of RGB.

Here, the sensitivity characteristics $\beta_R$ indicates a magnitude of input sensitivity to the visible light to a magnitude of total input sensitivity to light (visible light and infrared light) in the entire wavelength region of the R pixel (see FIG. 3B). Further, the sensitivity characteristics $\beta_G$ indicates a magnitude of input sensitivity to the visible light to a magnitude of total input sensitivity to light (visible light and infrared light) in the entire wavelength region of the G pixel (see FIG. 3B). Further, the sensitivity characteristics $\beta_B$ indicates a magnitude of input sensitivity to the visible light to a magnitude of total input sensitivity to light (visible light and infrared light) in the entire wavelength region of the B pixel (see FIG. 3B). The sensitivity characteristics $\beta_R$, $\beta_G$, and $\beta_B$ are stored in the weighted averaging processing unit 97 in advance, but individual values thereof may be changed by the weight setting unit 54 described above.

In a case where each of the first optical characteristics (the optical characteristics 57R, 57G, and 57B) and the second optical characteristics (the optical characteristics 58R, 58G, and 58B) is MTF, the weighted averaging processing unit 97 calculates the average optical characteristics 59R, 59G, and 59B for R, G, and B represented by MTF using the following formula.

$$MTF_{R+IR}(\omega_x, \omega_y) = \alpha\beta_R MTF_R^{IR}(\omega_x, \omega_y) + (1-\alpha\beta_R) MTF_R^{(IR)}(\omega_x, \omega_y)$$

$$MTF_{G+IR}(\omega_x, \omega_y) = \alpha\beta_G MTF_G(\omega_x, \omega_y) + (1-\alpha\beta_G) MTF_G^{(IR)}(\omega_x, \omega_y)$$

$$MTF_{B+IR}(\omega_x, \omega_y) = \alpha\beta_B MTF_B^{IR}(\omega_x, \omega_y) + (1-\alpha\beta_B) MTF_B^{(IR)}(\omega_x, \omega_y)$$

[General Formula 9]

In the above [General Formula 9], "$MTF_R^{(IR)}$" is optical characteristics 58R for IR(R), "$MTF_G^{(IR)}$" is optical characteristics 58G for IR(G), and "$MTF_B^{(IR)}$" is optical characteristics 58B for IR(B). Further, "$MTF_{R+IR}$" is the average optical characteristics 59R for R, "$MTF_{G+IR}(\omega_x, \omega_y)$" is the average optical characteristics 59G for G, and "$MTF_{B+IR}$" is the average optical characteristics 59B for B.

On the other hand, the average optical characteristics 59R, 59G, and 59B represented by OTF(PSF) are equivalent to the respective average optical characteristics 59R, 59G, and 59B represented by MTF. Therefore, the weighted averaging processing unit 97 calculates the respective average optical characteristics 59R, 59G, and 59B represented by OTF using a general formula (not described) obtained by replacing "MTF" in [General Formula 9] with "OTF".

The weighted averaging processing unit 97 outputs the calculated average optical characteristics 59R, 59G, and 59B [MTF or OTF (PSF)] to the restoration filter calculation unit 98.

Referring back to FIG. 13, the restoration filter calculation unit 98 calculates common restoration filters $F2_R$, $F2_G$, and $F2_B$ for R, G, and B for each color of RGB from [General Formula 1] on the basis of the respective average optical characteristics 59R, 59G, and 59B [MTF or OTF (PSF)] input from the weighted averaging processing unit 97. The restoration filter calculation unit 98 stores the respective common restoration filters $F2_R$, $F2_G$, and $F2_B$ in the restoration filter storage unit 49 via a wired or wireless network line or an information recording medium of a memory card.

<Point Image Restoration Process Using Common Restoration Filter>

The point image restoration processing unit 93 performs a point image restoration process (amplitude correction and phase correction) on mosaic RGB image data input from the first gradation correction processing unit 42 using the respective common restoration filters $F2_R$, $F2_G$, and $F2_B$ read from the restoration filter storage unit 49 for each color of RGB in the first imaging mode. The point image restoration processing unit 93 outputs the mosaic RGB image data after the point image restoration process to the demosaic processing unit 94.

Further, the point image restoration processing unit 93 performs the point image restoration process (amplitude correction and phase correction) on the mosaic $IR(R_m)$, $IR(G_m)$, and $IR(B_m)$ image data input from the second gradation correction processing unit 46 using the respective common restoration filters $F2_R$, $F2_G$, and $F2_B$ read from the filter storage unit 49 for each color of RGB. The mosaic $IR(R_m)$, $IR(G_m)$, and $IR(B_m)$ image data after the point image restoration process are output from the image processing unit 35B to the input and output interface 32 as the second image data D2 after image processing.

<Another Configuration of Image Processing Unit>

The demosaic processing unit 94 performs demosaic processing on the mosaic RGB image data input from the point image restoration processing unit 93 to generate RGB image data of three surfaces (indicated by "R", "G", and "B" in FIG. 13) in the first imaging mode. The demosaic processing unit 94 outputs the RGB image data of the three surfaces after demosaic processing to the conversion processing unit 95.

The conversion processing unit 95 converts the RGB image data of three surfaces input from the demosaic processing unit 94 into brightness data Y indicating a brightness component and color difference data Cr, Cb in the first imaging mode. Thus, the first image data D1 including the brightness data Y and the color difference data Cr, Cb is output from the image processing unit 35B to the input and output interface 32.

Operation of Surveillance Camera of Third Embodiment

Figure 15:
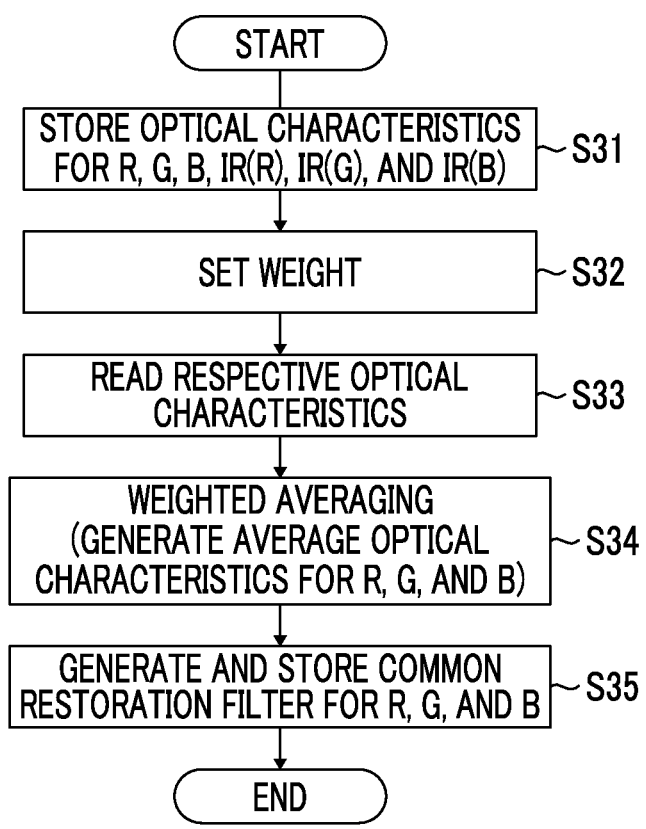
FIG. 15 is a flowchart illustrating a flow of a process of generating each common restoration filter in a restoration filter generation unit according to the third embodiment.
Figure 16:
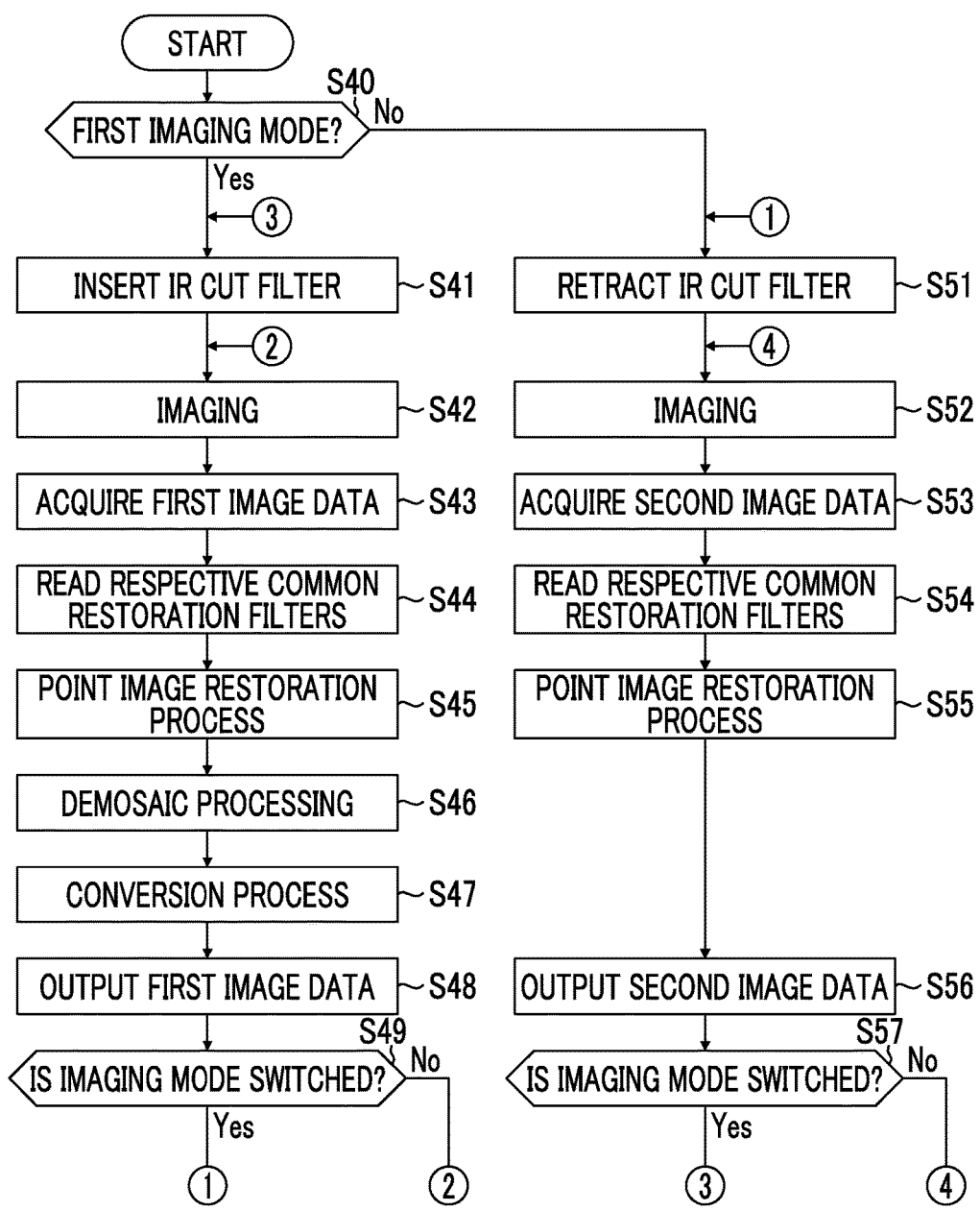
FIG. 16 is a flowchart illustrating a flow of an imaging process and image processing of the surveillance camera according to the third embodiment.

Next, an operation of the surveillance camera 10B having the above configuration (image processing method of the imaging device of the present invention) will be described with reference to FIGS. 15 and 16. Here, FIG. 15 is a flow chart illustrating a flow of a process of generating the respective common restoration filters $F2_R$, $F2_G$, and $F2_B$ in the restoration filter generation unit 96. Further, FIG. 16 is a flowchart illustrating a flow of an imaging process and image processing in the surveillance camera 10B.

<Process of Generating Common Restoration Filter>

The respective common restoration filters $F2_R$, $F2_G$, and $F2_B$ generated by the restoration filter generation unit 96 are stored in the restoration filter storage unit 49 of the surveillance camera 10B in advance. As illustrated in FIG. 15, the restoration filter generation unit 96 measures or acquires the optical characteristics 57R, 57G, and 57B and the optical characteristics 58R, 58G, and 58B, and stores the optical characteristics in the optical characteristic storage unit 52 (step S31).

Further, the weight setting unit 54 sets a first weight α and a second weight (1−α), and inputs the first weight α and the second weight (1−α) to the weighted averaging processing unit 97, as in the first embodiment described above (step S32). The above-described sensitivity characteristics $β_R$, $β_G$, and $β_B$ measured or acquired in advance are stored in the weighted averaging processing unit 97.

In a case where the user performs a generation start operation for respective common restoration filters $F2_R$, $F2_G$, and $F2_B$ in the above-described operation input unit, the weighted averaging processing unit 97 reads the respective optical characteristics 57R, 57G, and 57B (first optical characteristics) and the respective optical characteristics 58R, 58G, and 58B (second optical characteristics) from the optical characteristic storage unit 52 (step S33).

Then, the weighted averaging processing unit 97 calculates the respective average optical characteristics 59R, 59G, and 59B [MTF or OTF (PSF)] for each color of RGB using the above-described [General Formula 9] or an formula obtained by replacing the "MTF" of [General Formula 9] with "OTF". That is, the weighted averaging processing unit 97 performs weighted averaging of the first optical characteristics (the optical characteristics 57R, 57G, and 57B) and the second optical characteristics (the optical characteristics 57R, 57G, and 57B) on the basis of the first weight α and the second weight (1−α), and the sensitivity characteristics $β_R$, $β_G$, and $β_B$ for each color of RGB and calculates the respective average optical characteristics 59R, 59G, and 59B (step S34). The respective average optical characteristics 59R, 59G, and 59B for each color of RGB are output from the weighted averaging processing unit 97 to the restoration filter calculation unit 98.

The restoration filter calculation unit 98 calculates respective common restoration filters $F2_R$, $F2_G$, and $F2_B$ for each color of RGB from [General Formula 1] on the basis of the average optical characteristics 59R, 59G, and 59B [MTF or OTF (PSF)] input from the weighted averaging processing unit 97 (step S35). The respective common restoration filters $F2_R$, $F2_G$, and $F2_B$ calculated by the restoration filter calculation unit 98 are stored in the restoration filter storage unit 49 of the surveillance camera 10B. The process of generating the respective common restoration filters $F2_R$, $F2_G$, and $F2_B$ in the restoration filter generation unit 96 is completed.

Imaging Process and Image Processing of Surveillance Camera of Third Embodiment: First Imaging Mode Since a process from step S40 to step S43 of the surveillance camera 10B in the first imaging mode is basically the same as the process from step S10 to step S13 in the first embodiment illustrated in FIG. 10 described above as illustrated in FIG. 16, description thereof will be omitted herein.

In a case where the process up to step S43 is completed, the image acquisition unit 39 of the image processing unit 35B acquires mosaic RGB image data ($R_m$, $G_m$, $B_m$) constituting the first image data D1 from the imaging element 26 and outputs the mosaic RGB image data ($R_m$, $G_m$, $B_m$) to the gain correction processing unit 40 (corresponding to an image acquisition step of the present invention). The RGB image data is subjected to white balance correction in the gain correction processing unit 40 and gradation correction in the first gradation correction processing unit 42, and then, input to the point image restoration processing unit 93.

The point image restoration processing unit 93 performs the point image restoration process on the mosaic RGB image data input from the first gradation correction processing unit 42 using the common restoration filters $F2_R$, $F2_G$, and $F2_B$ read from the restoration filter storage unit 49, for each color of RGB (steps S44 and S45, which correspond to a point image restoration processing step of the present invention). In a case where the respective common restoration filters $F2_R$, $F2_G$, and $F2_B$ generated on the basis of the respective average optical characteristics 59R, 59G, and 59B

[MTF] are used, amplitude correction for the RGB image data is performed. Further, in a case where the respective common restoration filters $F2_R$, $F2_G$, and $F2_B$ generated on the basis of the respective average optical characteristics 59R, 59G, and 59B [OTF (PSF)] are used, amplitude correction and phase correction for the RGB image data are performed. The mosaic RGB image data after the point image restoration process is output from the point image restoration processing unit 93 to the demosaic processing unit 94.

The demosaic processing unit 94 performs the demosaic processing on the mosaic RGB image data input from the point image restoration processing unit 93 to generate the RGB image data of the three surfaces (step S46). The RGB image data of the three surfaces after the demosaic processing is output from the demosaic processing unit 94 to the conversion processing unit 95.

The conversion processing unit 95 converts the RGB image data of three surfaces input from the demosaic processing unit 94 into the brightness data Y and the color difference data Cr, Cb (step S47).

After the conversion process in the conversion processing unit 95, the first image data D1 after the image processing including the brightness data Y and the color difference data Cr, Cb is output from the image processing unit 35B to the input and output interface 32 (step S48).

Hereinafter, the process from step S42 to step S48 described above is repeatedly executed until the imaging mode is switched from the first imaging mode to the second imaging mode (NO in step S49). As described below, if the imaging mode is switched from the first imaging mode to the second imaging mode, the imaging process and the image processing in the first imaging mode end (YES in step S49).

Imaging Process and Image Processing of Surveillance Camera of Third Embodiment: Second Imaging Mode Since a process from step S51 to step S53 of the surveillance camera 10B in the second imaging mode is basically the same as the process from step S21 to step S23 in the first embodiment illustrated in FIG. 10 described above, description thereof will be omitted herein.

In a case where the process up to step S53 is completed, the image acquisition unit 39 acquires the mosaic $IR(R_m)$, $IR(G_m)$, and $IR(B_m)$ image data constituting the second image data D2 from the imaging element 26 and outputs the mosaic $IR(R_m)$, $IR(G_m)$, and $IR(B_m)$ image data to the gain correction processing unit 40 (corresponding to an image acquisition step of the present invention). The mosaic $IR(R_m)$, $IR(G_m)$, and $IR(B_m)$ image data are subjected to gradation correction in the second gradation correction processing unit 46, and then, input to the point image restoration processing unit 93.

The point image restoration processing unit 93 performs the point image restoration process on the mosaic $IR(R_m)$, $IR(G_m)$, and $IR(B_m)$ image data input from the second gradation correction processing unit 46 using the respective common restoration filters $F2_R$, $F2_G$, and $F2_B$ read from the restoration filter storage unit 49, for each color of RGB (steps S54 and S55, which correspond to a point image restoration processing step of the present invention). In a case where the respective common restoration filters $F2_R$, $F2_G$, and $F2_B$ generated on the basis of the respective average optical characteristics 59R, 59G, and 59B [MTF] are used, amplitude correction for the $IR(R_m)$, $IR(G_m)$, and $IR(B_m)$ image data is performed. Further, in a case where the respective common restoration filters $F2_R$, $F2_G$, and $F2_B$ generated on the basis of the respective average optical characteristics 59R, 59G, and 59B [OTF (PSF)] are used, amplitude correction and phase correction for the $IR(R_m)$, $IR(G_m)$, and $IR(B_m)$ image data are performed.

The $IR(R_m)$, $IR(G_m)$, and $IR(B_m)$ image data after the point image restoration process are output from the image processing unit 35B to the input and output interface 32 as the second image data D2 after image processing (step S56).

Hereinafter, the process from step S52 to step S56 described above is repeatedly executed until the imaging mode is switched from the second imaging mode to the first imaging mode (NO in step S57). If the imaging mode is switched from the second imaging mode to the first imaging mode, the imaging process and the image processing in the second imaging mode end (YES in step S57).

Hereinafter, similarly, the imaging process and the image processing in the first imaging mode described above and the imaging process and the image processing in the second imaging mode described above are alternately repeatedly executed according to switching between "daytime" and "nighttime".

Effects of Third Embodiment

As described above, in the surveillance camera 10B of the third embodiment, the point image restoration process using the respective common restoration filters $F2_R$, $F2_G$, and $F2_B$ can be performed on the first image data D1 (mosaic RGB image data) obtained in the first imaging mode and the second image data D2 (mosaic $IR(R_m)$, $IR(G_m)$, and $IR(B_m)$ image data) obtained in the second imaging mode for each color of RGB. As a result, switching between restoration filters prepared for each imaging mode, securing of a memory capacity for storing the restoration filters, and the like are not required, and it is possible to reduce resources required for the point image restoration process.

Further, since the surveillance camera 10B of the third embodiment performs the point image restoration process on the image data of each color of RGB using the respective different common restoration filters $F2_R$, $F2_G$, and $F2_B$, it is possible to reduce quality deterioration of the restored image data, unlike the first embodiment in which the point image restoration process is performed on the brightness-based image data.

Modification Example of Third Embodiment

In the third embodiment, in a case where the respective average optical characteristics 59R, 59G, and 59B are different from the actual optical characteristics of the optical system of the surveillance camera 10B, overcorrection and image deterioration may occur, as described in the modification example of the first embodiment. Therefore, the prevention of the overcorrection of the MTF value of the restored image data as described in modification example 1 of the first embodiment, and the prevention of the overcorrection of the phase of the restored image data as described in modification example 2 of the first embodiment phase may be performed.

Further, the respective common restoration filters $F2_R$, $F2_G$, and $F2_B$ with high toughness in which the overcorrection of the variation of each color of the optical transfer function (OTF) as described in modification example 3 of the first embodiment has been reduced may be generated. In this case, an average $\mu$ and a variance $\sigma^2$ of the OTF are calculated for each spatial frequency ($\omega_x$, $\omega_y$) using the following formula instead of [General Formula 5] and [General Formula 6].

$$\mu_X(\omega_x, \omega_y) = \iiiint \{\alpha\beta_X h_X + (1-\alpha\beta_X)h_X^{(IR)}\} P(h_X|\omega_x, \omega_y) P(h_X^{(IR)}|\omega_x, \omega_y) dh_X dh_X^{(IR)} \quad \text{[General Formula 10]}$$

$$\sigma_X^2(\omega_x, \omega_y) = \iiiint \|\alpha\beta_X h_X + (1-\alpha\beta_X)h_X^{(IR)} - \mu_X(\omega_x, \omega_y)\|^2 P(h_X|\omega_x, \omega_y) P(h_X^{(IR)}|\omega_x, \omega_y) dh_X dh_X^{(IR)} \quad \text{[General Formula 11]}$$

Here, in [General Formula 10] and [General Formula 11], X={R, G, B}. The frequency characteristics $d(\omega_x, \omega_y)$ of the respective common restoration filters $F2_R$, $F2_G$, and $F2_B$ can be calculated from [General Formula 8] on the basis of an average $\mu$ and a variance $\sigma^2$ of OTF expressed by [General Formula 10] and [General Formula 11].

Surveillance Camera of Fourth Embodiment

Next, the surveillance camera of the fourth embodiment of the present invention will be described. The surveillance camera 10B of the third embodiment performs imaging of a subject using the imaging element 26 of the single plate, whereas the surveillance camera of the fourth embodiment performs imaging of a subject using the three-plate type imaging elements 26R, 26G, and 26B illustrated in FIG. 11 described above.

Figure 17:
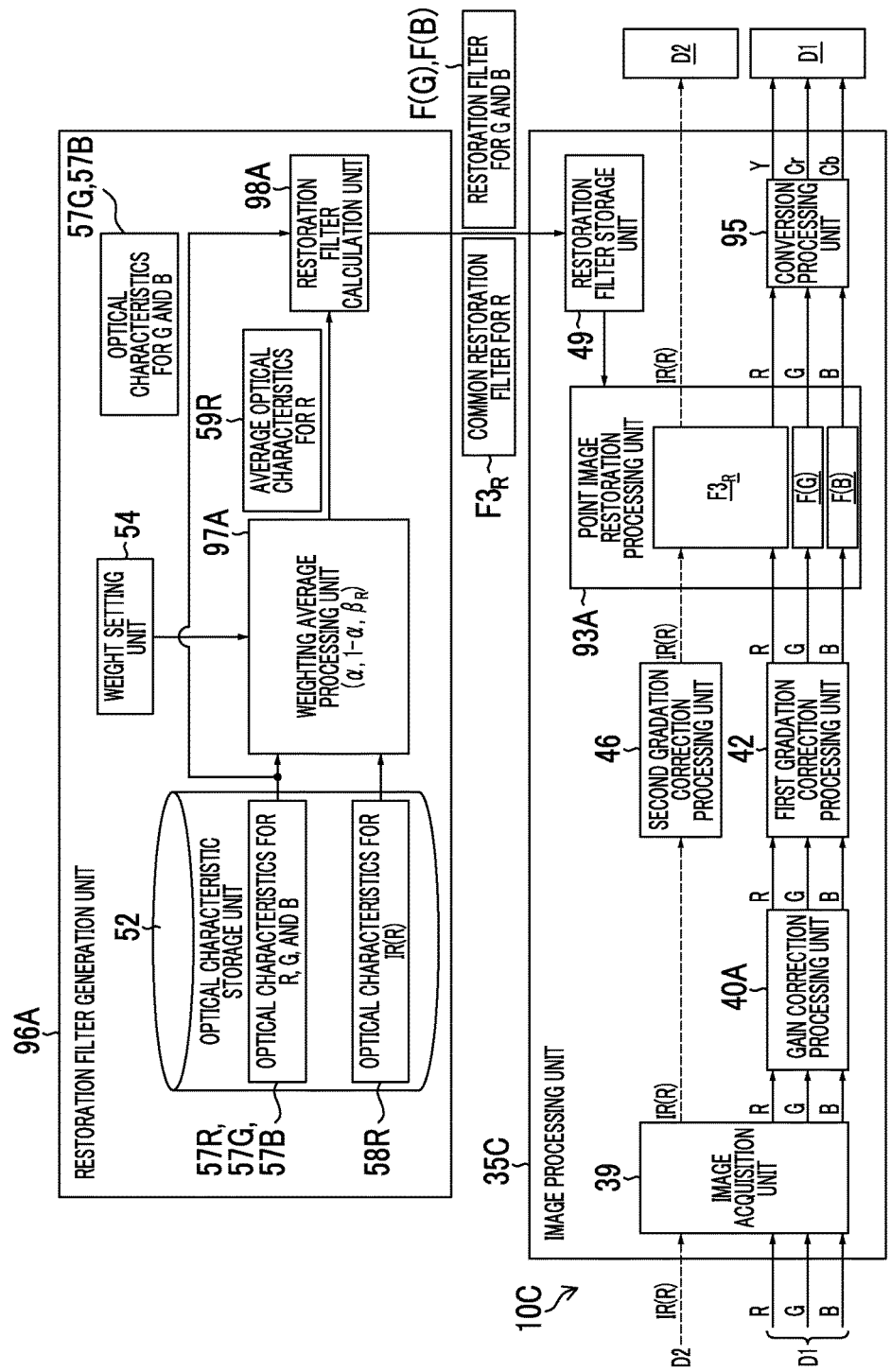
FIG. 17 is a functional block diagram of an image processing unit of a surveillance camera according to a fourth embodiment.

FIG. 17 is a functional block diagram of an image processing unit 35C of the surveillance camera 10C of the fourth embodiment. The surveillance camera 10C has basically the same configuration as the surveillance camera 10B of the third embodiment (see FIG. 13) except for the image processing unit 35C. Units that are the same in function and configuration as in each embodiment are denoted with the same reference numerals and description thereof will be omitted.

As illustrated in FIG. 17, the image processing unit 35C executes the image processing program 37B read from the storage unit 36 described above (see FIG. 4) to function as a gain correction processing unit 40A in place of the gain correction processing unit 40 of the third embodiment, functions as a point image restoration processing unit 93A in place of the point image restoration processing unit 93 of the third embodiment, and has basically the same configuration as the image processing unit 35B of the third embodiment (see FIG. 13) except that the image processing unit 35C does not function as the demosaic processing unit 94.

The image acquisition unit 39 of the fourth embodiment acquires the RGB image data of three surfaces constituting the first image data D1 (illustrated as "R", "G", and "B" in figure) from the imaging elements 26R, 26G, and 26B in the first imaging mode. Further, the image acquisition unit 39 acquires the IR(R) image data of one surface (illustrated as "IR(R) in figure) as the second image data D2 from the imaging element 26R including only R pixels in the second imaging mode.

The gain correction processing unit 40A performs white balance correction on the RGB image data of three surfaces acquired from the imaging elements 26R, 26G, and 26B by the image acquisition unit 39 in the first imaging mode. The gain correction processing unit 40A directly outputs the IR(R) image data of one surface acquired from the imaging element 26R by the image acquisition unit 39 to the second gradation correction processing unit 46 in the second imaging mode.

The first gradation correction processing unit 42 performs gradation correction on the RGB image data of three surfaces and then outputs the resultant RGB image data to the point image restoration processing unit 93A in the first imaging mode. On the other hand, the second gradation correction processing unit 46 performs the gradation correction on the IR(R) image data of one surface and then outputs the resultant IR(R) image data to the point image restoration processing unit 93A in the second imaging mode.

The point image restoration processing unit 93A is basically the same as the point image restoration processing unit 93 of the third embodiment in that the point image restoration processing unit 93A performs the point image restoration process on the image data obtained respectively by the RGB pixels using restoration filters different for each color of RGB. However, the point image restoration processing unit 93A performs a point image restoration process on the R image data of one surface obtained by the imaging element 26R in the first imaging mode and the IR(R) image data of one surface obtained by the imaging element 26R in the second imaging mode using the common restoration filter $F3_R$ for R. On the other hand, the point image restoration processing unit 93A performs the point image restoration process on the G and B image data of one surface obtained by the imaging elements 26G and 26B using the different restoration filters F(G) and F(B) for G and B in the first imaging mode.

The common restoration filter $F3_R$ for R and the restoration filters F(G) and F(B) for G and B are generated by the restoration filter generation unit 96A different from the restoration filter generation unit 96 of the third embodiment.

<Configuration of Restoration Filter Generation Unit>

The restoration filter generation unit 96A roughly includes a weighted averaging processing unit 97A and a restoration filter calculation unit 98A, in addition to the optical characteristic storage unit 52 and the weight setting unit 54 described above.

The optical characteristics 58R for IR(R) described above is stored in the optical characteristic storage unit 52 of the fourth embodiment, in addition to the optical characteristics 57R, 57G, and 57B for R, G, and B. The optical characteristics 58R for IR(R) in the fourth embodiment is optical characteristics of the optical system [MTF or OTF (PSF)] for the near-infrared light in the wavelength band in which R pixels of the imaging element 26R have sensitivity (see FIG. 3B).

The weighted averaging processing unit 97A performs weighted averaging of the optical characteristics 57R for R and the optical characteristics 58R for IR(R) to calculate the average optical characteristics 59R for R on the basis of the first weight $\alpha$ and the second weight $(1-\alpha)$ set by the weight setting unit 54 and the sensitivity characteristics $\beta_R$, as in the third embodiment. The weighted averaging processing unit 97A outputs the calculated average optical characteristics 59R [MTF or OTF (PSF)] for R to the restoration filter calculation unit 98A.

The restoration filter calculation unit 98A generates the common restoration filter $F3_R$ from [General Formula 1] on the basis of the average optical characteristics 59R for R input from the weighted averaging processing unit 97A. The common restoration filter $F3_R$ for R is a restoration filter corresponding to the image data of one surface, unlike the common restoration filter $F2_R$ for R of the third embodiment corresponding to the mosaic image data R.

Further, the restoration filter calculation unit 98A generates the restoration filter F(G) for G and the restoration filter F(B) for B from [General Formula 1] on the basis of the respective optical characteristics 57G and 57B for G and B read from the optical characteristic storage unit 52. The restoration filter calculation unit 98A stores the common restoration filters F3$_R$ for R and the restoration filters F(G) and F(B) for G and B in the restoration filter storage unit 49 via a wired or wireless network line or an information recording medium of a memory card.

Point Image Restoration Process of Fourth Embodiment

The point image restoration processing unit 93A performs a point image restoration process (amplitude correction and phase correction) on the R image data in the mosaic RGB image data input from the first gradation correction processing unit 42 using the common restoration filter F3$_R$ for R read from the restoration filter storage unit 49 in the first imaging mode. Further, the point image restoration processing unit 93A performs the point image restoration process (amplitude correction and phase correction) on the G image data and the B image data using the restoration filters F(G) and F(B) for G and B read from the restoration filter storage unit 49 for each color of G and B. The RGB image data of three surfaces after the point image restoration process is subjected to the conversion process in the conversion processing unit 95, and then, is output as the first image data D1 after the image processing from the image processing unit 35C to the input and output interface 32.

On the other hand, the point image restoration processing unit 93A performs the point image restoration process (amplitude correction and phase correction) on the mosaic IR(R) image data of one surface input from the second gradation correction processing unit 46 using the common restoration filter F3$_R$ for R read from the restoration filter storage unit 49 in the second imaging mode. The IR(R) image data after the point image restoration process is output as the second image data D2 after the point image restoration process from the image processing unit 35C to the input and output interface 32.

An operation of the surveillance camera 10C of the fourth embodiment is basically the same as the third embodiment (see FIGS. 15 and 16) except that the point image restoration process is performed on the R image data and the IR(R) image data of one surface using the common restoration filter F3$_R$ and the point image restoration process is performed on the G and B image data of one surface using the restoration filters F(G) and F(B) for G and B. Therefore, detailed description thereof will be omitted.

Effects of Fourth Embodiment

Thus, the surveillance camera 10C of the fourth embodiment can perform the point image restoration process using one type of common restoration filter F3$_R$ on the first image data D1 (R image data) obtained in the first imaging mode and the second image data D2 (IR(R) image data) obtained in the second imaging mode. That is, since the number of types of restoration filters stored in the surveillance camera 10C in the fourth embodiment is three as in the third embodiment, the same effects as in the third embodiment can be obtained.

Surveillance Camera of Fifth Embodiment

Next, the surveillance camera of the fifth embodiment of the present invention will be described. The surveillance camera 10 of the first embodiment performs imaging of the subject using the imaging element 26 of a single plate type in which RGB pixels are arranged in a matrix form on an imaging surface. On the other hand, the surveillance camera of the fifth embodiment performs imaging of a subject using the imaging element 26 of the single plate type in which RGB pixels and IR pixels are arranged in a matrix form on the imaging surface.

Figure 18A:
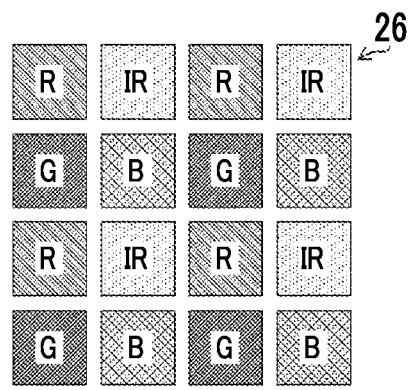
FIG. 18A is an enlarged view of pixels provided on an imaging surface of an imaging element of a fifth embodiment.

FIG. 18A is an enlarged view of pixels provided in the imaging surface of the imaging element 26 of the fifth embodiment. Further, FIG. 18B is an illustrative diagram illustrating spectral transmittance characteristics of color filters of the pixels illustrated in FIG. 18A.

As illustrated in FIG. 18A, IR pixels (illustrated as IR in FIG. 19A) including a micro-lens, a near-infrared light transmission filter, and a photoelectric conversion unit are arranged, in addition to the RGB pixels described above, on the imaging surface of the imaging element 26 of the fifth embodiment. The IR pixel corresponds to a second pixel of the present invention. In this embodiment, the RGB pixels and the IR pixels are arranged on the imaging surface so that a pixel pitch between pixels of the same color in the RGB pixels and a pixel pitch of the IR pixels are the same. That is, an arrangement pattern of the same color pixels in the RGB pixels and an arrangement pattern of the IR pixels are the same patterns.

Figure 18B:
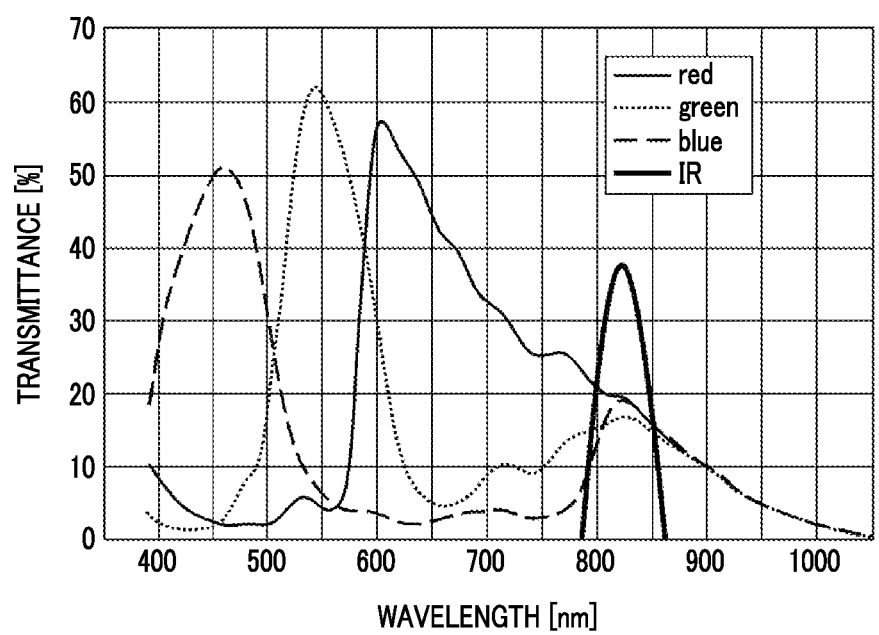
FIG. 18B is an illustrative diagram illustrating spectral transmittance characteristics of color filters of the pixels illustrated in FIG. 18A.

As illustrated in FIG. 18B, the IR pixel has sensitivity only to the wavelength band of near-infrared light. In a case where the IR cut filter 25 is retracted from the imaging optical path L in the second imaging mode, only the near-infrared light is incident on the IR pixels. The RGB pixels also have sensitivity to the wavelength band of the near-infrared light as described above, but the second image data D2 is assumed to be acquired from only the IR pixels in this embodiment.

Figure 19:
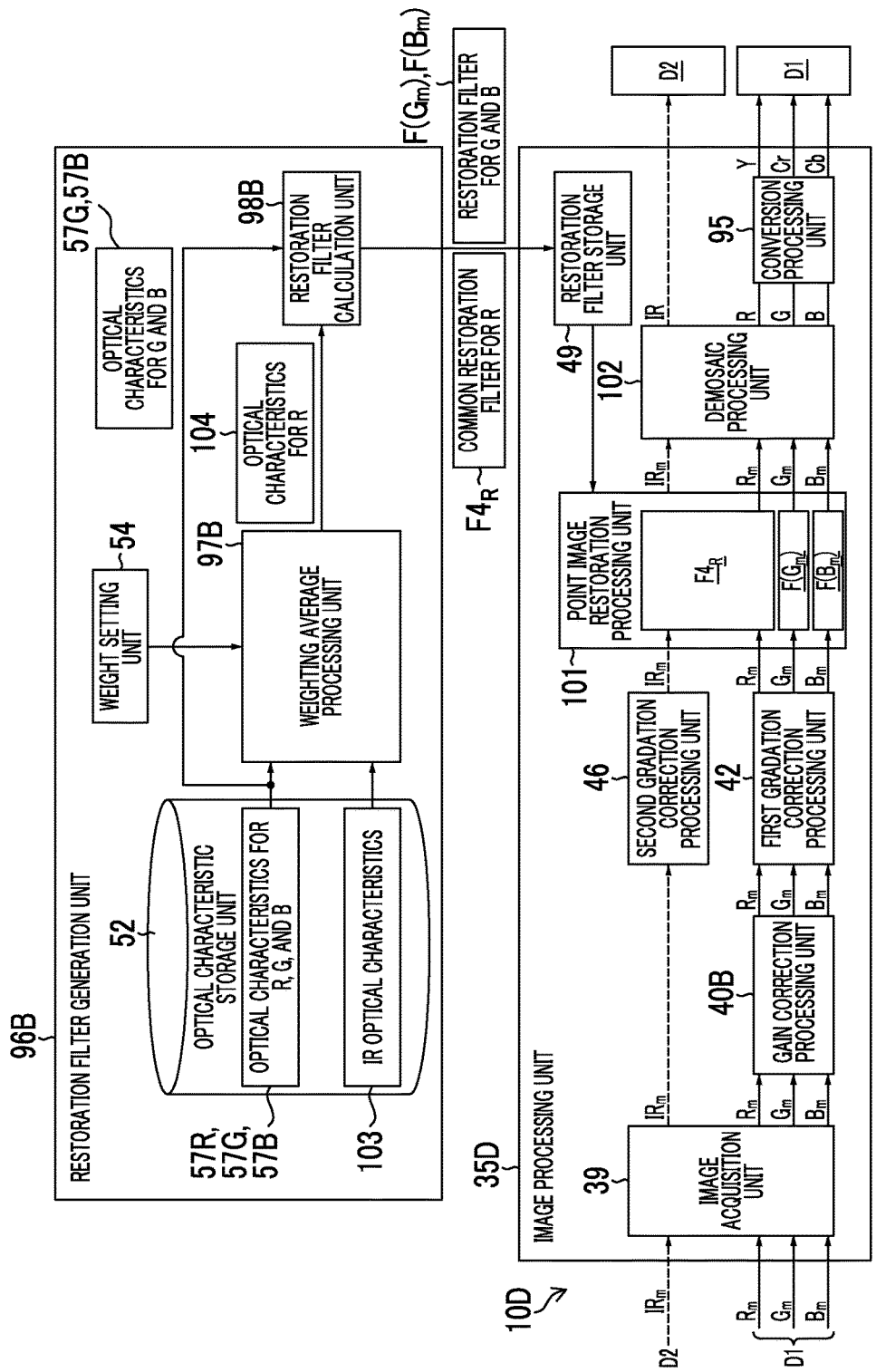
FIG. 19 is a functional block diagram of an image processing unit of a surveillance camera according to a fifth embodiment.

FIG. 19 is a functional block diagram of an image processing unit 35D of a surveillance camera 10D of the fifth embodiment. The image processing unit 35D performs various image processing including the point image restoration process on the mosaic RGB image data ("R$_m$", "G$_m$", and "B$_m$") constituting the first image data D1 acquired from the imaging element 26 by the image acquisition unit 39 in the first imaging mode. On the other hand, the image processing unit 35D performs various image processing including the point image restoration process on the mosaic IR$_m$ image data (illustrated as "IR$_m$" in FIG. 19) acquired as the second image data D2 from the imaging element 26 by the image acquisition unit 39 in the second imaging mode.

The image processing unit 35D has basically the same configuration as the image processing unit 35B of the third embodiment (see FIG. 13) except that the image processing unit 35D functions as a gain correction processing unit 40B, a point image restoration processing unit 101, and a demosaic processing unit 102 that are different from the gain correction processing unit 40, the point image restoration processing unit 93, and the demosaic processing unit 94 of the third embodiment. Units that are the same in function and configuration as in each embodiment are denoted with the same reference numerals and description thereof will be omitted.

The gain correction processing unit 40B performs white balance correction on the mosaic RGB image data acquired by the image acquisition unit 39 in the first imaging mode. The RGB image data after the correction is subjected to the gradation correction in the first gradation correction processing unit 42 and then input to the point image restoration processing unit 101.

Meanwhile, the gain correction processing unit 40B directly outputs the mosaic IR$_m$ image data acquired by the image acquisition unit 39 to the second gradation correction processing unit 46 in the second imaging mode. The IR$_m$ image data is subjected to gradation correction in the second gradation correction processing unit 46 and then input to the point image restoration processing unit 101.

The point image restoration processing unit 101 is basically the same as the point image restoration processing unit 93A of the fourth embodiment (see FIG. 17) except that a point image restoration process is performed on the mosaic image data. That is, the point image restoration processing unit 101 of the fifth embodiment performs a point image restoration process on the mosaic R image data obtained by the R pixels of the imaging element 26 in the first imaging mode and the mosaic $IR_m$ image data obtained by the IR pixels of the imaging element 26 in the second imaging mode using the common restoration filter $F4_R$ for R. Since the R pixels and the IR pixels of the imaging element 26 are arranged at the same pixel pitch and the arrangement patterns are the same as illustrated in FIG. 18A described above, it is possible to perform the point image restoration process using the same common restoration filter $F4_R$ for R.

On the other hand, the point image restoration processing unit 101 performs the point image restoration process on the mosaic G and B image data obtained by the G and B pixels of the imaging element 26 using the restoration filters $F(G_m)$ and $F(B_m)$ for G and B in the first imaging mode.

The common restoration filter $F4_R$ for R and the restoration filters $F(G_m)$ and F(Bm) for G and B are generated by the restoration filter generation unit 96B different from the restoration filter generation unit 96A of the fourth embodiment.

<Configuration of Restoration Filter Generation Unit>

The restoration filter generation unit 96B roughly includes a weighted averaging processing unit 97B and a restoration filter calculation unit 98B, in addition to the optical characteristic storage unit 52 and the weight setting unit 54 described above.

The IR optical characteristics 103 [MTF or OTF (PSF)] that are the optical characteristics of the surveillance camera 10D with respect to near-infrared light in a wavelength band in which the IR pixel of the imaging element 26 has sensitivity are stored in the optical characteristic storage unit 52 of the fifth embodiment, in addition to the optical characteristics 57R, 57G, and 57B described above.

The weighted averaging processing unit 97B performs weighted averaging of the optical characteristics 57R for R and the optical characteristics 103 for IR to calculate the average optical characteristics 104 for R on the basis of the first weight α and the second weight (1−α) set by the weight setting unit 54 and the sensitivity characteristics $β_R$, as in the fourth embodiment. The weighted averaging processing unit 97B outputs the calculated average optical characteristics 104 [MTF or OTF (PSF)] for R to the restoration filter calculation unit 98B.

The restoration filter calculation unit 98B generates the common restoration filter $F4_R$ for R corresponding to the point image restoration process of the mosaic image data from [General Formula 1] on the basis of the average optical characteristics 104 for R input from the weighted averaging processing unit 97B. Further, the restoration filter calculation unit 98B generates the restoration filter $F(G_m)$ for G and the restoration filter $F(B_m)$ for B corresponding to the point image restoration process of the mosaic image data from [General Formula 1] on the basis of the respective optical characteristics 57G and 57B for G and B read from the optical characteristic storage unit 52. The restoration filter calculation unit 98B stores the common restoration filters $F4_R$ for R and the restoration filters $F(G_m)$ and $F(B_m)$ for G and B in the restoration filter storage unit 49 via a wired or wireless network line or an information recording medium of a memory card.

Point Image Restoration Process of Fifth Embodiment

The point image restoration processing unit 101 performs a point image restoration process (amplitude correction and phase correction) on the R image data in the mosaic RGB image data input from the first gradation correction processing unit 42 using the common restoration filter $F4_R$ for R read from the restoration filter storage unit 49 in the first imaging mode. Further, the point image restoration processing unit 101 performs the point image restoration process (amplitude correction and phase correction) on the G and B image data using the restoration filters $F(G_m)$ and $F(B_m)$ for G and B read from the restoration filter storage unit 49 for each color of G and B. The point image restoration processing unit 101 outputs the mosaic RGB image data after the point image restoration process to the demosaic processing unit 102.

On the other hand, the point image restoration processing unit 101 performs the point image restoration process (amplitude correction and phase correction) on the mosaic $IR_m$ image data input from the second gradation correction processing unit 46 using the common restoration filter $F4_R$ for R read from the restoration filter storage unit 49 in the second imaging mode. The point image restoration processing unit 101 outputs the mosaic $IR_m$ image data after the point image restoration process to the demosaic processing unit 102.

Another Configuration of Fifth Embodiment

The demosaic processing unit 102 performs demosaic processing on the mosaic RGB image data to generate RGB image data of three surfaces in the first imaging mode, similar to the demosaic processing unit 94 of the third embodiment (see FIG. 13). The RGB image data of the three surfaces is converted to the brightness data Y and the color difference data Cr, Cb by the conversion processing unit 95. The first image data D1 after the image processing including the brightness data Y and the color difference data Cr, Cb is output from the image processing unit 35D to the input and output interface 32.

On the other hand, the demosaic processing unit 102 performs demosaic processing on the mosaic $IR_m$ image data input from the point image restoration processing unit 101 to generate the IR image data of one surface (illustrated as "IR" in FIG. 13) in the second imaging mode. The IR image data is output as the second image data D2 after the image processing from the image processing unit 35D to output interface 32.

An operation of the surveillance camera 10D of the fifth embodiment is basically the same as in the third embodiment (see FIG. 16) except that the surveillance camera 10D performs the point image restoration process on the mosaic R image data and $IR_m$ image data using the common restoration filter $F4_R$ for R and the surveillance camera 10D performs demosaic processing on the mosaic $IR_m$ image data after the image restoration process. Therefore, detailed description thereof will be omitted.

Thus, the surveillance camera 10D of the thus fifth embodiment can perform the point image restoration process on the first image data D1 (the mosaic R image data) obtained in the first imaging mode and the second mosaic image data D2 (the $IR_m$ image data) obtained in the second imaging mode using one type of common restoration filter $F4_R$ for R. That is, in the fifth embodiment, there are three types of restoration filters stored in the surveillance camera 10D as in the third embodiment, and therefore, the same effects as in the third embodiment can be obtained.

Modification Example of Fifth Embodiment

Although the point image restoration process is performed on the image data obtained respectively in the R pixels, the IR pixels, the G pixels, and the B pixels of the imaging element 26 using the restoration filters different for each color of R(IR), G, and B in the fifth embodiment, the point image restoration process may be performed on the brightness-based image data as described in the first embodiment. In this case, "$MTF_{IR}$" in [General Formula 2] and "$OTF_{IR}$" in [General Formula 3] are optical characteristics 103 for IR described above.

Further, in the fifth embodiment, the point image restoration process is performed on the mosaic R image data obtained in the first imaging mode and the mosaic $IR_m$ image data obtained in the second imaging mode using the common restoration filter $F4_R$ for R, but the R pixel and the IR pixel of the imaging element 26 cannot be caused to be at the same pixel pitch in some cases. In this case, the point image restoration process may be performed on the mosaic G image data or B image data obtained in the first imaging mode and the $IR_m$ image data using the common restoration filter.

Sixth Embodiment

Next, a surveillance camera of a sixth embodiment of the present invention will be described. Although the respective restoration filter generation units are provided separately from the surveillance camera in each of the embodiments, the above-described restoration filter generation units may be provided in the surveillance camera (for example, the camera body controller 28).

In this case, in order to generate the common restoration filter corresponding to both of the first image data D1 obtained by daytime imaging and the second image data D2 obtained by nighttime imaging, it is preferable to calculate the average optical characteristics with reference to a time zone of switching between "daytime" in which only substantially visible light is incident on the imaging element 26 and "nighttime" in which only substantially near-infrared light is incident on the imaging element 26. That is, it is preferable to appropriately adjust the first weight α and the second weight (1−α) in a case where the weighted averaging of the first optical characteristics and the second optical characteristics is performed according to the light quantity ratio between the visible light and the near-infrared light under dullness such as twilight at which the light including both of the visible light and the near-infrared light is incident on the imaging element 26.

Figure 20:
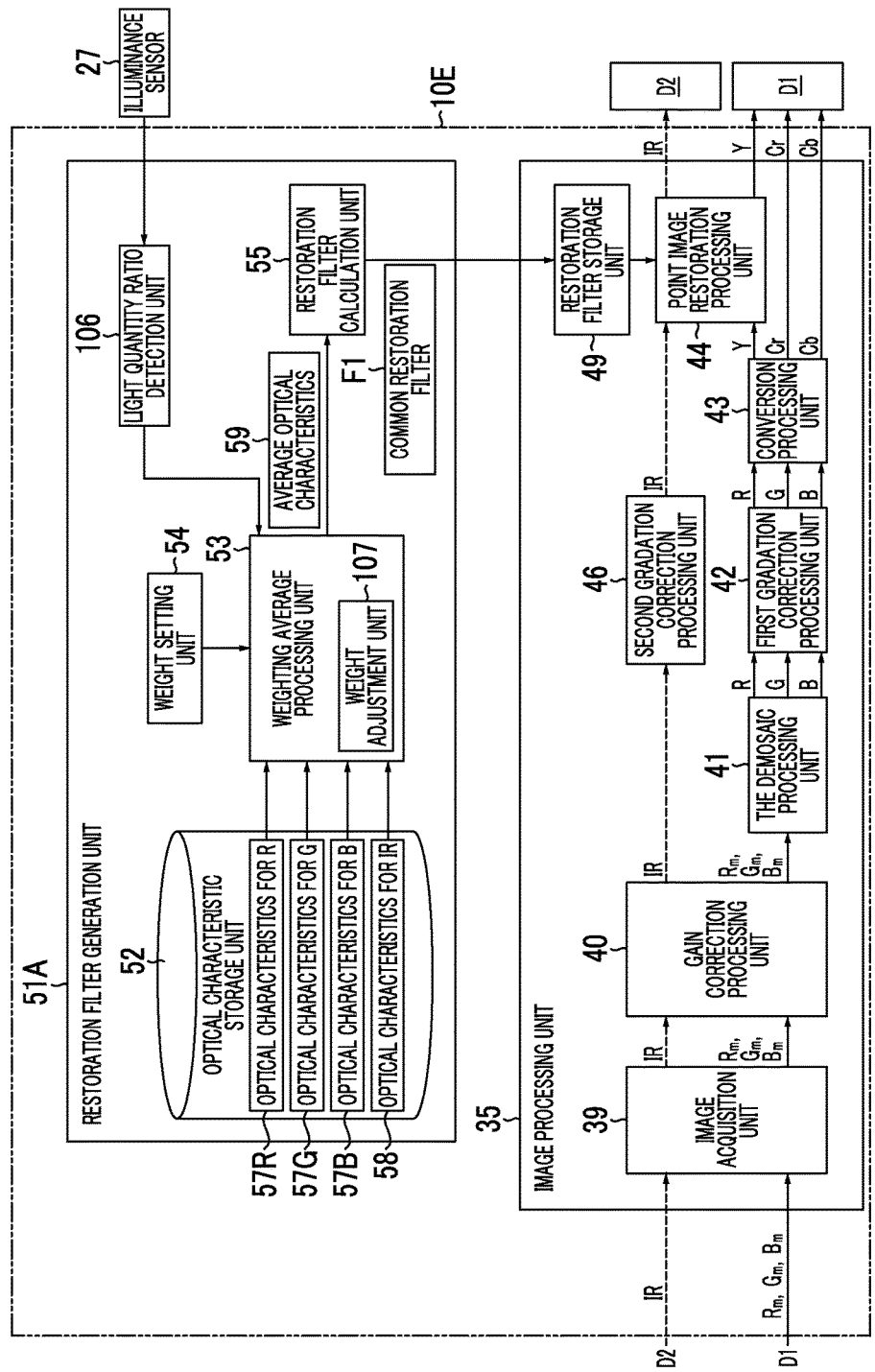
FIG. 20 is a functional block diagram of a restoration filter generation unit of a surveillance camera according to a sixth embodiment.

FIG. 20 is a functional block diagram of the restoration filter generation unit 51A of a surveillance camera 10E of the sixth embodiment. As illustrated in FIG. 20, the surveillance camera 10E of the sixth embodiment is obtained by providing a restoration filter generation unit 51A to the surveillance camera 10 of the first embodiment, and has basically the same configuration as in the first embodiment. Therefore, units that are the same in function and configuration as in the first embodiment are denoted with the same reference numerals and description thereof will be omitted.

The restoration filter generation unit 51A is basically the same as the restoration filter generation unit 51 of the first embodiment except that a light quantity ratio detection unit 106 is provided and a weight adjustment unit 107 is provided in the weighted averaging processing unit 53. The light quantity ratio detection unit 106 detects a light quantity ratio between the light quantity of the visible light and the light quantity of the near-infrared light on the basis of the illuminance detection result input from the illuminance sensor 27.

Figure 21:
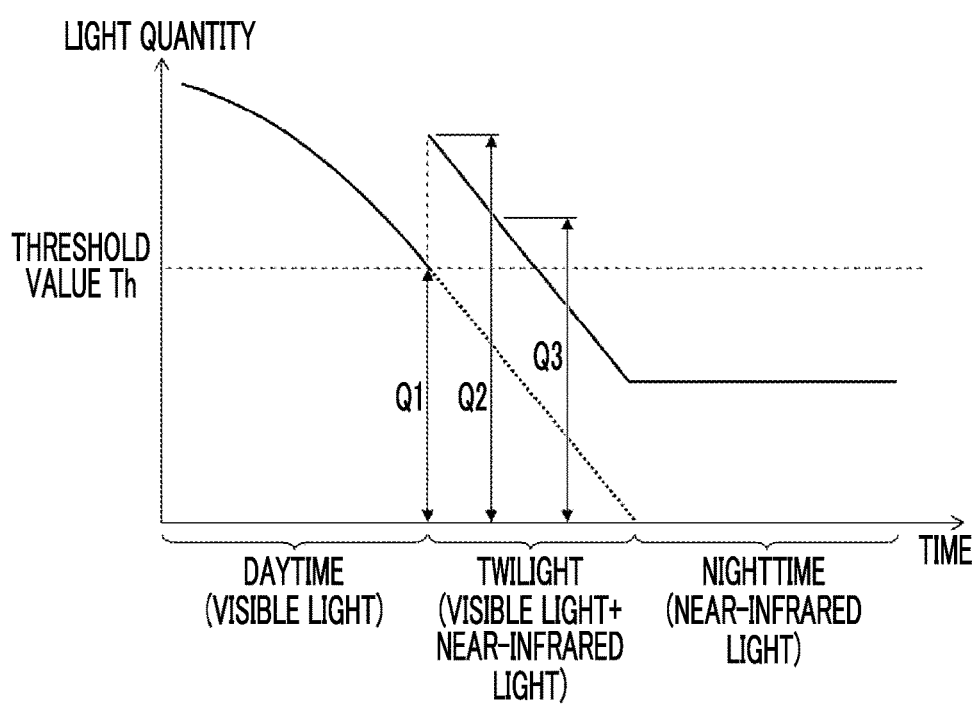
FIG. 21 is a graph illustrating a change in luminance (light quantity) of a subject over time from daytime to nighttime.

FIG. 21 is a graph illustrating a change in luminance (light quantity) of the subject over time from daytime to nighttime. As illustrated in FIG. 21, the light quantity of the subject (light quantity of sunlight) gradually decreases over time from daytime to nighttime and becomes zero at nighttime.

In a time zone of twilight, in a case where the light quantity of the subject is less than a threshold value Th, the imaging mode is switched from the first imaging mode to the second imaging mode, and capturing of near-infrared light image is performed. That is, the imaging mode is switched to the first imaging mode at daytime, and switched to the second imaging mode at twilight and night. In a case where the imaging mode is switched to the second imaging mode, the near-infrared light emitting unit 15 described above emits light, and the IR cut filter 25 is retracted from the imaging optical path L. As a result, in a case where the imaging mode is switched to the second imaging mode, the light quantity of the subject increases by the amount of the near-infrared light with which the subject has been irradiated from the near-infrared light emitting unit 15.

First, in a case where the light quantity at a time at which the light quantity of the subject becomes less than the threshold value Th is Q1, a light quantity at a time at which switching from the visible light image capturing mode to the near-infrared light imaging mode occurs is Q2, and the light quantity at an arbitrary time in a twilight state is Q3, the light quantity (light quantity Q2−light quantity Q1) obtained by subtracting the light quantity Q1 from the light quantity Q2 is a light quantity corresponding to the near-infrared light with which the subject has been irradiated from the near-infrared light emitting unit 15, and has a constant value. Accordingly, the light quantity at nighttime becomes a constant light quantity due to only the near-infrared light. Further, the light quantity of visible light in a twilight state is a light quantity [light quantity Q3−(light quantity Q2−light quantity Q1)] obtained by subtracting the constant light quantity (light quantity Q2−light quantity Q1) due to only the near-infrared light from the light quantity Q3.

In this embodiment, since the illuminance sensor 27 is provided in the surveillance camera 10E, the illuminance detection result input from the illuminance sensor 27 can be used as light quantity data indicating the light quantity (luminance) of the subject, that is, the above-described light quantities Q1 to Q3.

Referring back to FIG. 20, the light quantity ratio detection unit 106 stores the light quantity data (light quantity Q1) when the light quantity of the subject becomes less than the threshold value Th on the basis of the illuminance detection result input from the illuminance sensor 27, and the light quantity data (light quantity Q2) at the time of switching to the infrared optical imaging modes, and then detects a light quantity ratio between the light quantity [light quantity Q3−(light quantity Q2−light quantity Q1)] of the visible light in a twilight state and the light quantity (light quantity Q2−light quantity Q1) of the near-infrared light on the basis of the light quantity data (light quantity QC) that is input in real time. The light quantity ratio detection unit 106 outputs the light quantity ratio between the visible light and the near-infrared light to the weight adjustment unit 107.

The weight adjustment unit 107 adjusts the first weight α and the second weight (1−α) in a case where the weighted averaging processing unit 53 performs weighted averaging of the first optical characteristics and the second optical characteristics according to the detection result of the light quantity ratio between the visible light and the near-infrared light input from the light quantity ratio detection unit 106. Specifically, the weight adjustment unit 107 adjusts the first weight α to be higher as the amount of the visible light is larger than the amount of the near-infrared light and, conversely, adjusts the first weight α to be lower as the amount of the visible light is smaller than the amount of the near-infrared light on the basis of the detection result of the light quantity ratio between the visible light and the near-infrared light.

The weighted averaging processing unit 53 performs the weighted averaging of the first optical characteristics and the second optical characteristics on the basis of the first weight α and the second weight (1−α) after the adjustment in the weight adjustment unit 107. Since a subsequent process is basically the same as in the first embodiment, detailed description will be omitted herein.

Effects of Sixth Embodiment

Thus, in the surveillance camera 10E of the sixth embodiment, it is possible to appropriately adjust the first weight (α) and the second weight (1−α) in a case where the weighted averaging of the first optical characteristics and the second optical characteristics is performed according to the light quantity ratio between the visible light and the near-infrared light under dullness such as twilight. Thus, it is possible to calculate the average optical characteristics 59 using the first weight α and the second weight (1−α) that have been appropriate according to an environment in which the surveillance camera 10E is installed. As a result, it is possible to generate the common restoration filter F1 capable of well performing the point image restoration process on both of the image data (first image data D1, the second image data D2) respectively obtained by imaging at daytime and nighttime.

Further, the generation of such a common restoration filter F1 may be repeated at predetermined time intervals. Thus, the average optical characteristics 59 can be generated using the first weight α and the second weight (1−α) that are different from each other, for example, for each season in which a length of daytime and nighttime varies, and the common restoration filter F1 can be generated on the basis of the average optical characteristics 59.

Although a case where an example of the surveillance camera 10 of the first embodiment is the surveillance camera 10E provided in the restoration filter generation unit 51 has been described in the sixth embodiment, the invention according to the sixth embodiment can be similarly applied to a case where the restoration filter generation unit is provided in the surveillance camera of the second to fifth embodiments.

In the sixth embodiment, the light quantity of the subject is obtained on the basis of the illuminance detection result of the illuminance sensor 27. However, for example, in a case where automatic exposure control through control of the aperture 17 and control of a shutter speed (charge storage time of the imaging element 26) is performed, luminance [EV value (exposure value)] of the subject is detected. Therefore, a method for obtaining the light quantity of the subject is not particularly limited. For example, the detected EV value may be used as the light quantity (luminance) of the subject.

Configuration of Surveillance Camera of Seventh Embodiment

Next, a surveillance camera of a seventh embodiment of the present invention will be described. In each of each of the embodiments, the point image restoration process is performed on the first image data D1 obtained in the first imaging mode and the second image data D2 obtained in the second imaging mode using a common restoration filter. On the other hand, the surveillance camera of the seventh embodiment performs the point image restoration process on the second image data D2 using the restoration filter for R generated on the basis of the optical characteristics 57R for R described above.

Figure 22:
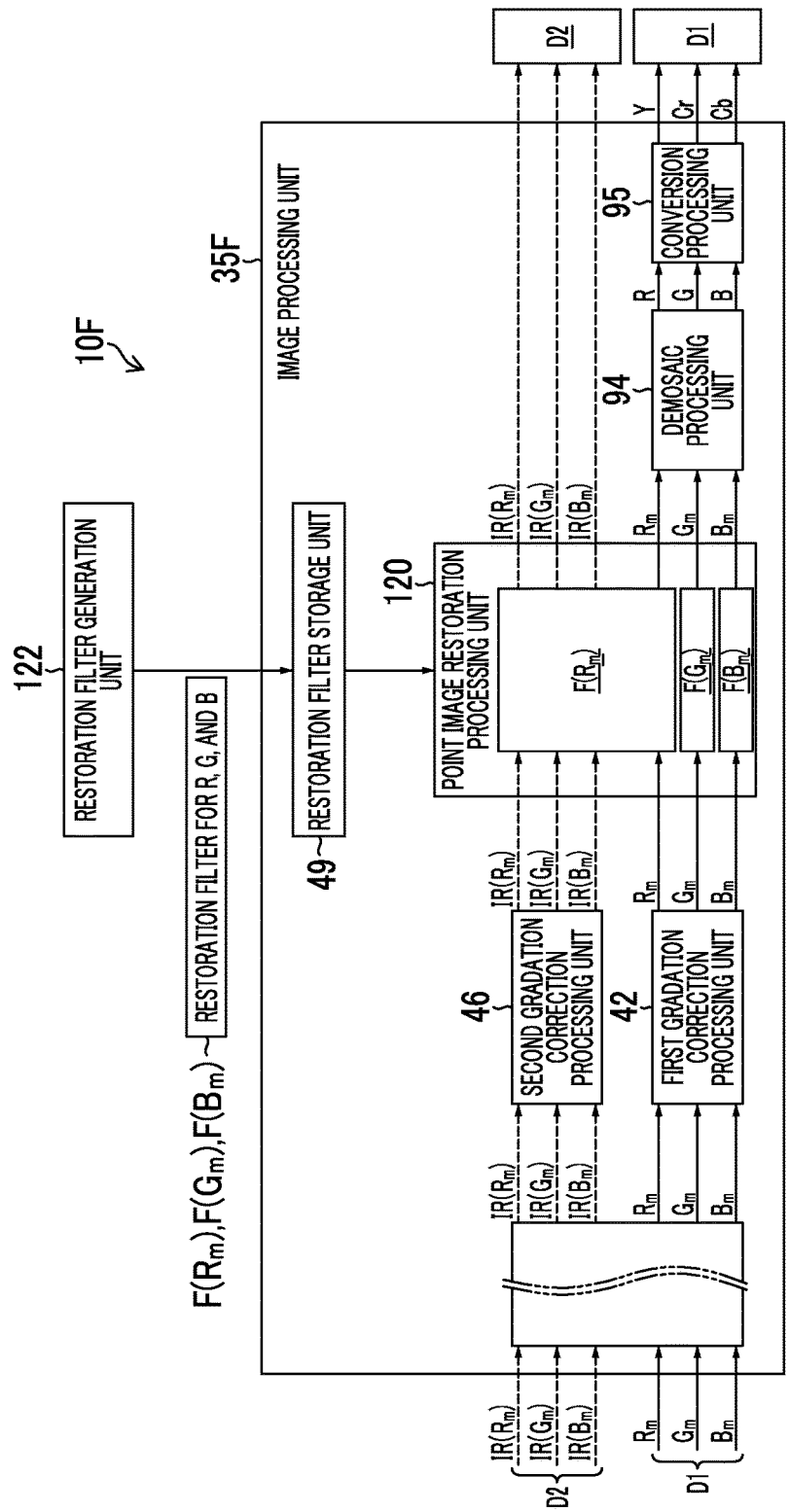
FIG. 22 is a functional block diagram of an image processing unit of a surveillance camera according to a seventh embodiment.

FIG. 22 is a functional block diagram of the image processing unit 35F of the surveillance camera 10F of the seventh embodiment. As illustrated in FIG. 22, the surveillance camera 10F has basically the same configuration as the surveillance camera 10B of the third embodiment (see FIG. 13) except the type of restoration filters used for the point image restoration process are different. Therefore, units that are the same in function and configuration as in each embodiment are denoted with the same reference numerals and description thereof will be omitted.

The image processing unit 35F has basically the same configuration as the image processing unit 35B of the third embodiment except that the image processing unit 35F functions as a restoration processing unit 120 different from the point image restoration processing unit 93 of the third embodiment (see FIG. 13).

The restoration filter storage unit 49 of the seventh embodiment stores the restoration filter $F(R_m)$ for R, the restoration filter $F(G_m)$ for G, and the restoration filter $F(B_m)$ for B used for the point image restoration process for the mosaic RGB image data obtained by the single plate type imaging element 26. The respective restoration filters $F(R_m)$, $F(G_m)$, and $F(B_m)$ are generated on the basis of the optical characteristics 57R, 57G, and 57B for R, G, and B described above by the restoration filter generation unit 122 using the above-described method. The restoration filter generation unit 122 is provided integrally with or separately from the surveillance camera 10F.

The point image restoration processing unit 120 performs a point image restoration process (amplitude correction and phase correction) on the mosaic RGB image data constituting the first image data D1 input from the first gradation correction processing unit 42 using the respective restoration filters $F(R_m)$, $F(G_m)$, and $F(B_m)$ read from the restoration filter storage unit 49 for each color of RGB in the first imaging mode. The point image restoration processing unit 120 outputs the mosaic RGB image data after the point image restoration process to the demosaic processing unit 94.

Further, the point image restoration processing unit 120 performs the point image restoration process on the mosaic $IR(R_m)$, $IR(G_m)$, and $IR(B_m)$ image data constituting the second image data D2 input from the second gradation correction processing unit 46 using the common restoration filter F(Rm) for R read from the restoration filter storage unit 49 in the second imaging mode. Since a subsequent process is basically the same as in the third embodiment, description thereof will be omitted.

Operation of Surveillance Camera of Seventh Embodiment

Next, an operation (an image processing method of the imaging device of the present invention) of the surveillance camera 10F having the above configuration will be described with reference to FIG. 23. Here, FIG. 23 is a flowchart illustrating a flow of an imaging process and image processing in the surveillance camera 10B.

Figure 23:
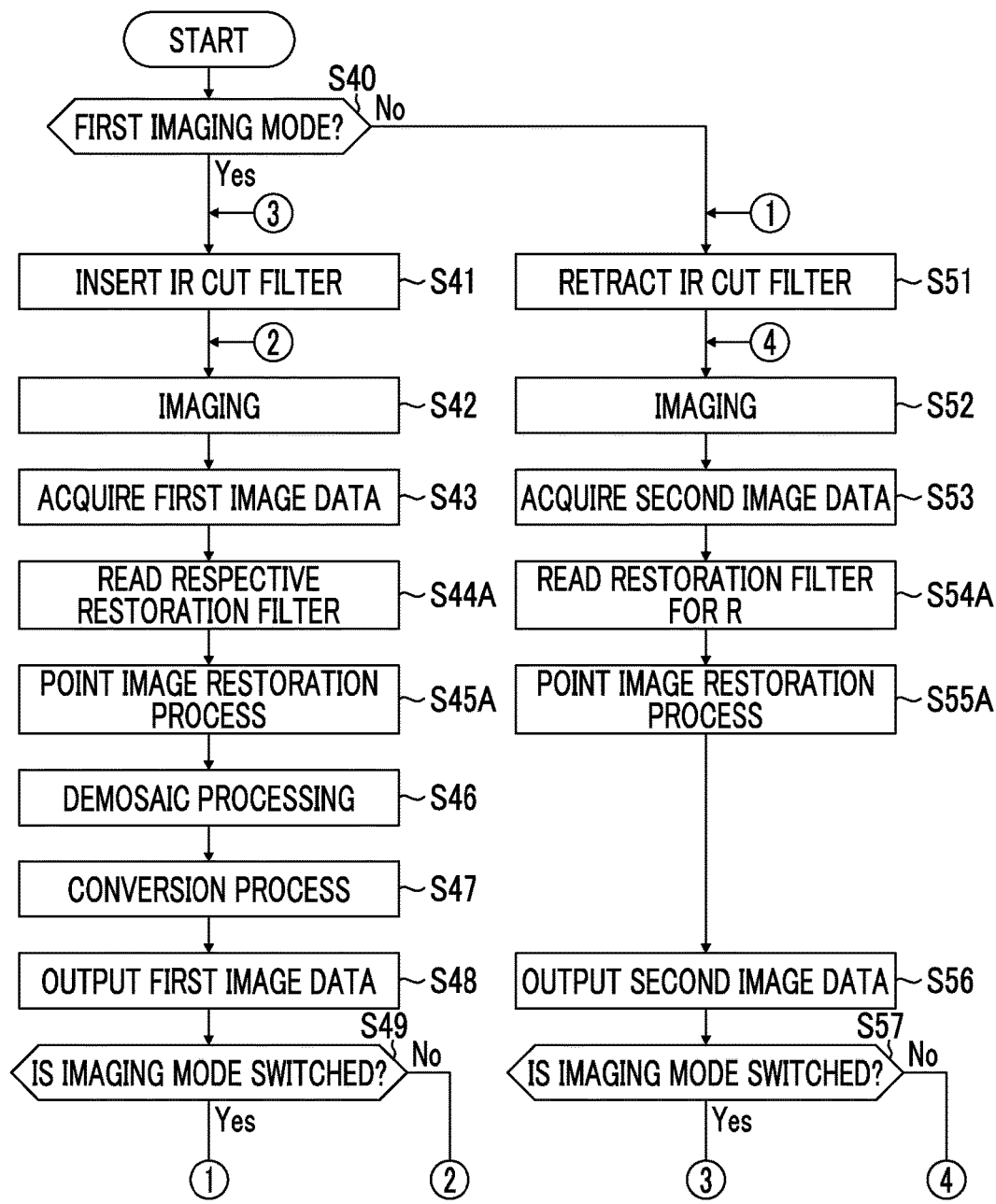
FIG. 23 is a flowchart illustrating a flow of an imaging process and image processing of the surveillance camera according to the seventh embodiment.

As illustrated in FIG. 23, the surveillance camera 10F of the seventh embodiment is basically the same as in the third embodiment illustrated in FIG. 16 except that the point image restoration processing unit 120 performs the point image restoration process on the mosaic RGB image data constituting the first image data D1 using the respective restoration filters $F(R_m)$, $F(G_m)$, and $F(B_m)$ read from the restoration filter storage unit 49 for each color of RGB in the first imaging mode (steps S44A and S45A).

Further, the surveillance camera 10F of the seventh embodiment is basically the same as in the third embodiment illustrated in FIG. 16 except that the point image restoration processing unit 120 performs the point image restoration process on the mosaic mosaic $IR(R_m)$, $IR(G_m)$, and $IR(B_m)$ image data constituting the second image data D2 using the restoration filter $F(R_m)$ for R read from the restoration filter storage unit 49 in the second imaging mode (steps S54A and S55A).

In the seventh embodiment, steps S43 and S53 correspond to an image acquisition step of the present invention, and step S55A corresponds to a point image restoration process step of the present invention.

Effect of Seventh Embodiment

In the surveillance camera 10F of the thus seventh embodiment, since the restoration filter $F(R_m)$ for R is used instead as a restoration filter used for the point image restoration process for the second image data D2 ($IR(R_m)$, $IR(G_m)$, and $IR(B_m)$ image data), it is unnecessary to separately generate and store the restoration filter used for the point image restoration process on the second image data D2. As a result, it is possible to reduce the resources necessary for the point image restoration process, as in each of the embodiments.

Modification Example of Seventh Embodiment

Although the restoration filter generated on the basis of the optical characteristics 57R for R of the optical system (that is, a restoration filter generated by directly using the optical characteristics 57R for R) is used as the restoration filter $F(R_m)$ for R used for the point image restoration process of the R image data and the $IR(R_m)$ image data in the seventh embodiment, a restoration filter generated on the basis of a result of performing a calculation process on the optical characteristics 57R for R may be used. The "calculation process" described herein is, for example, a calculation process of obtaining integer $\lambda$ ($0<\lambda<1$) multiple of a component ($\omega_x \neq 0$, $\omega_y \neq 0$) other than a direct current component of the optical characteristics 57R (OTF) for R. This is because, generally, the IR image is more blurred than the R image, and the spread of the optical characteristics (OTF) for IR is larger than the spread of the optical characteristics (OTF) for R. The value of $\lambda$ is adjusted, for example, subjectively while viewing the image after the point image restoration process. The same applies to the restoration filter for R in eighth to tenth embodiments to be described below.

Surveillance Camera of Eighth Embodiment

Next, a surveillance camera of an eighth embodiment of the present invention will be described. The surveillance camera 10F of the seventh embodiment performs imaging of a subject using the single plate type imaging element 26. On the other hand, the surveillance camera of the eighth embodiment performs imaging of a subject using the three-plate type imaging elements 26R, 26G, and 26B, as illustrated in FIG. 11 described above.

Figure 24:
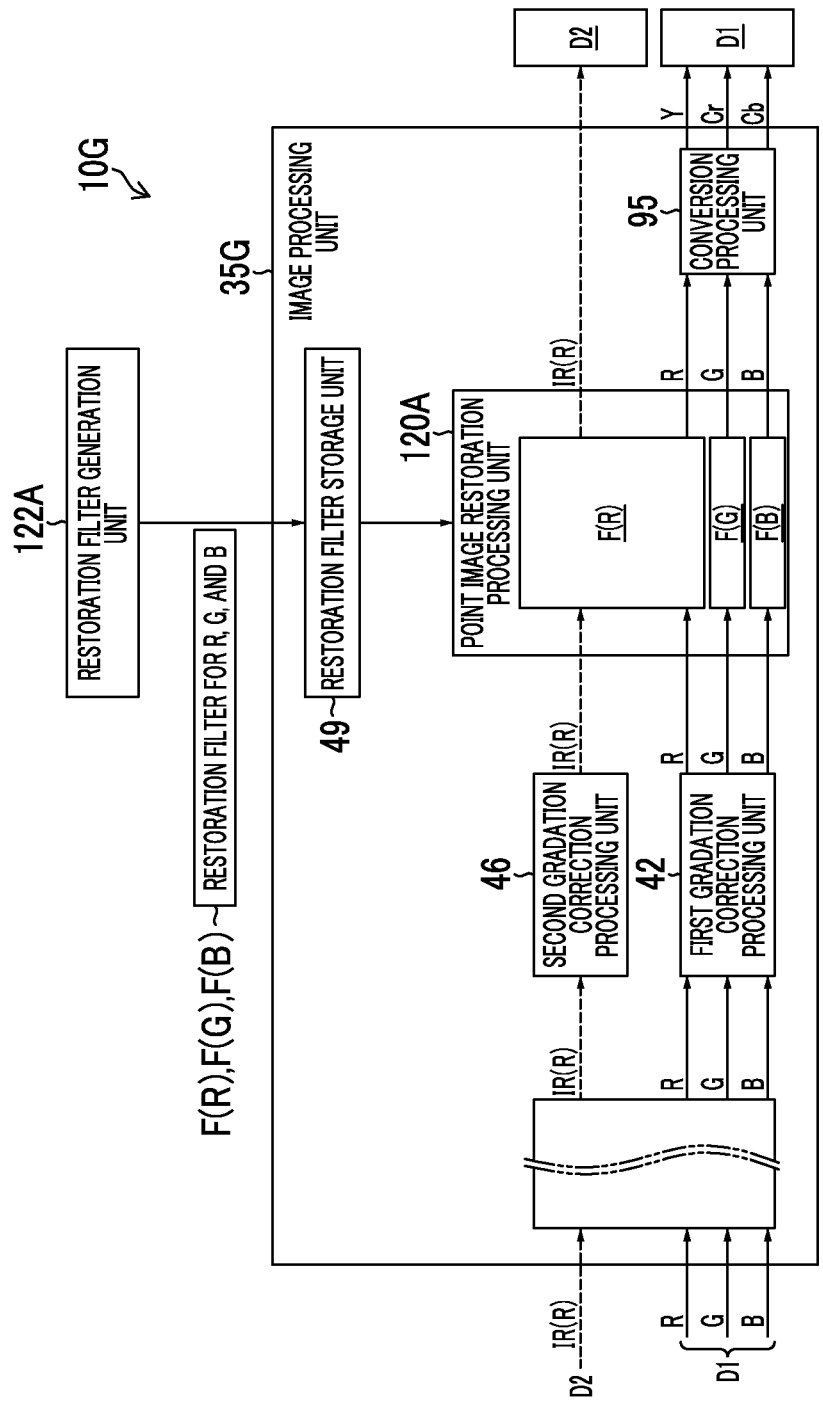
FIG. 24 is a functional block diagram of an image processing unit of a surveillance camera according to an eighth embodiment.

FIG. 24 is a functional block diagram of an image processing unit 35G of a surveillance camera 10G of the eighth embodiment. As illustrated in FIG. 24, the surveillance camera 10G has basically the same configuration as the surveillance camera 10C of the fourth embodiment (see FIG. 17) except for the image processing unit 35G, units that are the same in function and configuration as in each embodiment are denoted with the same reference numerals, and description thereof will be omitted.

The image processing unit 35G has basically the same configuration as the image processing unit 35C of the fourth embodiment except that the image processing unit 35G functions as an image restoration processing unit 120A different from the point image restoration processing unit 93A of the fourth embodiment (see FIG. 17). In a case where the point image restoration process is performed on the brightness-based image data, since the eighth embodiment is basically the same as the seventh embodiment except for the presence or absence of demosaic processing, description thereof will be omitted herein.

The restoration filter storage unit 49 of the eighth embodiment stores the restoration filter F(R) for R, the restoration filter F(G) for G, and the restoration filter F(B) for B that are used for the point image restoration process for the RGB image data of three surfaces obtained by the three-surface type imaging elements 26R, 26G, and 26B. The respective restoration filters F(R), F(G), and F(B) are generated using the above-described method by the restoration filter generation unit 122A described above on the basis of the optical characteristics 57R, 57G and 57B for R, G, and B described above. The restoration filter generation unit 122A is provided integrally with or separately from the surveillance camera 10G.

The point image restoration processing unit 120A performs a point image restoration process (amplitude correction and phase correction) on the RGB image data of three surfaces constituting the first image data D1 input from the first gradation correction processing unit 42 using the respective restoration filters F(R), F(G), and F(B) read from the restoration filter storage unit 49 for each color of RGB in the first imaging mode. The point image restoration processing unit 120A outputs the RGB image data of three surfaces after the point image restoration process to the conversion processing unit 95.

On the other hand, the point image restoration processing unit 120A performs a point image restoration process on the IR(R) image data of one surface input as the second image data D2 from the second gradation correction processing unit 46 using the restoration filter F(R) for R read from the restoration filter storage unit 49 in the second imaging mode. Since a subsequent process is basically the same as in the fourth embodiment, description thereof will be omitted herein.

Since an operation of the surveillance camera 10G of the eighth embodiment is basically the same as in the seventh embodiment (see FIG. 23) except that image processing such as a point image restoration process corresponding to the three-plate type imaging elements 26R, 26G, and 26B is performed, detailed description thereof will be omitted herein.

Effects of Eighth Embodiment

Thus, in the surveillance camera 10G of the eighth embodiment, since the restoration filter F(R) for R is used instead as a restoration filter used for the point image restoration process for the second image data D2 (IR(R) image data), the same effects as in the seventh embodiment can be obtained.

Surveillance Camera of Ninth Embodiment

Next, a surveillance camera according to a ninth embodiment of the present invention will be described. Although the case where imaging of the subject is performed using the imaging element 26 of a single plate type in which RGB pixels are arranged in a matrix form on an imaging surface has been described in the surveillance camera 10F (see FIG. 22) of the seventh embodiment, the surveillance camera of the ninth embodiment performs the imaging of the subject using the imaging element 26 of the single plate type in which RGB pixels and IR pixels are arranged in a matrix form on the imaging surface as illustrated in FIG. 18A.

Figure 25:
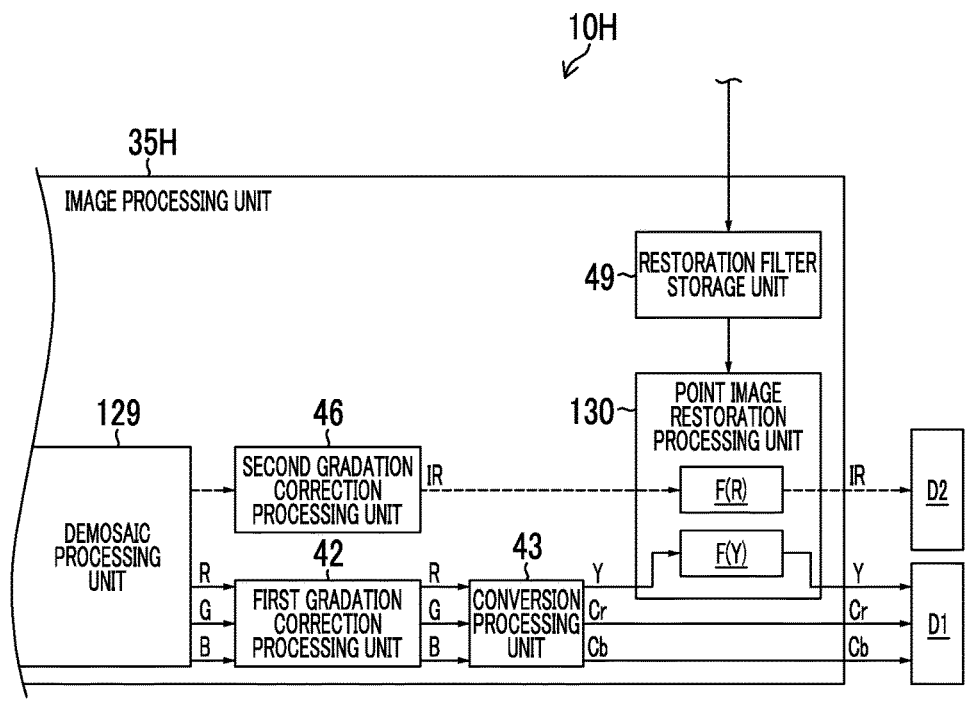
FIG. 25 is a functional block diagram of an image processing unit of a surveillance camera according to a ninth embodiment.

FIG. 25 is a functional block diagram of an image processing unit 35H of the surveillance camera 10H of the ninth embodiment. As illustrated in FIG. 24, the surveillance camera 10H has basically the same configuration as the surveillance camera 10 of the first embodiment (FIG. 5) except for an imaging element 26 having IR pixels, and a demosaic processing unit 129 and a point image restoration processing unit 130 of an image processing unit 35H, and units that are the same in function and configuration as in each embodiment are denoted with the same reference numerals and description thereof will be omitted.

The demosaic processing unit 129 of the ninth embodiment is basically the same as the demosaic processing unit 41 of the first embodiment except that demosaic processing is performed on mosaic image data (not illustrated) obtained from the IR pixel as the second image data D2, and IR image data of one surface is output to the point image restoration processing unit 130 in the second imaging mode.

The restoration filter storage unit 49 of the ninth embodiment stores the restoration filter F(Y) used for a point image restoration process for brightness data Y generated by the conversion processing unit 43 converting the above-described RGB image data, and the restoration filer F(R) for R described in the eighth embodiment described above. Since a method of generating the restoration filter F(Y) is a known art, description thereof will be omitted.

The point image restoration processing unit 130 performs the point image restoration process on the brightness data Y input from the conversion processing unit 43 using the restoration filter F(Y) read from the restoration filter storage unit 49 in the first imaging mode. On the other hand, the point image restoration processing unit 130 performs the point image restoration process on the IR image data of one surface input from the second gradation correction processing unit 46 using the restoration filter F(R) for R read from the restoration filter storage unit 49 in the second imaging mode. Since a subsequent process is basically the same as in the first embodiment, description thereof will be omitted herein.

Effect of Ninth Embodiment

Thus, in the surveillance camera 10H of the ninth embodiment, since the restoration filter F(R) for R is used instead as a restoration filter used for the point image restoration process for the second image data D2 of one surface, it is unnecessary to separately generate the restoration filter used for the point image restoration process on the second image data D2.

Surveillance Camera of Tenth Embodiment

Next, a surveillance camera of a tenth embodiment of the present invention will be described. The surveillance camera 10H of the ninth embodiment performs a point image restoration process on the brightness-based image data (the brightness data Y and the second image data D2) in the point image restoration processing unit 130. Accordingly, the surveillance camera of the tenth embodiment performs the point image restoration process on image data obtained respectively by R pixels, IR pixels, G pixels, and B pixels using different restoration filters.

Figure 26:
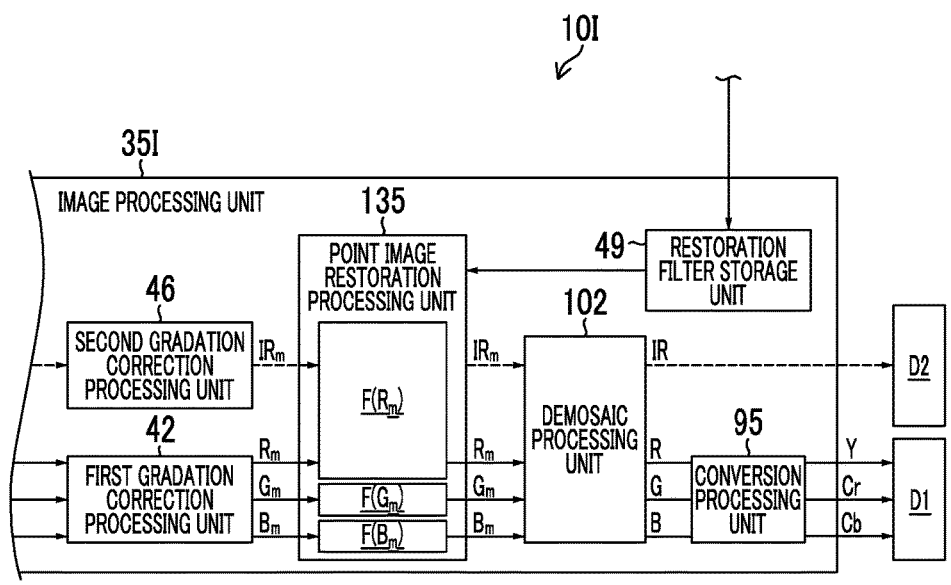
FIG. 26 is a functional block diagram of an image processing unit of a surveillance camera according to a tenth embodiment.

FIG. 26 is a functional block diagram of an image processing unit 35I of a surveillance camera 10I of the tenth embodiment. As illustrated in FIG. 26, the surveillance camera 10I has basically the same configuration as the surveillance camera 10D of the fifth embodiment (see FIG. 19) except for a point image restoration processing unit 135 of the image processing unit 35I, and units that are the same in function and configuration as in each embodiment are denoted with the same reference numerals and description thereof will be omitted.

The restoration filter storage unit 49 of the tenth embodiment stores the restoration filter $F(R_m)$ for R, the restoration filter $F(G_m)$ for G, and the restoration filter $F(B_m)$ for B that are used for the point image restoration process on the mosaic image data, similar to the seventh embodiment (see FIG. 22).

The point image restoration processing unit 135 performs a point image restoration process on the mosaic RGB image data constituting the first image data D1 input from the first gradation correction processing unit 42 using the respective restoration filters $F(R_m)$, $F(G_m)$, and $F(B_m)$ read from the restoration filter storage unit 49 for each color of RGB in the first imaging mode.

On the other hand, the point image restoration processing unit 135 performs the point image restoration process on the mosaics $IR_m$ image data input from the second gradation correction processing unit 46 as the second image data D2 using the restoration filter $F(R_m)$ for R read from the restoration filter storage unit 49 in the second imaging mode. Since the R pixels and the IR pixels of the imaging element 26 are arranged at the same pitch and the arrangement patterns are the same as illustrated in FIG. 18A, the point image restoration process can be performed using the same restoration filter $F(R_m)$ for R. Since a subsequent process is basically the same as in the fifth embodiment, description thereof will be omitted herein.

Effects of Tenth Embodiment

As described above, in the surveillance camera 10I of the tenth embodiment, a restoration filter F(Rm) for R can be used instead as the restoration filter used for the point image restoration process for the second image data D2 ($IR_m$ image data), the same effects as the effects described in the seventh embodiment can be obtained.

[Others]

Although a case where general image processing that the image processing unit performs in addition to the point image restoration process is the gain correction process or the gradation correction process has been described in each of the embodiments, the image processing unit may perform various known other image processing.

Although the image processing unit which performs the point image restoration process is provided in the surveillance camera in each of the embodiments, the image processing unit may be provided in the computer 60 or the server 80 described above.

The imaging device (surveillance camera) described in each of the embodiments is capable of recording a program (the above-described image processing program 37B, or the like) for causing a computer of the imaging device as means for performing the point image restoration process on the image data, on a compact disc read only memory (CD-ROM), a magnetic disk, or another computer-readable medium (tangible non-transitory information storage medium), and providing the program through the information storage medium. A program signal can be provided in a download service using a communication network such as the Internet, instead of an aspect in which the program is stored in such an information storage medium and provided.

<Example of Application to EDoF System>

The point image restoration process in the above embodiment can be applied to, for example, a point image restoration process for image data captured and acquired by an optical system (a lens or the like) having an extended depth of field (EDoF: focus).

By performing the point image restoration process on image data of a blurred image captured and acquired in a state in which the depth of field (focal depth) is extended by an EDoF optical system, it is possible to achieve restoration to high-resolution image data in a state in which focusing has been made in a wide range. In this case, a restoration process using a point image restoration filter based on a transfer function (PSF, OTF, MTF, PTF, or the like) of the EDoF optical system, which is a point image restoration filter having a filter coefficient set so that good image restoration can be performed within a range of the extended depth of field (focus depth).

Further, an aspect to which the present invention is applicable is not limited to the surveillance camera or the digital camera, and the present invention is also applicable to a mobile device including other functions (a calling function, a communication function, and other computer functions) other than imaging as well as an imaging function, in addition to a camera having imaging as a main function. Examples of other aspects to which the present invention is applicable include a portable phone or smartphone, a personal digital assistant (PDA), and a portable game machine having a camera function. Hereinafter, an example of the smartphone to which the present invention is applicable will be described.

<Configuration of Smartphone>

Figure 27:
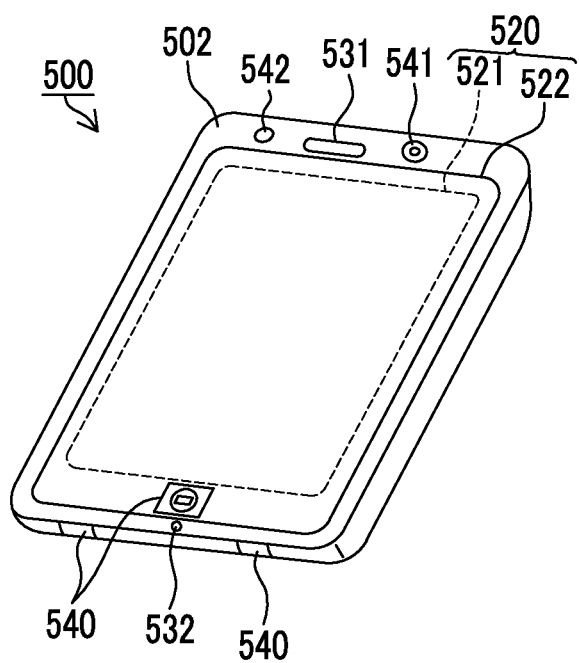
FIG. 27 illustrates an appearance of a smartphone which is an embodiment of an imaging device.

FIG. 27 illustrates an external appearance of a smartphone 500 that is an embodiment of an imaging device. The smartphone 500 illustrated in FIG. 27 includes a plate-shaped casing 502, and includes a display panel 521 as a display unit on one surface of the casing 502, and a display and input unit 520 integrally formed with an operation panel 522 serving as an input unit. Further, the casing 502 includes a speaker 531, a microphone 532, an operation unit 540, a camera unit 541, and an LED light emitting unit 542. A configuration of the casing 502 is not limited thereto. For example, a configuration in which a display unit and an input unit are independent may be adopted or a configuration having a folding structure or a slide mechanism can be adopted.

Figure 28:
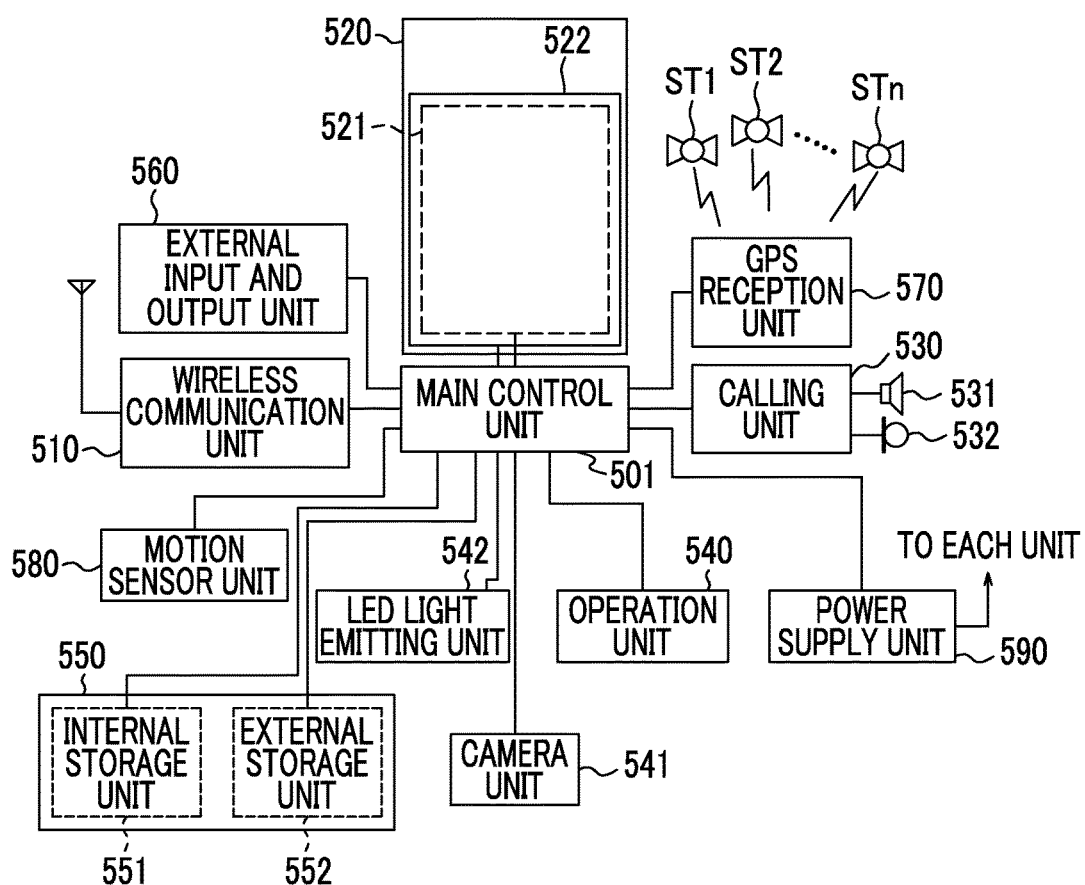
FIG. 28 is a block diagram illustrating a configuration of the smartphone illustrated in FIG. 27.

FIG. 28 is a block diagram illustrating a configuration of the smartphone 500 illustrated in FIG. 27. As illustrated in FIG. 28, main components of the smartphone 500 include a wireless communication unit 510, a display and input unit 520, a calling unit 530, an operation unit 540, a camera unit 541, a storage unit 550, an external input and output unit 560, a global positioning system (GPS) reception unit 570, a motion sensor unit 580, a power supply unit 590, and a main control unit 501. Further, a main function of the smartphone 500 includes a wireless communication function of performing mobile wireless communication via a base station device or a mobile communication network.

The wireless communication unit 510 performs wireless communication with the base station device accommodated in the mobile communication network according to an instruction from the main control unit 501. Using this wireless communication, transmission and reception of various types of file data such as audio data and image data, electronic mail data, or the like, or reception of Web data, streaming data, or the like is performed.

The display and input unit 520 is a so-called touch panel that displays an image (still image and a moving image), text information, or the like to visually transfer information to a user and detects a user operation for the displayed information under control of the main control unit 501, and includes a display panel 521 and an operation panel 522. In a case where a generated 3D image is viewed, the display panel 521 is preferably a 3D display panel.

The display panel 521 uses a liquid crystal display (LCD), an organic electro-luminescence display (OELD), or the like as a display device.

The operation panel 522 is a device that is mounted so that an image displayed on a display surface of the display panel 521 can be viewed and detects one or a plurality of coordinates at which the device is operated by a user's finger or a stylus. In a case where this device is operated by the user's finger or the stylus, a detection signal generated due to the operation is output to the main control unit 501. Then, the main control unit 501 detects an operation position (coordinates) on the display panel 521 on the basis of the received detection signal.

As illustrated in FIG. 27, the display panel 521 and the operation panel 522 of the smartphone 500 are integrally formed to constitute the display and input unit 520, but the operation panel 522 is arranged to completely cover the display panel 521. In a case where this arrangement is adopted, the operation panel 522 may have a function of detecting a user operation with respect to a region outside the display panel 521. In other words, the operation panel 522 may include a detection region (hereinafter referred to as a display region) for an overlapping portion that overlaps the display panel 521 and a detection region (hereinafter referred to as a non-display region) for an outer edge portion other than the display region that does not overlap the display panel 521.

A size of the display region and a size of the display panel 521 may completely match each other, but do not necessarily match each other. Further, the operation panel 522 may include two sensitive regions including an outer edge portion and an inner portion other than the outer edge portion. Further, a width of the outer edge portion is designed as appropriate according to a size of the casing 502, or the like. Further, examples of a position detection scheme adopted in the operation panel 522 may include a matrix switch scheme, a resistive film scheme, a surface acoustic wave scheme, an infrared scheme, an electromagnetic induction scheme, and an electrostatic capacitive scheme, and any of the schemes can be adopted.

The calling unit 530 includes a speaker 531 or a microphone 532, and converts user voice input via the microphone 532 into voice data which can be processed by the main control unit 501 and outputs the voice data to the main control unit 501, or decodes audio data received by the wireless communication unit 510 or the external input and output unit 560 and outputs the decoded audio data from the speaker 531. Further, as illustrated in FIG. 27, for example, the speaker 531 and the microphone 532 can be mounted on the same surface as a surface on which the display and input unit 520 is provided.

The operation unit 540 is a hardware key using a key switch, and receives an instruction from the user. For example, the operation unit 540 is a push button type switch that is mounted on a lower portion or a lower surface of the display portion of the casing 502 of the smartphone 500, and is turned on when pressed by a finger or the like and turned off by restoring force of a spring or the like when the finger is released.

The storage unit 550 stores a control program or control data of the main control unit 501, address data associated with a name or a telephone number of a communication partner, data of a transmitted or received electronic mail, web data downloaded by web browsing, and downloaded content data, and temporarily stores streaming data or the like. Further, the storage unit 550 includes an internal storage unit 551 built into a smartphone, and an external storage unit 552 having a slot for a detachable external memory. Each of the internal storage unit 551 and the external storage unit 552 constituting the storage unit 550 is realized using a storage medium such as a flash memory type memory, a hard disk type memory, a multimedia card micro type memory, a card type memory (for example, a micro SD (registered trademark) memory), a random access memory (RAM), or a read only memory (ROM).

The external input and output unit 560 serves as an interface with all external devices connected to the smartphone 500, and is used for direct or indirect connection to other external devices through communication or the like (for example, Universal Serial Bus) or a network (for example, the Internet or a wireless local area network (LAN), Bluetooth (registered trademark), radio frequency identification (RFID), infrared communication (infrared Data Association: IrDA), ultra wideband (UWB) (registered trademark), or ZigBee (registered trademark)).

Examples of the external device connected to the smartphone 500 include a wired/wireless headset, a wired/wireless external charger, a wired/wireless data port, a memory card or a subscriber identity module (SIM) card/a user identity module (UIM) card connected via a card socket, an external audio and video device that is connected via an audio and video input/output (I/O) terminal, a wirelessly connected external audio and video device, a wiredly/wirelessly connected smartphone, a wiredly/wirelessly connected personal computer, a wiredly/wirelessly connected PDA, and an earphone. The external input and output unit can transfer data received a transmission from such an external device to each component in the smartphone 500 or causes data in the smartphone 500 to be transferred to an external device.

According to an instruction of the main control unit 501, the GPS reception unit 570 receives receives a GPS signal transmitted from GPS satellite ST1 to STn, and executes a position measurement calculation process based on a plurality of received GPS signals to detect a position including latitude, longitude, and altitude of the smartphone 500. When the GPS reception unit 570 acquires position information from the wireless communication unit 510 or the external input and output unit 560 (for example, a wireless LAN), the GPS reception unit 570 can detect the position using the position information.

The motion sensor unit 580 includes, for example, a three-axis acceleration sensor, and detects a physical motion of the smartphone 500 according to an instruction of the main control unit 501. By detecting the physical motion of the smartphone 500, a direction or an acceleration at which the smartphone 500 moves is detected. A result of the detection is output to the main control unit 501.

The power supply unit 590 supplies power stored in a battery (not illustrated) to each unit of the smartphone 500 according to an instruction from the main control unit 501.

The main control unit 501 includes a microprocessor, operates according to a control program or control data stored in the storage unit 550, and generally controls respective units of the smartphone 500. Further, the main control unit 501 includes a mobile communication control function of controlling each unit of a communication system in order to perform voice communication or data communication via the wireless communication unit 510, and an application processing function.

The application processing function is realized by the main control unit 501 operating according to application software stored in the storage unit 550. Examples of the application processing function include an infrared communication function of controlling the external input and output unit 560 and performing data communication with a counterpart device, an electronic mail function of performing transmission and reception of an electronic mail, and a web browsing function of browsing web pages.

Further, the main control unit 501 includes an image processing function of, for example, displaying an image on the display and input unit 520 on the basis of image data (data of a still image or a moving image) such as received data or downloaded streaming data. The image processing function refers to a function in which the main control unit 501 decodes the image data, performs image processing on a result of decoding, and displays the image on the display and input unit 520.

Further, the main control unit 501 executes display control for the display panel 521, and an operation detection control for detecting a user operation through the operation unit 540 and the operation panel 522.

Through the execution of the display control, the main control unit 501 displays an icon for starting up an application software or a software key such as a scroll bar, or displays a window for creating an electronic mail. The scroll bar refers to a software key for receiving an instruction to move a display portion of the image, for example, for a large image which cannot be fit to the display region of the display panel 521.

Further, through the execution of the operation detection control, the main control unit 501 detects a user operation through the operation unit 540, receives an operation with respect to the icons through the operation panel 522 or an input of a character string to an input column of the window, or receives a request for scrolling of a display image through the scroll bar.

Further, through the execution of the operation detection control, the main control unit 501 includes a touch panel control function of determining an operating position with respect to the operation panel 522 is an overlapping portion (a display region) overlapping the display panel 521 or an outer edge portion (a non-display region) that does not overlap the display panel 521 other than the display region, and controlling a sensitive region of the operation panel 522 or a display position of the software keys.

Further, the main control unit 501 can detect a gesture operation with respect to the operation panel 522, and execute a predetermined function according to the detected gesture operation. The gesture operation is not an existing simple touch operation and refers to an operation of drawing a trajectory using a finger or the like, simultaneously designating a plurality of positions, or combining them to draw a trajectory with respect to at least one of a plurality of positions.

The camera unit 541 is an imaging device for performing electronic imaging using a CMOS or CCD type imaging element described above. The configuration of the surveillance camera 10 described above can be applied to the camera unit 541. In this case, for a small thickness of the smartphone 500, it is preferable to use an imaging device capable of capturing the visible light image and the near-infrared light image without a filter device that inserts or retracts the IR cut filter into or from the imaging optical path. For example, the imaging element 26 including the RGB pixels and the IR pixels illustrated in FIG. 18A can be used as an imaging element of the camera unit 541.

The LED light emitting unit 542 includes a white LED and a near-infrared LED, turns on the white LED in a case where light quantity of the subject is insufficient in the visible light image capturing mode to emit white light from the white LED as auxiliary light at the time of capturing of the visible light image, and turns on the near-infrared LED in the near-infrared light image capturing mode to emit near-infrared light from the near-infrared LED as auxiliary light at the time of near-infrared light image capturing. Further, the near-infrared LED can be used as a light source for infrared communication in the case of the smartphone 500 having an infrared communication function.

Further, the camera unit 541 can convert the image data obtained by imaging into, for example, compressed image data such as Joint Photographic coding Experts Group (JPEG) and record the compressed image data in the storage unit 550 or output the compressed image data through the external input and output unit 560 or the wireless communication unit 510 under control of the main control unit 501. In the smartphone 500 illustrated in FIG. 27, the camera unit 541 is mounted on the same surface as the display and input unit 520, but a mounting position of the camera unit 541 is not limited thereto. The camera unit 541 may be mounted on a back surface of the display and input unit 520 or a plurality of camera units 541 may be mounted. In a case where the plurality of camera units 541 are mounted, switching to the camera unit 541 for imaging occurs and the camera unit 541 performs imaging alone, or imaging can be performed using the plurality of camera units 541.

Further, the camera unit 541 can be used for various functions of the smartphone 500. For example, the image acquired by the camera unit 541 can be displayed on the display panel 521 or the image of the camera unit 541 can be used as one operation input of the operation panel 522.

Further, in a case where the GPS reception unit 570 detects a position, it is also possible to detect the position by referring to the image from the camera unit 541. Further, it is possible to determine the optical axis of the camera unit 541 of the smartphone 500 or determine a current use environment without using a three-axis acceleration sensor or in combination with the three-axis acceleration sensor by referring to the image from the camera unit 541. It is understood that the image from the camera unit 541 can be used in application software.

REFERENCE NUMERALS 10, 10A: surveillance camera
12: lens unit
16: lens
25: infrared (IR) cut filter
26: imaging element
26R, 26G, 26B: imaging element
35, 35A: image processing unit
37B: image processing program
39: image acquisition unit
44, 93: point image restoration processing unit
49: restoration filter storage unit
51, 96: restoration filter generation unit
53: weighted averaging processing unit
55, 98: restoration filter calculation unit
57R: optical characteristics for R
57G: optical characteristics for G
57B: optical characteristics for B
58: optical characteristics for IR
58R: optical characteristics for IR(R)
58G: optical characteristics for IR(G)
58B: optical characteristics for IR(B)
59: average optical characteristics
59R: average optical characteristics for R
59G: average optical characteristics for G
59B: average optical characteristics for B
106: light quantity ratio detection unit
F1: common restoration filter
$F2_R$, $F3_R$, $F4_R$: common restoration filter for R
$F2_G$: common restoration filter for G
$F2_B$: common restoration filter for B

What is claimed is:

1. An imaging device, comprising:
at least one processor configured to
acquire image data obtained by imaging of an imaging element capable of imaging a subject with sensitivity to a wavelength band of visible light and a wavelength band of near-infrared light via an optical system; and
perform a point image restoration process using a restoration filter on the image data acquired by the processor, the processor performing the point image restoration process using a common restoration filter on the image data of the subject captured with sensitivity to the wavelength band of the visible light by the imaging element and the image data of the subject captured with sensitivity to the wavelength band of the near-infrared light by the imaging element,
wherein the common restoration filter is calculated on the basis of average optical characteristics of the optical system obtained by performing weighted averaging of first optical characteristics with respect to the visible light of the optical system and second optical characteristics with respect to the near-infrared light of the optical system.

2. The imaging device according to claim 1, further comprising:
a near-infrared light emitting unit that emits near-infrared light as auxiliary light in a case where imaging is performed with the sensitivity to the wavelength band of the near-infrared light by the imaging element.

3. The imaging device according to claim 1, further comprising:
an infrared cut filter that is arranged in an imaging optical path to the imaging element in a case where imaging is performed with the sensitivity to the wavelength band of the visible light by the imaging element, and is retracted from the imaging optical path in a case where imaging is performed with the sensitivity to the wavelength band of the near-infrared light by the imaging element.

4. The imaging device according to claim 1,
wherein the first optical characteristics are optical characteristics of the optical system with respect to each of beams of the visible light with a plurality of colors included in the wavelength band of the visible light,
the common restoration filter is calculated on the basis of the average optical characteristics obtained by performing weighted averaging of the first optical characteristics for each of the plurality of colors and the second optical characteristics, and
the processor performs the point image restoration process using a common restoration filter on brightness-based image data that is image data regarding brightness generated on the basis of the image data.

5. The imaging device according to claim 4,
wherein the imaging element includes first pixels of a plurality of colors having sensitivity to the wavelength band of visible light, and
the average optical characteristics are obtained by performing weighted averaging of the first optical characteristics for each of the plurality of colors and the second optical characteristics on the basis of a first weight for the first optical characteristics, a second weight for the second optical characteristics, and an appearance frequency of each color of the first pixels.

6. The imaging device according to claim 5,
wherein the imaging element includes the first pixels, and second pixels having sensitivity to the wavelength band of the near-infrared light, and
a pixel pitch between pixels of the same color in the first pixels of the imaging element and a pixel pitch of the second pixels are the same.

7. The imaging device according to claim 1,
wherein the imaging element includes first pixels of a plurality of colors having sensitivity to the wavelength band of visible light,
the first optical characteristics are optical characteristics of the optical system with respect to each of beams of the visible light with a plurality of colors included in the wavelength band of the visible light,
the second optical characteristics are optical characteristics of the optical system for each color pixel of the first pixels with respect to the near-infrared light to which each first pixel of the plurality of colors has sensitivity,
the common restoration filter is calculated for each of the plurality of colors on the basis of the average optical characteristics of each of the plurality of colors obtained by performing weighted averaging of the first optical characteristics of each of the plurality of colors and the second optical characteristics of each of the plurality of colors, and the processor performs, for each of the plurality of colors, the point image restoration process on the image data of each of the plurality of colors obtained by the first pixels of the plurality of colors using the common restoration filter of each of the plurality of colors.

8. The imaging device according to claim 7,
wherein the average optical characteristics of each of the plurality of colors are obtained by performing weighted averaging of the first optical characteristics and the second optical characteristics for each of the plurality of colors on the basis of a first weight for the first optical characteristic, a second weight for the second optical characteristics, and sensitivity characteristics indicating sensitivity to a wavelength of the visible light and the near-infrared light of the first pixels of the plurality of colors.

9. The imaging device according to claim 1,
wherein the imaging element includes first pixels of a plurality of colors having sensitivity to the wavelength band of the visible light, and second pixels having sensitivity to the wavelength band of the near-infrared light,
the common restoration filter is calculated on the basis of the average optical characteristics obtained by performing weighted averaging of the first optical characteristics of the optical system corresponding to red light in the visible light and the second optical characteristics, and
the processor performs a point image restoration process using the common restoration filter on the image data obtained by the first pixel of red among the plurality of colors and the image data obtained by the second pixel.

10. The imaging device according to claim 9,
wherein a pixel pitch between pixels of the same color in the first pixels of the imaging element and a pixel pitch of the second pixels are the same.

11. The imaging device according to claim 1 the processor further configured to:
detect a light quantity ratio of the visible light and the near-infrared light incident on the imaging element;
store the first optical characteristics and the second optical characteristics; and
generate the common restoration filter on the basis of the average optical characteristics obtained by performing the weighted averaging of the first optical characteristics and the second optical characteristics stored in the processor,
wherein the processor adjusts a first weight for the first optical characteristics and a second weight for the second optical characteristics when the weighted averaging is performed according to a result of the detection of the processor.

12. An image processing method of the imaging device according to claim 1, the image processing method comprising:
an image acquisition step of acquiring image data obtained by imaging of the imaging element capable of imaging a subject with sensitivity to a wavelength band of visible light and a wavelength band of near-infrared light via the optical system; and
a point image restoration processing step of performing a point image restoration process using a restoration filter on the image data acquired in the image acquisition step, the point image restoration processing step including performing a point image restoration process using a common restoration filter on the image data of the subject captured with sensitivity to the wavelength band of the visible light by the imaging element and the image data of the subject captured with sensitivity to the wavelength band of the near-infrared light by the imaging element, wherein the common restoration filter is calculated on the basis of average optical characteristics of the optical system obtained by performing weighted averaging of first optical characteristics with respect to the visible light of the optical system and second optical characteristics with respect to the near-infrared light of the optical system.

13. A non-transitory computer readable recording medium storing a program for a computer of the imaging device according to claim 1 performing a point image restoration process on image data obtained by imaging of the imaging element capable of imaging a subject with sensitivity to a wavelength band of visible light and a wavelength band of near-infrared light via the optical system, the stored program functioning the computer as:

the processor that acquires the image data obtained by imaging of the imaging element;

the processor that performs a point image restoration process using a restoration filter on the image data acquired by the processor, the processor performing the point image restoration process using a common restoration filter on the image data of the subject captured with sensitivity to the wavelength band of the visible light by the imaging element and the image data of the subject captured with sensitivity to the wavelength band of the near-infrared light by the imaging element, the common restoration filter being calculated on the basis of average optical characteristics obtained by performing weighted averaging of first optical characteristics with respect to the visible light of the optical system and second optical characteristics with respect to the near-infrared light of the optical system.

14. An imaging device, comprising:

at least one processor configured to acquire image data obtained by imaging of an imaging element capable of imaging a subject with sensitivity to a wavelength band of visible light and a wavelength band of near-infrared light via an optical system; and perform a point image restoration process using a restoration filter based on optical characteristics of the optical system on the image data acquired by the processor, wherein the processor performs the point image restoration process using the restoration filter based on optical characteristics of the optical system with respect to red light in a red wavelength band in the visible light on the image data of the subject captured with sensitivity to the wavelength band of the near-infrared light by the imaging element.

15. The imaging device according to claim 14, wherein the imaging element includes first pixels having sensitivity to the wavelength band of the visible light and second pixels having sensitivity to the wavelength band of the near-infrared light.

16. The imaging device according to claim 15, wherein a pixel pitch between pixels of the same color in the first pixels of the imaging element and a pixel pitch of the second pixels are the same.

17. The imaging device according to claim 14, further comprising:

an Infrared cut filter that is arranged in an imaging optical path to the imaging element in a case where imaging is performed with the sensitivity to the wavelength band of the visible light by the imaging element, and is retracted from the imaging optical path in a case where imaging is performed with the sensitivity to the wavelength band of the near-infrared light by the imaging element.

18. The imaging device according to claim 14, wherein the restoration filter calculated on the basis of the optical characteristics of the optical system with respect to the red light is generated on the basis of the optical characteristics of the optical system with respect to the red light or generated on the basis of a result of performing a calculation process on the optical characteristics.

19. An image processing method of the imaging device according to claim 14, the image processing method comprising:

an image acquisition step of acquiring image data obtained by imaging of the imaging element capable of imaging a subject with sensitivity to a wavelength band of visible light and a wavelength band of near-infrared light via the optical system; and a point image restoration processing step of performing a point image restoration process on the image data acquired in the image acquisition step using a restoration filter based on optical characteristics of the optical system, wherein the point image restoration processing step includes performing the point image restoration process using the restoration filter based on optical characteristics of the optical system with respect to red light in a red wavelength band in the visible light on the image data of the subject captured with sensitivity to the wavelength band of the near-infrared light by the imaging element.

20. A non-transitory computer readable recording medium storing a program for a computer of the imaging device according to claim 14 performing a point image restoration process on image data obtained by imaging of the imaging element capable of imaging a subject with sensitivity to a wavelength band of visible light and a wavelength band of near-infrared light via the optical system, the stored program functioning the computer as:

the processor that acquires the image data obtained by imaging of the imaging element; and the processor that performs a point image restoration process on the image data acquired by the processor using a restoration filter based on optical characteristics of the optical system, the processor performing the point image restoration process using the restoration filter based on optical characteristics of the optical system with respect to red light in a red wavelength band in the visible light on the image data of the subject captured with sensitivity to the wavelength band of the near-infrared light by the imaging element.

* * * * *